US011115647B2

(12) United States Patent
Woodgate et al.

(10) Patent No.: US 11,115,647 B2
(45) Date of Patent: Sep. 7, 2021

(54) PRIVACY DISPLAY APPARATUS

(71) Applicant: RealD Spark, LLC, Beverly Hills, CA (US)

(72) Inventors: Graham J. Woodgate, Henley on Thames (GB); Jonathan Harrold, Leamington Spa (GB); Michael G. Robinson, Boulder, CO (US); Robert Ramsey, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/181,157

(22) Filed: Nov. 5, 2018

(65) Prior Publication Data

US 2019/0215509 A1    Jul. 11, 2019

Related U.S. Application Data

(60) Provisional application No. 62/582,030, filed on Nov. 6, 2017.

(51) Int. Cl.
*H04N 13/30* (2018.01)
*F21V 8/00* (2006.01)
(Continued)

(52) U.S. Cl.
CPC .......... *H04N 13/30* (2018.05); *G02B 6/0048* (2013.01); *G02B 6/0068* (2013.01); *G02F 1/13* (2013.01);
(Continued)

(58) Field of Classification Search
None
See application file for complete search history.

(56) References Cited

U.S. PATENT DOCUMENTS 1,128,979 A   2/1915 Hess
1,970,311 A   8/1934 Ives
(Continued)

FOREIGN PATENT DOCUMENTS

CA   2222313 A1   6/1998
CN   1142869 A    2/1997
(Continued)

OTHER PUBLICATIONS

3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
(Continued)

*Primary Examiner* — Richard H Kim
(74) *Attorney, Agent, or Firm* — Penny L. Lowry

(57) ABSTRACT

An imaging directional backlight apparatus including a waveguide, a light source array, for providing large area directed illumination from localized light sources. The waveguide may include a stepped structure, in which the steps may further include extraction features optically hidden to guided light, propagating in a first forward direction. Returning light propagating in a second backward direction may be refracted, diffracted, or reflected by the features to provide discrete illumination beams exiting from the top surface of the waveguide. The directional backlight may be arranged to switch between at least a first wide angular luminance profile mode and a second narrow angular luminance profile mode. The directional backlight is arranged to illuminate an LCD with a bias electrode arranged to switch liquid crystal directors in black state pixels between a first wide angular contrast profile mode and a second narrow
(Continued)

angular contrast profile mode. Performance of privacy operation for off-axis snoopers is enhanced in comparison to displays with only directional backlights or switchable contrast properties.

41 Claims, 76 Drawing Sheets

(51) Int. Cl.
| | |
|---|---|
| G02F 1/295 | (2006.01) |
| G02F 1/365 | (2006.01) |
| G02F 1/1335 | (2006.01) |
| G02F 1/13 | (2006.01) |
| G02F 1/13363 | (2006.01) |
| G02F 1/1337 | (2006.01) |
| G02F 1/137 | (2006.01) |
| G02F 1/13357 | (2006.01) |
| G02F 1/1347 | (2006.01) |

(52) U.S. Cl.
CPC ............ *G02F 1/137* (2013.01); *G02F 1/1323* (2013.01); *G02F 1/1337* (2013.01); *G02F 1/1347* (2013.01); *G02F 1/13363* (2013.01); *G02F 1/133524* (2013.01); *G02F 1/133528* (2013.01); *G02F 1/133536* (2013.01); *G02F 1/133615* (2013.01); *G02F 1/133753* (2013.01); *G02F 1/295* (2013.01); *G02F 1/365* (2013.01); *G02B 6/0011* (2013.01); *G02F 1/13478* (2021.01); *G02F 1/13706* (2021.01); *G02F 1/13712* (2021.01); *G02F 1/133562* (2021.01); *G02F 1/133567* (2021.01); *G02F 1/133638* (2021.01); *G02F 1/133738* (2021.01); *G02F 1/133742* (2021.01); *G02F 2203/12* (2013.01); *H04N 2013/403* (2018.05)

(56) References Cited

U.S. PATENT DOCUMENTS

| | | |
|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,621,898 A | 11/1986 | Cohen |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 4,974,941 A | 12/1990 | Gibbons et al. |
| 5,005,108 A | 4/1991 | Pristash et al. |
| 5,035,491 A | 7/1991 | Kawagishi et al. |
| 5,050,946 A | 9/1991 | Hathaway et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,658,490 A | 8/1997 | Sharp et al. |
| 5,697,006 A | 12/1997 | Taguchi et al. |
| 5,703,667 A | 12/1997 | Ochiai |
| 5,715,028 A | 2/1998 | Abileah et al. |
| 5,727,107 A | 3/1998 | Umemoto et al. |
| 5,771,066 A | 6/1998 | Barnea |
| 5,796,451 A | 8/1998 | Kim |
| 5,808,784 A | 9/1998 | Ando et al. |
| 5,808,792 A | 9/1998 | Woodgate et al. |
| 5,835,166 A | 11/1998 | Hall et al. |
| 5,875,055 A | 2/1999 | Morishima et al. |
| 5,894,361 A | 4/1999 | Yamazaki et al. |
| 5,896,225 A | 4/1999 | Chikazawa |
| 5,903,388 A | 5/1999 | Sedlmayr |
| 5,914,760 A | 6/1999 | Daiku |
| 5,933,276 A | 8/1999 | Magee |
| 5,956,001 A | 9/1999 | Sumida et al. |
| 5,959,664 A | 9/1999 | Woodgate |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,055,013 A | 4/2000 | Woodgate et al. |
| 6,055,103 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,099,758 A | 8/2000 | Verrall et al. |
| 6,108,059 A | 8/2000 | Yang |
| 6,118,584 A | 9/2000 | Berkel et al. |
| 6,128,054 A | 10/2000 | Schwarzenberger |
| 6,144,433 A | 11/2000 | Tillin et al. |
| 6,172,723 B1 | 1/2001 | Inoue et al. |
| 6,199,995 B1 | 3/2001 | Umemoto et al. |
| 6,204,904 B1 | 3/2001 | Tillin et al. |
| 6,222,672 B1 | 4/2001 | Towler et al. |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,373,637 B1 | 4/2002 | Gulick et al. |
| 6,377,295 B1 | 4/2002 | Woodgate et al. |
| 6,392,727 B1 | 5/2002 | Larson et al. |
| 6,422,713 B1 | 7/2002 | Fohl et al. |
| 6,437,915 B2 | 8/2002 | Moseley et al. |
| 6,456,340 B1 | 9/2002 | Margulis |
| 6,464,365 B1 | 10/2002 | Gunn et al. |
| 6,476,850 B1 | 11/2002 | Erbey |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,488 B2 | 1/2005 | Travis |
| 6,859,240 B1 | 2/2005 | Brown et al. |
| 6,867,828 B2 | 3/2005 | Taira et al. |
| 7,001,058 B2 | 2/2006 | Inditsky |
| 7,058,252 B2 | 6/2006 | Woodgate et al. |
| 7,067,985 B2 | 6/2006 | Adachi |
| 7,091,931 B2 | 8/2006 | Yoon |
| 7,101,048 B2 | 9/2006 | Travis |
| 7,136,031 B2 | 11/2006 | Lee et al. |
| 7,163,319 B2 | 1/2007 | Kuo et al. |
| 7,215,391 B2 | 5/2007 | Kuan et al. |
| 7,215,475 B2 | 5/2007 | Woodgate et al. |
| 7,227,567 B1 | 6/2007 | Beck et al. |
| 7,227,602 B2 | 6/2007 | Jeon et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |

(56) References Cited

U.S. PATENT DOCUMENTS

| | | |
|---|---|---|
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,646,931 B2 | 2/2014 | Choi et al. |
| 8,801,260 B2 | 8/2014 | Urano et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,649,248 B1 | 5/2020 | Jiang et al. |
| 10,649,259 B2 | 5/2020 | Lee et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0024529 A1 | 2/2002 | Miller et al. |
| 2002/0113866 A1 | 8/2002 | Taniguchi et al. |
| 2002/0171793 A1 | 11/2002 | Sharp et al. |
| 2003/0089956 A1 | 5/2003 | Allen et al. |
| 2003/0107686 A1 | 6/2003 | Sato et al. |
| 2003/0117790 A1 | 6/2003 | Lee et al. |
| 2003/0133191 A1 | 7/2003 | Morita et al. |
| 2003/0137821 A1 | 7/2003 | Gotoh et al. |
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0066480 A1 | 4/2004 | Yoshida et al. |
| 2004/0100598 A1 | 5/2004 | Adachi et al. |
| 2004/0108971 A1 | 6/2004 | Waldern et al. |
| 2004/0109303 A1 | 6/2004 | Olczak |
| 2004/0125430 A1 | 7/2004 | Kasajima et al. |
| 2004/0135741 A1 | 7/2004 | Tomisawa et al. |
| 2004/0145703 A1 | 7/2004 | O'Connor et al. |
| 2004/0170011 A1 | 9/2004 | Kim et al. |
| 2004/0240777 A1 | 12/2004 | Woodgate et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0180167 A1 | 8/2005 | Hoelen et al. |
| 2005/0190180 A1 | 9/2005 | Jin et al. |
| 2005/0190326 A1 | 9/2005 | Jeon et al. |
| 2005/0190329 A1 | 9/2005 | Okumura |
| 2005/0190345 A1 | 9/2005 | Dubin et al. |
| 2005/0219693 A1 | 10/2005 | Hartkop et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0066785 A1 | 3/2006 | Moriya |
| 2006/0082702 A1 | 4/2006 | Jacobs et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203162 A1 | 9/2006 | Ito et al. |
| 2006/0203200 A1 | 9/2006 | Koide |
| 2006/0215129 A1 | 9/2006 | Alasaarela et al. |
| 2006/0215244 A1 | 9/2006 | Yosha et al. |
| 2006/0221642 A1 | 10/2006 | Daiku |
| 2006/0227427 A1 | 10/2006 | Dolgoff |
| 2006/0244884 A1 | 11/2006 | Jeon et al. |
| 2006/0244918 A1 | 11/2006 | Cossairt et al. |
| 2006/0250580 A1 | 11/2006 | Silverstein et al. |
| 2006/0262258 A1 | 11/2006 | Wang et al. |
| 2006/0262376 A1 | 11/2006 | Mather et al. |
| 2006/0262558 A1 | 11/2006 | Cornelissen |
| 2006/0267040 A1 | 11/2006 | Baek et al. |
| 2006/0268207 A1 | 11/2006 | Tan et al. |
| 2006/0269213 A1 | 11/2006 | Hwang et al. |
| 2006/0284974 A1 | 12/2006 | Lipton et al. |
| 2006/0285040 A1 | 12/2006 | Kobayashi |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0139772 A1 | 6/2007 | Wang |
| 2007/0153160 A1 | 7/2007 | Lee et al. |
| 2007/0188667 A1 | 8/2007 | Schwerdtner |
| 2007/0189701 A1 | 8/2007 | Chakmakjian et al. |
| 2007/0223251 A1 | 9/2007 | Liao |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2007/0285775 A1 | 12/2007 | Lesage et al. |
| 2008/0055221 A1 | 3/2008 | Yabuta et al. |
| 2008/0068329 A1 | 3/2008 | Shestak et al. |
| 2008/0079662 A1 | 4/2008 | Saishu et al. |
| 2008/0084519 A1 | 4/2008 | Brigham et al. |
| 2008/0128728 A1 | 6/2008 | Nemchuk et al. |
| 2008/0158491 A1 | 7/2008 | Zhu et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0285310 A1 | 11/2008 | Aylward et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316198 A1 | 12/2008 | Fukushima et al. |
| 2008/0316303 A1 | 12/2008 | Chiu et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0085894 A1 | 4/2009 | Gandhi et al. |
| 2009/0086509 A1 | 4/2009 | Omori et al. |
| 2009/0109705 A1 | 4/2009 | Pakhchyan et al. |
| 2009/0128735 A1 | 5/2009 | Larson et al. |
| 2009/0128746 A1 | 5/2009 | Kean et al. |
| 2009/0135623 A1 | 5/2009 | Kunimochi |

(56) References Cited

U.S. PATENT DOCUMENTS

| | | |
|---|---|---|
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0168459 A1 | 7/2009 | Holman et al. |
| 2009/0174840 A1 | 7/2009 | Lee et al. |
| 2009/0174843 A1 | 7/2009 | Sakai et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0213298 A1 | 8/2009 | Mimura et al. |
| 2009/0213305 A1 | 8/2009 | Ohmuro et al. |
| 2009/0225380 A1 | 9/2009 | Schwerdtner et al. |
| 2009/0244415 A1 | 10/2009 | Ide |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0002169 A1 | 1/2010 | Kuramitsu et al. |
| 2010/0002296 A1 | 1/2010 | Choi et al. |
| 2010/0033558 A1 | 2/2010 | Horie et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091093 A1 | 4/2010 | Robinson |
| 2010/0091254 A1 | 4/2010 | Travis et al. |
| 2010/0103649 A1 | 4/2010 | Hamada |
| 2010/0128200 A1 | 5/2010 | Morishita et al. |
| 2010/0149459 A1 | 6/2010 | Yabuta et al. |
| 2010/0165598 A1 | 7/2010 | Chen et al. |
| 2010/0177113 A1 | 7/2010 | Gay et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0205667 A1 | 8/2010 | Anderson et al. |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0238376 A1 | 9/2010 | Sakai et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0283930 A1 | 11/2010 | Park et al. |
| 2010/0289870 A1 | 11/2010 | Leister |
| 2010/0289989 A1 | 11/2010 | Adachi et al. |
| 2010/0295755 A1 | 11/2010 | Broughton et al. |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0018860 A1 | 1/2011 | Parry-Jones et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0115997 A1 | 5/2011 | Kim |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0241983 A1 | 10/2011 | Chang |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0286222 A1 | 11/2011 | Coleman |
| 2011/0292321 A1 | 12/2011 | Travis et al. |
| 2011/0310232 A1 | 12/2011 | Wilson et al. |
| 2011/0321143 A1 | 12/2011 | Angaluri et al. |
| 2012/0002121 A1 | 1/2012 | Pirs et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Mich et al. |
| 2012/0063166 A1 | 3/2012 | Panagotacos et al. |
| 2012/0081920 A1 | 4/2012 | Ie et al. |
| 2012/0086776 A1 | 4/2012 | Lo |
| 2012/0086875 A1 | 4/2012 | Yokota |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0147280 A1 | 6/2012 | Osterman et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0219180 A1 | 8/2012 | Mehra |
| 2012/0235891 A1 | 9/2012 | Nishitani et al. |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0327101 A1 | 12/2012 | Blixt et al. |
| 2012/0327172 A1 | 12/2012 | El-Saban et al. |
| 2013/0039062 A1 | 2/2013 | Vinther et al. |
| 2013/0100097 A1 | 4/2013 | Martin |
| 2013/0101253 A1 | 4/2013 | Popovich et al. |
| 2013/0107174 A1 | 5/2013 | Yun et al. |
| 2013/0107340 A1 | 5/2013 | Wong et al. |
| 2013/0127861 A1 | 5/2013 | Gollier |
| 2013/0128165 A1 | 5/2013 | Lee et al. |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0242231 A1 | 9/2013 | Kurata et al. |
| 2013/0265625 A1 | 10/2013 | Fäcke et al. |
| 2013/0278544 A1 | 10/2013 | Cok |
| 2013/0293793 A1 | 11/2013 | Lu |
| 2013/0294684 A1 | 11/2013 | Lipton et al. |
| 2013/0300985 A1 | 11/2013 | Bulda |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321340 A1 | 12/2013 | Seo et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0071382 A1 | 3/2014 | Scardato |
| 2014/0098418 A1 | 4/2014 | Lin |
| 2014/0098558 A1 | 4/2014 | Vasylyev |
| 2014/0111760 A1 | 4/2014 | Guo et al. |
| 2014/0126238 A1 | 5/2014 | Kao et al. |
| 2014/0132887 A1 | 5/2014 | Kurata |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0267584 A1 | 9/2014 | Atzpadin et al. |
| 2014/0268358 A1 | 9/2014 | Kusaka et al. |

(56) References Cited

U.S. PATENT DOCUMENTS

| | | |
|---|---|---|
| 2014/0286043 A1 | 9/2014 | Sykora et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0368602 A1 | 12/2014 | Woodgate et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0301400 A1 | 10/2015 | Kimura et al. |
| 2015/0334365 A1 | 11/2015 | Tsubaki et al. |
| 2015/0339512 A1 | 11/2015 | Son et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0334898 A1* | 11/2016 | Kwak .................. G06F 1/3203 |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196236 A1 | 6/2019 | Chen et al. |
| 2019/0197928 A1* | 6/2019 | Schubert .................. H01L 27/153 |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2020/0159055 A1 | 5/2020 | Robinson et al. |
| 2020/0225402 A1 | 7/2020 | Ihas et al. |

FOREIGN PATENT DOCUMENTS

| | | |
|---|---|---|
| CN | 1377453 A | 10/2002 |
| CN | 1125943 C | 10/2003 |
| CN | 1454329 A | 11/2003 |
| CN | 1466005 A | 1/2004 |
| CN | 1487332 A | 4/2004 |
| CN | 1696788 A | 11/2005 |
| CN | 1776484 A | 5/2006 |
| CN | 1826553 A | 8/2006 |
| CN | 1900785 A | 1/2007 |
| CN | 1908753 A | 2/2007 |
| CN | 101029975 A | 9/2007 |
| CN | 101049028 A | 10/2007 |
| CN | 101114080 A | 1/2008 |
| CN | 101142823 A | 3/2008 |
| CN | 101266338 A | 9/2008 |
| CN | 101681061 A | 3/2010 |
| CN | 102147079 A | 8/2011 |
| CN | 104133292 A | 11/2014 |
| CN | 204740413 U | 11/2015 |
| CN | 209171779 U | 7/2019 |
| EP | 0653891 A1 | 5/1995 |
| EP | 0830984 A2 | 3/1998 |
| EP | 0860729 A2 | 8/1998 |
| EP | 0939273 A1 | 9/1999 |
| EP | 1394593 A1 | 3/2004 |
| EP | 2219067 A1 | 8/2010 |
| EP | 2451180 A2 | 5/2012 |
| GB | 2405542 | 2/2005 |
| GB | 2418518 A | 3/2006 |
| GB | 2428100 A | 1/2007 |
| GB | 2482065 A | 1/2012 |
| GB | 2486935 B | 9/2013 |
| JP | H01130783 U | 9/1989 |
| JP | H10142556 A | 5/1998 |
| JP | H1130783 A | 2/1999 |
| JP | H11174489 A | 7/1999 |
| JP | 2003215705 A | 7/2003 |
| JP | 2005181914 A | 7/2005 |
| JP | 2006010935 A | 1/2006 |
| JP | 2007094035 A | 4/2007 |
| JP | 2007109255 A | 4/2007 |
| JP | 2007148279 A | 6/2007 |
| JP | 2007273288 A | 10/2007 |
| JP | 2008204874 A | 9/2008 |
| JP | 2010160527 A | 7/2010 |
| JP | 2012060607 A | 3/2012 |
| JP | 2013015619 | 1/2013 |
| KR | 20090932304 | 12/2009 |
| KR | 20110006773 A | 1/2011 |
| KR | 20110017918 A | 2/2011 |
| KR | 20120011228 A | 2/2012 |
| KR | 20120049890 A | 5/2012 |
| KR | 101990286 B1 | 6/2019 |
| TW | M537663 U | 3/2017 |
| WO | 1994006249 A1 | 3/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001061241 A1 | 8/2001 |
| WO | 2005071449 A2 | 8/2005 |
| WO | 2007111436 A1 | 10/2007 |
| WO | 2010021926 A2 | 2/2010 |
| WO | 2011020962 A1 | 2/2011 |
| WO | 2012158574 A1 | 11/2012 |
| WO | 2014011328 A1 | 1/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |

(56) References Cited

FOREIGN PATENT DOCUMENTS

| WO | 2015190311 A1 | 12/2015 |
|---|---|---|
| WO | 2015200814 A1 | 12/2015 |
| WO | 2016195786 A1 | 12/2016 |
| WO | 2017050631 A1 | 3/2017 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

Bahadur, "Liquid crystals applications and uses," World Scientific, vol. 1, pp. 178 (1990).

Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].

Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].

Cootes et al., "Active Appearance Models", IEEE Trans. Pattern Analysis and Machine Intelligence, 23(6):681-685, 2001.

Cootes et al., "Active Shape Models—Their Training and Application" Computer Vision and Image Understanding 61(1):38-59 Jan. 1995.

Dalal et al., "Histogram of Oriented Gradients for Human Detection", Computer Vision and Pattern Recognition, pp. 886-893, 2005.

Drucker et al., "Support Vector Regression Machines", Advances in Neural Information Processing Systems 9, pp. 155-161, NIPS 1996.

Ho, "Random Decision Forests", Proceedings of the 3rd International Conference on Document Analysis and Recognition, Montreal, QC, pp. 278-282, Aug. 14-16, 1995.

Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].

Kalantar, et al. "Backlight Unit With Double Surface Light Emission," J. Soc. Inf. Display, vol. 12, Issue 4, pp. 379-387 (Dec. 2004).

Kononenko et al., "Learning to Look Up: Realtime Monocular Gaze Correction Using Machine Learning", Computer Vision and Pattern Recognition, pp. 4667-4675, 2015.

Languy et al., "Performance comparison of four kinds of flat nonimaging Fresnel lenses made of polycarbonates and polymethyl methacrylate for concentrated photovoltaics", Optics Letters, 36, pp. 2743-2745.

Lipton, "Stereographies: Developers' Handbook", Stereographic Developers Handbook, Jan. 1, 1997, XP002239311, p. 42-49.

Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].

Lowe, "Distinctive Image Features from Scale-Invariant Keypoints", International Journal of Computer Vision 60 (2), pp. 91-110, 2004.

Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].

Marjanovic, M., "Interlace, Interleave, and Field Dominance," http://www.mir.com/DMG/interl.html, pp. 1-5 (2001).

Ozuysal et al., "Fast Keypoint recognition in Ten Lines of Code", Computer Vision and Pattern Recognition, pp. 1-8, 2007.

Tabiryan et al., "The Promise of Diffractive Waveplates," Optics and Photonics News, vol. 21, Issue 3, pp. 40-45 (Mar. 2010).

Travis, et al. "Backlight for view-sequential autostereo 3D", Microsoft E&DD Applied Sciences, (date unknown), 25 pages.

Travis, et al. "Collimated light from a waveguide for a display," Optics Express, vol. 17, No. 22, pp. 19714-19719 (2009).

Viola and Jones, "Rapid Object Detection using a Boosted Cascade of Simple Features", pp. 1-9 CVPR 2001.

Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.

Zach et al., "A Duality Based Approach for Realtime TV-L1 Optical Flow", Pattern Recognition (Proc. DAGM), 2007, pp. 214-223.

Gass, et al. "Privacy LCD Technology for Cellular Phones", Sharp Laboratories of Europe Ltd, Mobile LCD Group, Feb. 2007, pp. 45-49.

Weindorf et al., "Active Circular Polarizer OLED E-Mirror", Proceedings of the Society for Information Display 25th Annual Symposium on Vehicle Displays, Livonia, MI, pp. 225-237, Sep. 25-26, 2018.

Adachi, et al. "P-228L: Late-News Poster: Controllable Viewing-Angle Displays using a Hybrid Aligned Nematic Liquid Crystal Cell", ISSN, SID 2006 Digest, pp. 705-708.

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.

CN201780030715.3 Notification of the First Office Action dated Jan. 21, 2020.

EP-16860628.3 Extended European Search Report of European Patent Office dated Apr. 26, 2019.

EP-17799963.8 Extended European Search Report of European Patent Office dated Oct. 9, 2019.

Ishikawa, T., "New Design for a Highly Collimating Turning Film", SID 06 Digest, pp. 514-517.

PCT/US2016/058695 International search report and written opinion of the international searching authority dated Feb. 28, 2017.

PCT/US2017/032734 International search report and written opinion of the international searching authority dated Jul. 27, 2017.

PCT/US2018/031206 International search report and written opinion of the international searching authority dated Jul. 20, 2018.

PCT/US2018/031218 International Preliminary Report on Patentability dated Nov. 21, 2019.

PCT/US2018/031218 International search report and written opinion of the international searching authority dated Jul. 19, 2018.

PCT/US2018/051021 International search report and written opinion of the international searching authority dated Nov. 21, 2018.

PCT/US2018/051027 International search report and written opinion of the international searching authority dated Nov. 30, 2018.

PCT/US2018/053328 International search report and written opinion of the international searching authority dated Nov. 30, 2018.

PCT/US2018/059249 International search report and written opinion of the international searching authority dated Jan. 3, 2019.

PCT/US2018/059256 International search report and written opinion of the international searching authority dated Jan. 3, 2019.

PCT/US2019/014889 International search report and written opinion of the international searching authority dated May 24, 2019.

PCT/US2019/014902 International search report and written opinion of the international searching authority dated Jun. 25, 2019.

PCT/US2019/023659 International search report and written opinion of the international searching authority dated Jun. 10, 2019.

PCT/US2019/038409 International search report and written opinion of the international searching authority dated Sep. 19, 2019.

PCT/US2019/038466 International search report and written opinion of the international searching authority dated Nov. 5, 2019.

PCT/US2019/042027 International search report and written opinion of the international searching authority dated Oct. 15, 2019.

PCT/US2019/054291 International search report and written opinion of the international searching authority dated Jan. 6, 2020.

PCT/US2019/059990 International search report and written opinion of the international searching authority dated Feb. 28, 2020.

PCT/US2019/066208 International search report and written opinion of the international searching authority dated Feb. 27, 2020.

PCT/US2020/017537 International search report and written opinion of the international searching authority dated Apr. 29, 2020.

(56) References Cited

OTHER PUBLICATIONS

PCT/US2020/040686 International search report and written opinion of the international searching authority dated Nov. 20, 2020.
PCT/US2020/044574 International search report and written opinion of the international searching authority dated Oct. 21, 2020.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
CN201880042320.X Notification of the First Office Action dated May 25, 2021.
EP-18855604.7 Extended European Search Report of European Patent Office dated Jun. 1, 2021.
EP-18857077.4 Extended European Search Report of European Patent Office dated Jun. 16, 2021.

\* cited by examiner

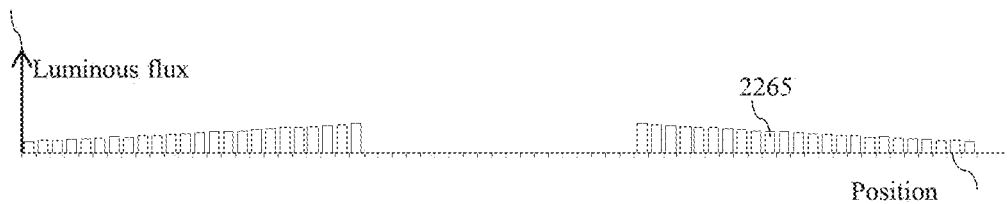
FIG. 21A
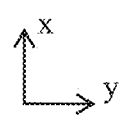 
FIG. 21B
FIG. 21C
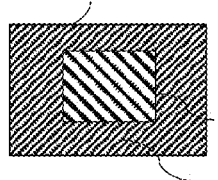
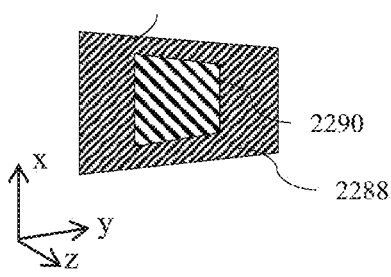
FIG. 21D     FIG. 21E

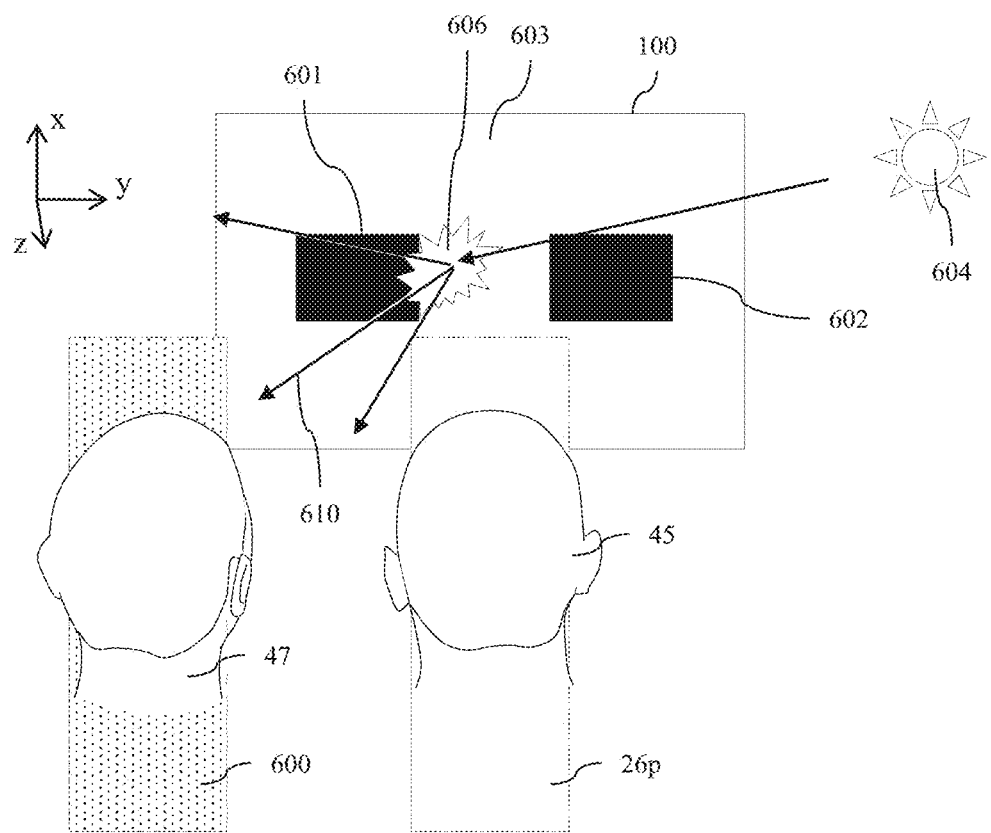
FIG. 22D
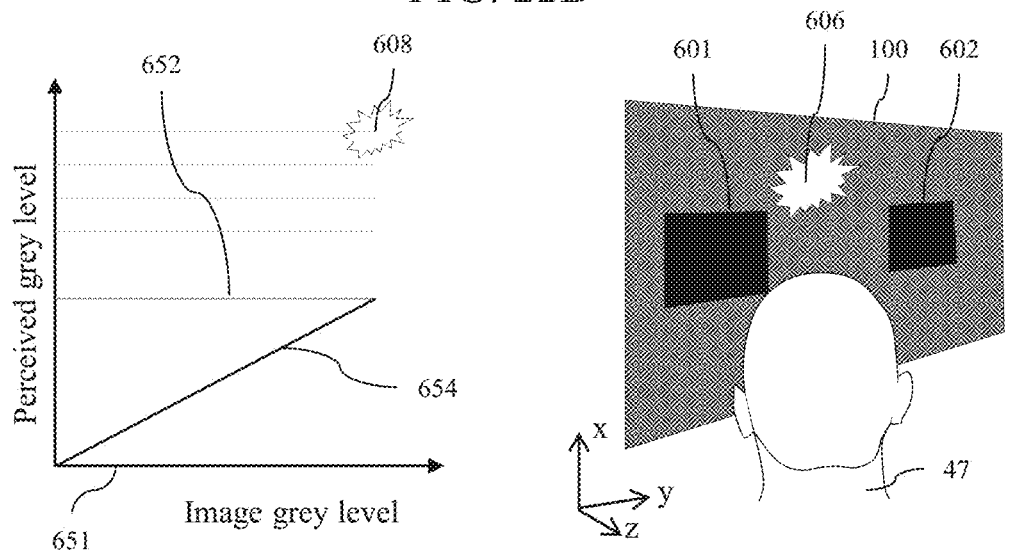
FIG. 22E
FIG. 22F

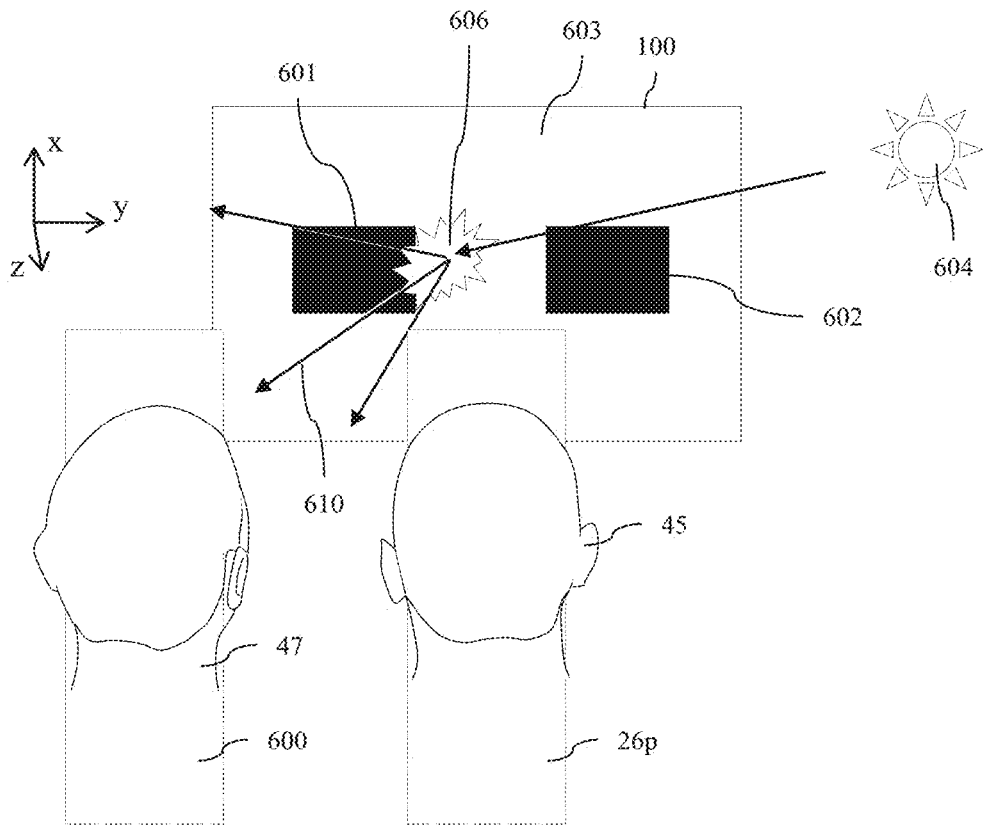
FIG. 24A
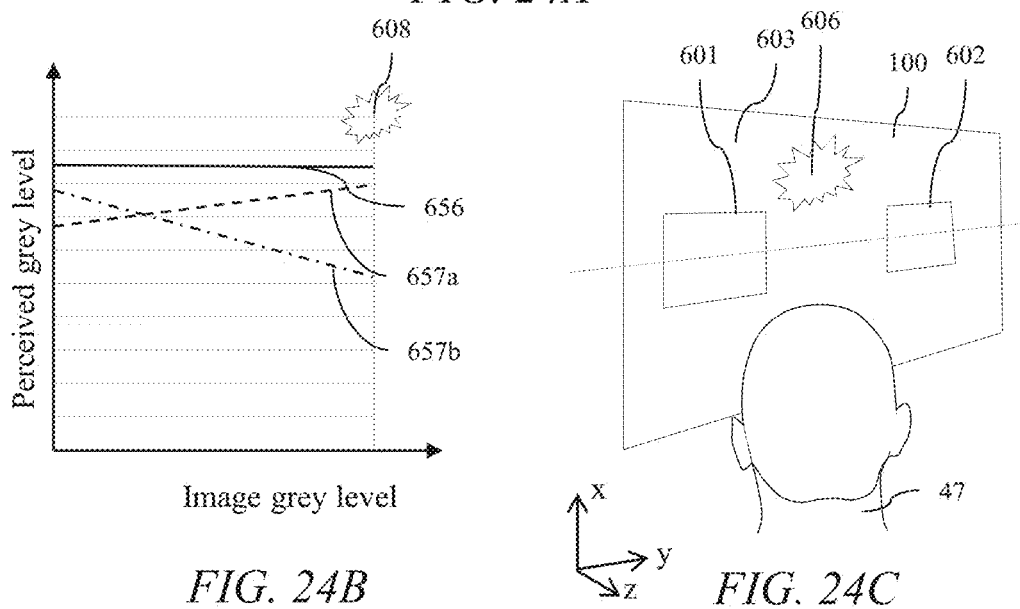
FIG. 24B
FIG. 24C

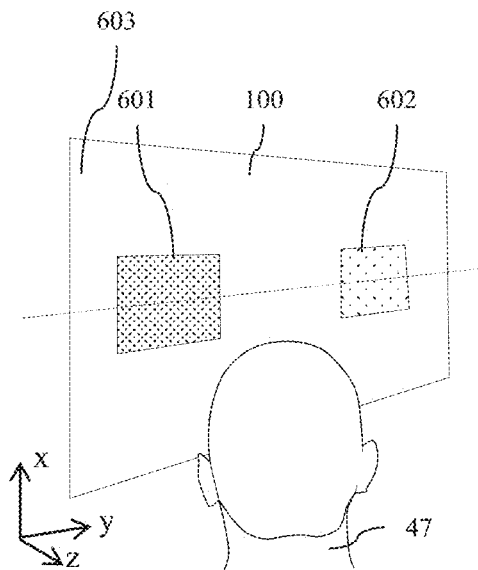
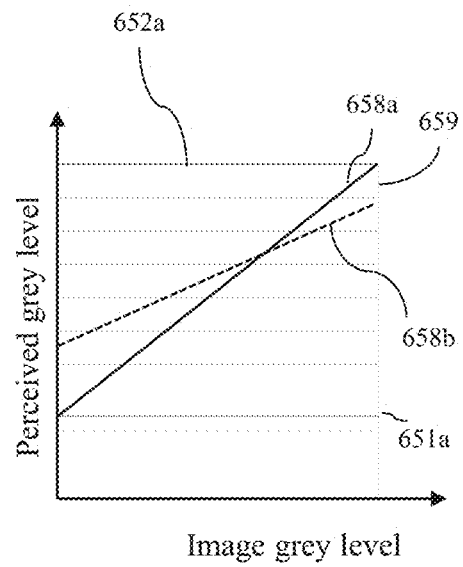
FIG. 26A
FIG. 26B
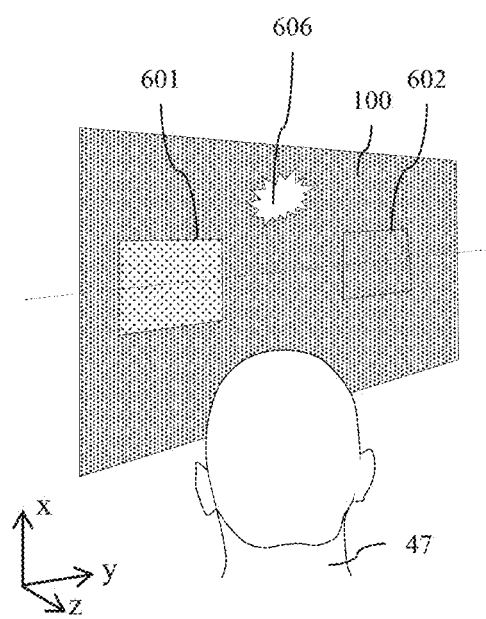
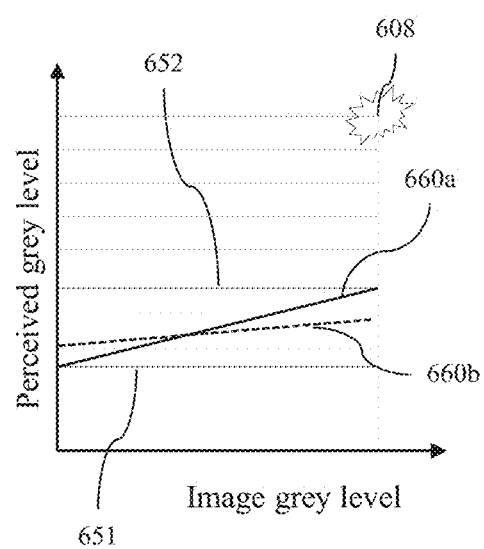
FIG. 26C
FIG. 26D

PRIVACY DISPLAY APPARATUS

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and call compromise addressing electronics in the spatial light modulator.

BRIEF SUMMARY

According to the present disclosure, a directional illumination apparatus may include an imaging directional backlight for directing light, an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus a non-illuminated (or void) outer portion (that may be triangular in shape) is formed between one edge of the collimated beam and the respective edge of the waveguide. No light is directed to the respective viewing window from within the outer portion and the display will appear dark in this region. It would be desirable to reduce the appearance of the dark outer portions for off-axis viewing positions so that more of the area of the waveguide can be used to illuminate a spatial light modulator, advantageously reducing system size and cost.

In general with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present disclosure there may be provided a display device comprising: a directional backlight arranged to output light wherein the directional backlight is arranged to provide switching between at least two different angular luminance profiles; a transmissive spatial light modulator arranged to receive output light from the backlight; wherein the spatial light modulator is arranged to modulate the output light from the backlight to provide an image that may be switched between at least two different angular contrast profiles.

Advantageously a privacy display may be provided that has increased invisibility to an off-axis snooper in comparison to a privacy display comprising only a directional backlight or only a restricted contrast viewing angle.

The spatial light modulator may be a liquid crystal display comprising a liquid crystal material. The liquid crystal display may comprise addressing electrodes that arc controlled to provide in-plane and out-of-plane electric field profiles; wherein the electric field profiles may be arranged to control director orientation of the liquid crystal material to achieve controllable pixel transmission; further comprising at least one bias electrode; wherein the bias electrode may be arranged to further control director orientation of the liquid crystal material to achieve switchable angular contrast profiles.

Advantageously a wide angle mode may be provided with high contrast at off-axis viewing positions, and a switchable privacy mode may be provided with increased invisibility of images for an off-axis snooper by means of image contrast reduction.

The directional backlight may comprises: an array of light sources; a waveguide arranged to receive input light from the light sources at different input positions and comprising first and second, opposed guide surfaces for guiding the input light along the waveguide, sides that extend between the first and second guide surfaces and a reflective end for reflecting the input light back along the waveguide, wherein the second guide surface is arranged to deflect the reflected input light through the first guide surface as output light, and the waveguide is arranged to image the light sources in a lateral direction between the sides of the waveguide so that the output light from the light sources is directed into respective optical windows in output directions that are distributed in dependence on input positions of the light sources. The first guide surface may be arranged to guide light by total internal reflection, and the second guide surface comprises light extraction features and intermediate regions between the light extraction features, the light extraction features being oriented to deflect the reflected input light through the first guide surface as output light and the intermediate regions being arranged to direct light through the waveguide without extracting it. The light extraction features may be curved and have positive optical power in the lateral direction between sides of the waveguide that extend between the first and second guide surfaces. The reflective end may have positive optical power in the lateral direction extending between sides of the waveguide that extend between the first and second guide surfaces. The waveguide may comprise an input end opposite to the reflective end and the light sources are arranged to input light into the waveguide through the input end. The light sources may be arranged to input light into the waveguide through the sides of the waveguide.

Advantageously a directional backlight may be provided that may be arranged to achieve switching between at least first and second angular luminance profiles by means of control of profile of light emitting elements.

The spatial light modulator may comprise a pixelated liquid crystal display comprising a liquid crystal pixel layer and pixel addressing electrodes arranged to provide in-plane electric fields to pixels of the pixelated liquid crystal display. The pixelated liquid crystal display may further comprise pixel bias electrodes arranged to provide out-of-plane bias electric fields to the liquid crystal pixel layer. The spatial light modulator may further comprise a liquid crystal bias layer arranged between the input polariser and output polariser of the pixelated liquid crystal display; and bias layer electrodes arranged to provide out-of-plane bias electric fields to the liquid crystal bias layer. Advantageously contrast of the display may vary with viewing angle.

The bias electric fields may be time varying. Advantageously the size of the polar region for which reduced contrast is achieved may be increased.

The bias layer electrodes may be patterned to provide at least two pattern regions. The pattern regions may be camouflage patterns. At least one of the pattern regions may be individually addressable. Advantageously a snooper may see a camouflaged image for off-axis viewing while a primary observer may see an image without camouflage.

The angular luminance profiles from the directional backlight may be controlled in the lateral direction; and the angular contrast profiles from the spatial light modulator may be controlled in the lateral direction. The angular luminance profiles from the directional backlight may be controlled in the lateral direction; and the out of plane bias electric fields may be arranged to tilt the respective liquid crystal layer about an axis parallel to the lateral direction.

Advantageously a switchable privacy mode display may be provided that has comfortable viewing freedom in the vertical direction for a primary observer and has increased image invisibility for an off-axis observer in the lateral (azimuthal) direction.

The privacy display may further comprise at least one additional polariser arranged on the input side of the input polariser between the input polariser and the backlight or on the output side of the output polariser; and at least one retarder arranged between the at least one additional polariser and the input polariser in the case that the additional polariser is arranged on the input side of the input polariser or between the additional polariser and the output polariser in the case that the additional polariser is arranged on the output side of the input polariser.

The additional polariser may be arranged on the input side of the input polariser and said at least one retarder is arranged between the additional polariser and the input polariser. The additional polariser may be a reflective polariser. The additional polariser may have an electric vector transmission direction that is parallel to the electric vector transmission of the input polariser in the case that the additional polariser is arranged on the input side of the input polariser or is parallel to the electric vector transmission of the output polariser in the case that the additional polariser is arranged on the output side of the input polariser. The additional polariser may be arranged on the output side of the output polariser and said at least one retarder is arranged between the additional polariser and the output polariser.

The at least one retarder may comprise a pair of retarders which have slow axes in the plane of the retarders that are crossed. The pair of retarders may have slow axes that each extend at 45° with respect to an electric vector transmission direction that is parallel to the electric vector transmission of the input polariser in the case that the additional polariser is arranged on the input side of the input polariser or is parallel to the electric vector transmission of the output polariser in the case that the additional polariser is arranged on the output side of the input polariser. The pair of retarders may each comprise a single A-plate. The pair of retarders may each comprise plural A-plates having respective slow axes aligned at different angles from each other. The at least one retarder may comprise a retarder having a slow axis perpendicular to the plane of the retarder. The retarder may have a slow axis perpendicular to the plane of the retarder comprises a C-plate. The at least one retarder may further comprise a pair of retarders which have slow axes in the plane of the retarders that are crossed. The pair of retarders have slow axes that each extend at 0° and 90°, respectively, with respect to an electric vector transmission direction that is parallel to the electric vector transmission of the input polariser in the case that the additional polariser is arranged on the input side of the input polariser or is parallel to the electric vector transmission of the output polariser in the case that the additional polariser is arranged on the output side of the input polariser.

The at least one retarder may comprise a retarder having a slow axis orientation with a component perpendicular to the plane of the retarder, and at least one component in the plane of the retarder.

The at least one retarder may comprise a retarder having a slow axis orientation with a component perpendicular to the plane of the retarder, a component that is orthogonal in the plane of the retarder to the electric vector transmission direction of the input polariser and substantially no component that is parallel in the plane of the retarder to the electric vector transmission direction of the input polariser.

The at least one retarder may comprise a retarder having a slow axis orientation with a component perpendicular to the plane of the retarder, a component that is parallel in the plane of the retarder to the electric vector transmission direction of the input polariser and substantially no component that is orthogonal in the plane of the retarder to the electric vector transmission direction of the input polariser. The at least one retarder may comprise an O-plate. The at least one retarder may comprise a switchable liquid crystal retarder that is switchable between an O-plate retarder and an A-plate retarder by means of an applied voltage across the switchable liquid crystal retarder. The switchable liquid crystal retarder may comprise at least one homeotropic alignment layer.

The privacy display device may further comprising at least one compensation retarder arranged between the at least one additional polariser and the input polariser in the case that the additional polariser is arranged on the input side of the input polariser or between the additional polariser and the output polariser in the case that the additional polariser is arranged on the output side of the input polariser. The compensating retarder may comprise a negative C-plate or crossed positive A-plates.

The switchable liquid crystal retarder may comprise at least first and second regions that are independently addressable with first and second applied voltages. The at least one retarder may comprise a first O-plate retarder and a second O-plate retarder that is switchable.

Advantageously off-axis luminance of the privacy display may be reduced for a snooper in a privacy mode of operation while providing high head-on luminance to a primary observer. Perceived dynamic range of privacy images may be reduced in ambient illumination. Further the off-axis luminance may cooperate with off-axis contrast reduction to provide further reduction of perceived dynamic range to a snooper. Wide angle luminance and contrast may be substantially unmodified. Further camouflage may be provided in at least one of luminance and contrast appearance for an off-axis snooper with low visibility of camouflage for an on-axis observer.

According to a second aspect of the present disclosure there may be provided a display system comprising the display device according to the first aspect and a control system arranged to switch the directional backlight between a first mode arranged to switch the directional backlight to a first angular luminance profile and to switch the spatial light modulator to a first angular contrast profile; and a second mode arranged to switch the directional backlight to a second angular luminance profile and to switch the spatial light modulator to a second angular contrast profile wherein the angular profiles of the first mode have half maximum widths that are larger than the half maximum widths of the angular profiles of the second mode.

Advantageously a privacy display may be provided that has increased invisibility to an off-axis snooper in comparison to a privacy display comprising only a directional backlight or only a restricted contrast viewing angle and may be switched to a wide angle mode.

The switching between the at least first and second angular luminance profiles may be provided by control of luminous flux distributions across the array of input light sources. The switching between the at least first and second angular contrast profiles is provided by control of a bias electric field across the pixels of the spatial light modulator.

Advantageously the switching of the optical system may be provided by electrical control.

In the second mode for a nominal viewing angle there is provided an invisibility function of image contrast against image luminance on which an operating point is selected by control of (i) angular luminance profile and (ii) angular contrast profile.

Advantageously the uniformity of the image appearance for the primary user may be controlled in cooperation with the desired image invisibility for off-axis snoopers.

The display system may further comprise an ambient light control system arranged to control the invisibility function in response to the ambient illuminance. The ambient light control system may comprise an ambient light sensor.

Advantageously the uniformity of the image for the primary user may be adjusted to achieve equivalent image invisibility for snoopers in dependence on the ambient illuminance environment.

According to a third aspect of the present disclosure there may be provided a switchable directional display, comprising: a light valve comprising a first end at which light may enter the light valve and propagate in a first direction; a second end comprising a reflective surface arranged to redirect light propagating in said first direction to propagate in a second direction back toward the first end, wherein the second end is a curved reflective surface, or a Fresnel equivalent of a curved reflective surface: a first light guiding surface extending between the first and second ends, wherein the first light guiding surface is substantially planar; and a second light guiding surface, extending between the first and second ends opposite the first light guiding surface, further comprising a plurality of guiding features and a plurality of extraction features that have a cross-sectional profile and are curved along the direction in which they are elongated, wherein the extraction features and the guiding features are connected to and alternate with one another respectively, further wherein the plurality of extraction features allow light to pass with substantially low loss when the light is propagating in a first direction and allow light to reflect and exit the light valve when the light is propagating in a second direction, wherein a degree of curvature of the extraction features along the direction in which the extraction features are elongated causes the light from a plurality of illumination elements to be focused, whereby the curvature of the extraction features and the curvature of the reflective end cooperate to direct focused light into respective viewing windows; and a polymer dispersed liquid crystal between two transparent substrates, wherein each of the transparent substrates further comprises at least one transparent conductive electrode for applying a voltage across the polymer dispersed liquid crystal wherein the polymer dispersed liquid crystal is switchable between a light scattering state and a clear state by means of the applied voltage; and a spatial light modulator.

Advantageously the light source array control system may have a fixed luminous flux distribution, reducing cost and complexity. Further off-axis positions on the input side of the waveguide may comprise absorbing areas, advantageously achieving reduced off-axis privacy.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve for example power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading; this disclosure in its entirety.

BRIEF DESCRIPTION OF THE DRAWINGS

Embodiments are illustrated by way of example in the accompanying FIGURES, in which like reference numbers indicate similar parts, and in which:

FIG. 21A, FIG. 21B, FIG. 21C, FIG. 21D, and FIG. 21E are schematic diagrams illustrating the operation of a directional display in privacy mode in a second phase of operation, in accordance with the present disclosure;

FIG. 22D is a schematic diagram illustrating in perspective front view illumination of a primary viewer and a snooper by a luminance controlled privacy display with further ambient lighting, in accordance with the present disclosure;

FIG. 22E is a schematic graph illustrating the variation of perceived grey level against image grey level for the snooper viewing the arrangement of FIG. 22D, in accordance with the present disclosure;

FIG. 22F is a schematic diagram illustrating in perspective side view illumination of a snooper by a luminance controlled privacy display with ambient lighting, in accordance with the present disclosure;

FIG. 24A is a schematic diagram illustrating in perspective front view illumination of a primary viewer and a snooper by an ideal contrast controlled privacy display with further ambient lighting, in accordance with the present disclosure;

FIG. 24B is a schematic graph illustrating the variation of perceived grey level against image grey level for the snooper viewing the arrangement of FIG. 24A, in accordance with the present disclosure;

FIG. 24C is a schematic diagram illustrating in perspective side view illumination of a snooper by a biased LCD contrast controlled privacy display with ambient lighting, in accordance with the present disclosure;

FIG. 26A is a schematic diagram illustrating in perspective side view appearance of an image to a snooper of a luminance and biased LCD contrast controlled privacy display with different bias voltage in comparison to the arrangement of FIG. 24B, with no ambient lighting, in accordance with the present disclosure;

FIG. 26B is a schematic graph illustrating the variation of perceived grey level against image grey level for the snooper viewing the arrangement of FIG. 26A, in accordance with the present disclosure;

FIG. 26C is a schematic graph illustrating the variation of perceived grey level against image grey level for the snooper viewing the arrangement of FIG. 26A when further ambient illumination is provided, in accordance with the present disclosure;

FIG. 26D is a schematic graph illustrating the variation of perceived grey level against image grey level for the snooper viewing the arrangement of FIG. 26C, in accordance with the present disclosure;

DETAILED DESCRIPTION

Figure 1A:
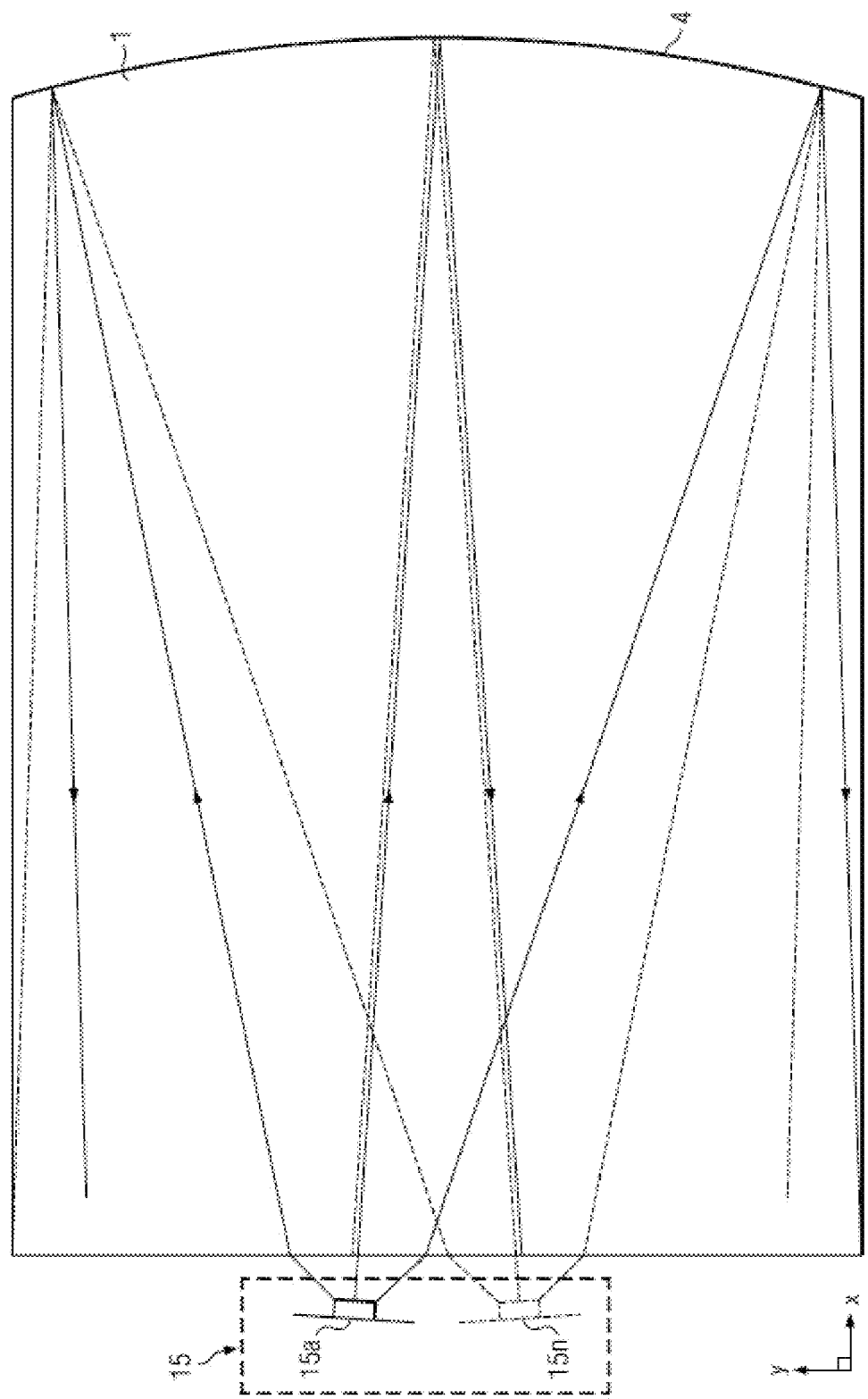
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. Pat. No. 9,519,153 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. Pat. No. 9,519,153, which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input surface to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. Pat. No. 9,519,153 which may be referred to herein as an "optical valve" or "optical valve directional backlight," all of which are herein incorporated by reference in their entirety.

Switchable angular contrast profile liquid crystal displays are described in Japanese Patent Publ. No. JPH1130783 and in U.S. Patent Publ. No. 2017-0123241, both of which are incorporated by reference herein in their entireties.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
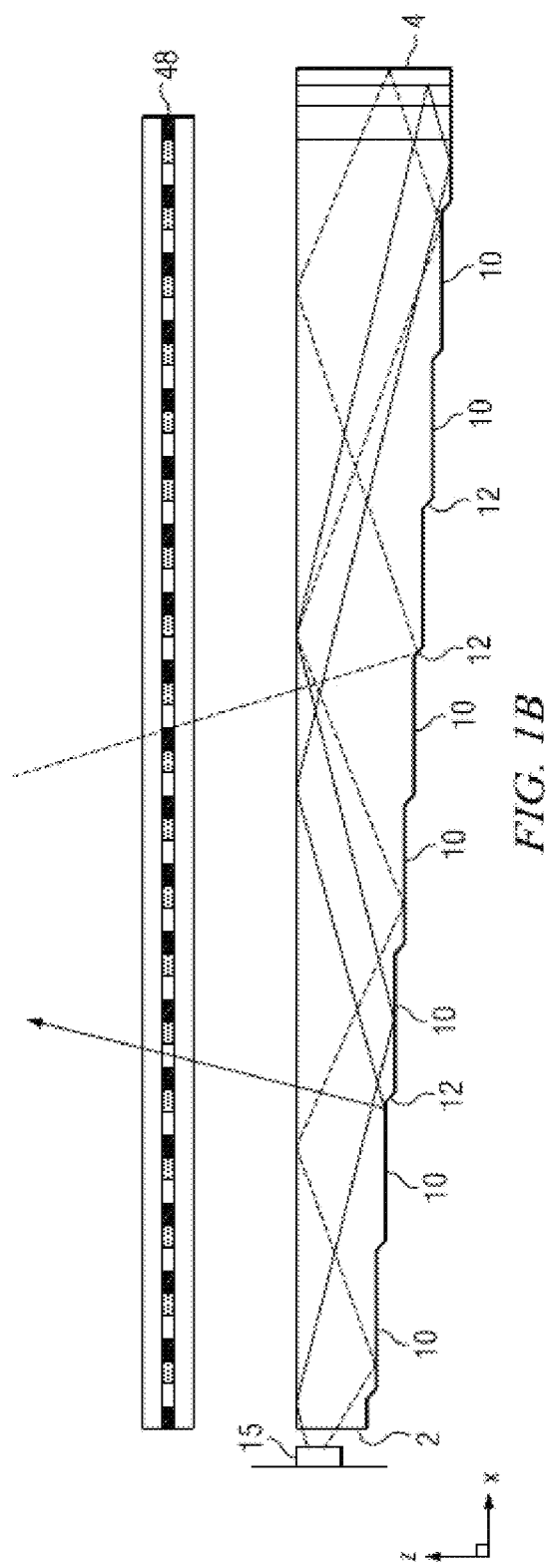
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape winch may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
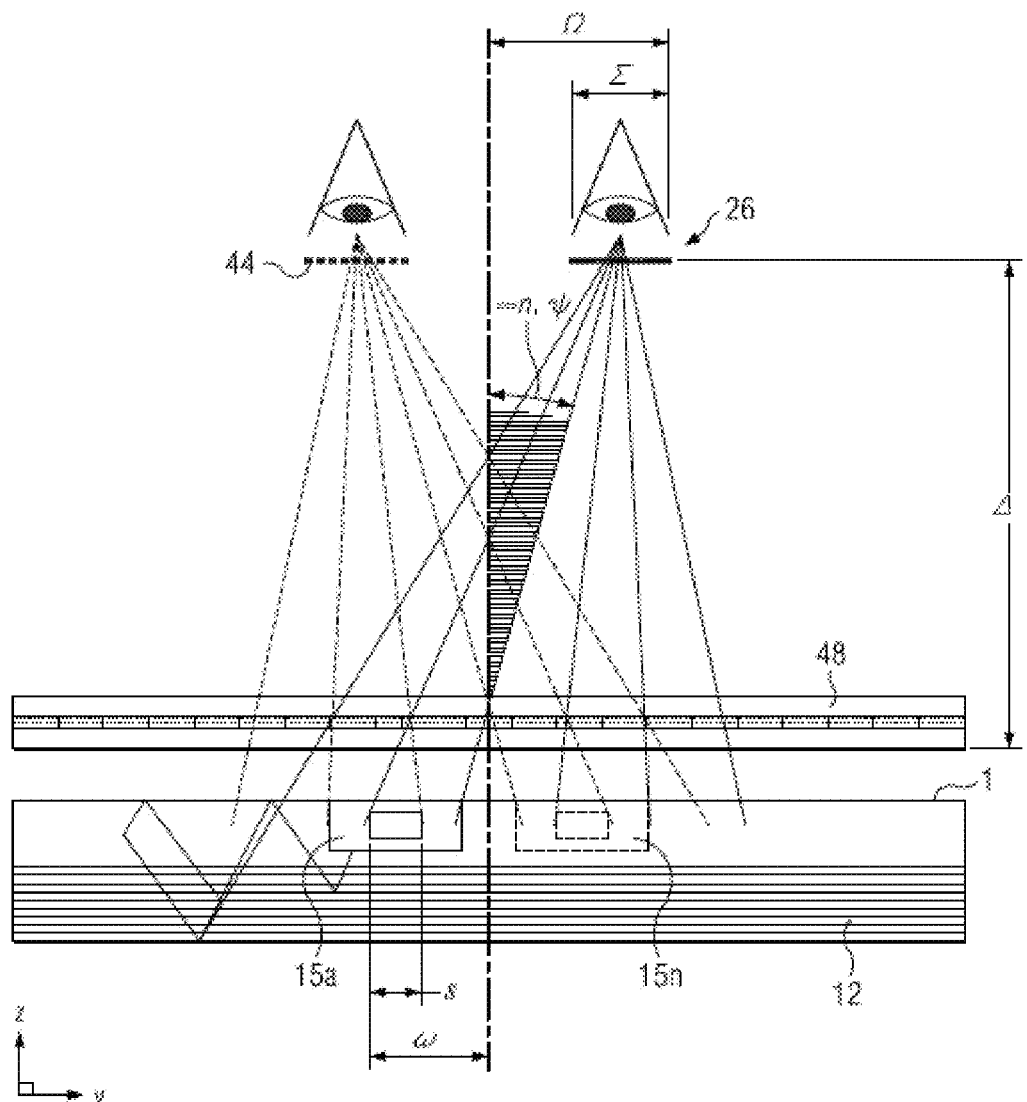
FIG. 2A is a schematic diagram illustrating in a top view of light propagation in another embodiment of a directional display device, in accordance with the present disclosure.
Figure 2B:
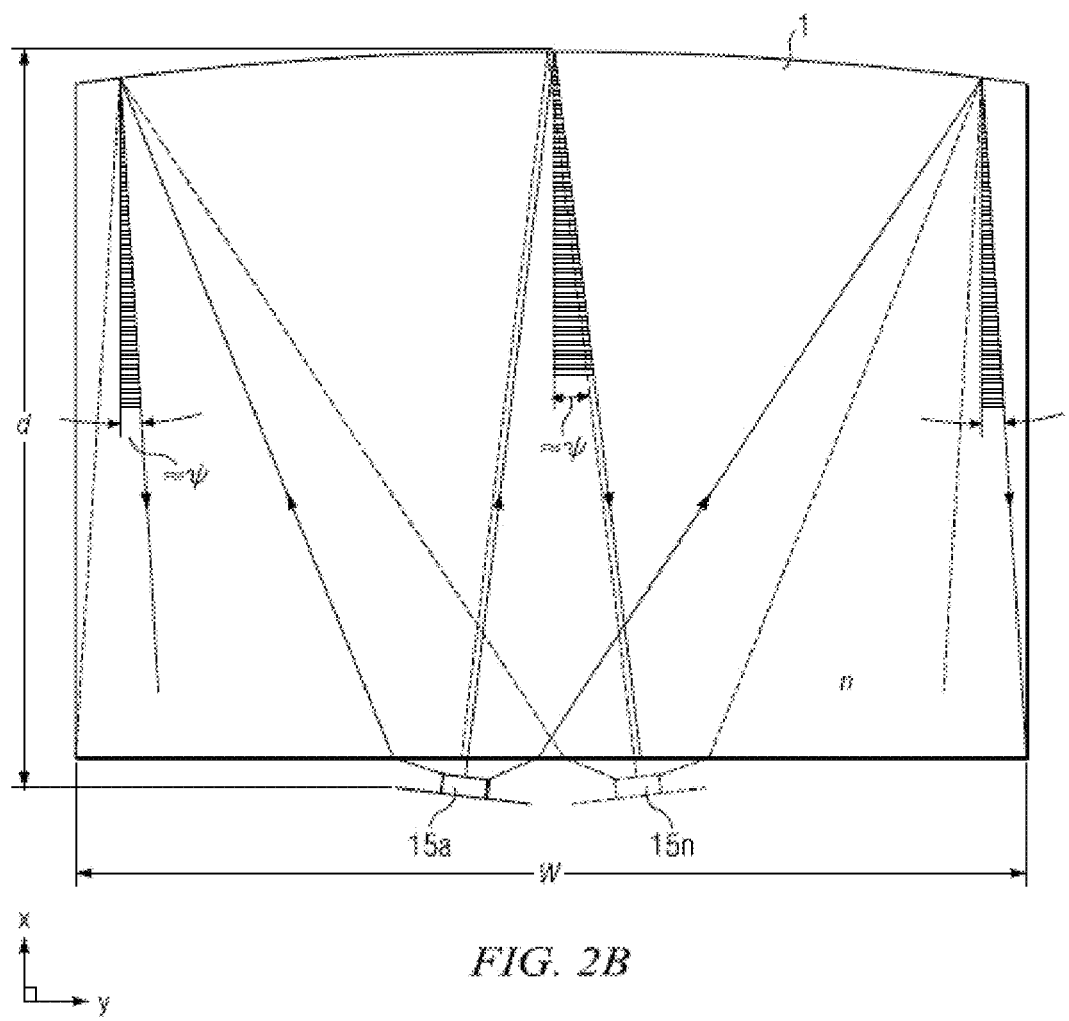
FIG. 2B is a schematic diagram illustrating light propagation in a front view of the directional display device of FIG. 2A, in accordance with the present disclosure.
Figure 2C:
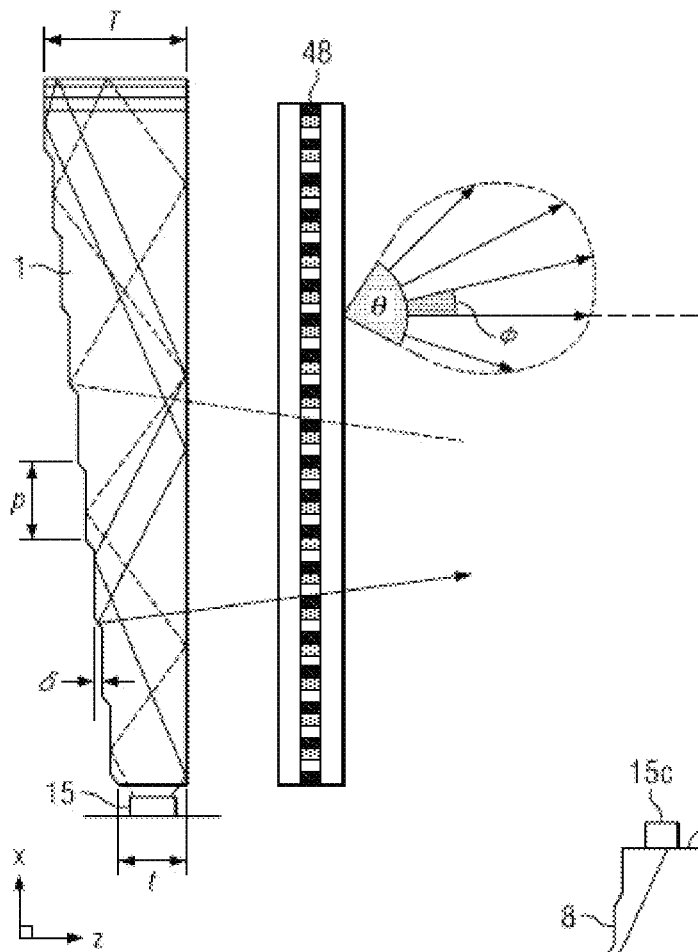
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLAT 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide 1. In other words, the reflective end may have positive optical power in a direction extending between sides of the waveguide that extend between the first and second guide surfaces and between the input end and the reflective end. The light extraction features 12 may have positive optical power in a direction between sides of the waveguide that extend between the first and second guide surfaces 6, 8 and between the input end 2 and the reflective end.

The waveguide 1 may further comprising a reflective end 4 for reflecting input light from the light sources back along the waveguide 1, the second guide surface 8 being arranged to deflect the reflected input light through the first guide surface 6 as output light, and the waveguide 1 being arranged to image the light sources 15a-n so that the output light from the light sources is directed into respective optical windows 26a-n in output directions that are distributed laterally in dependence on the input positions of the light sources.

In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a hive that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
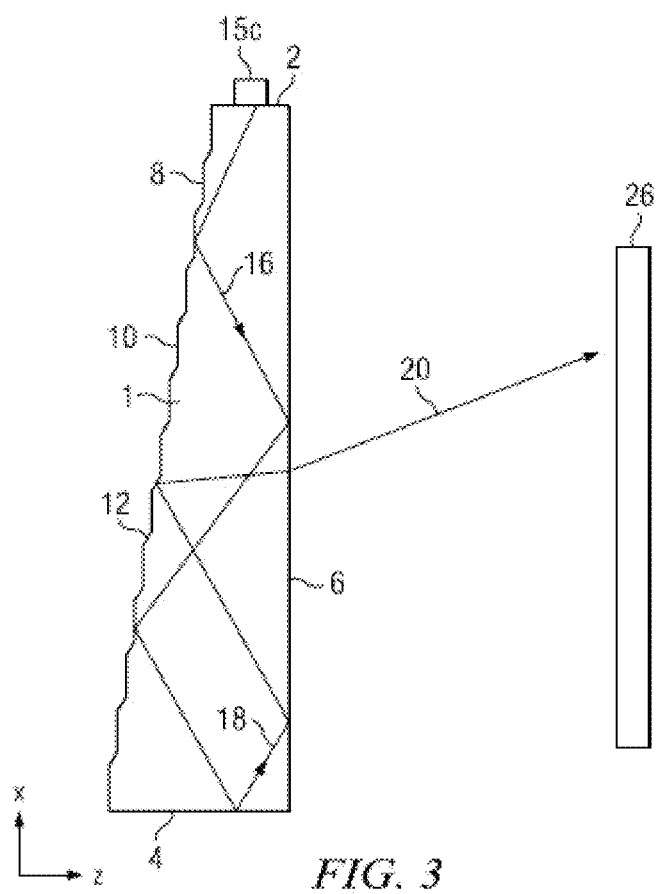
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
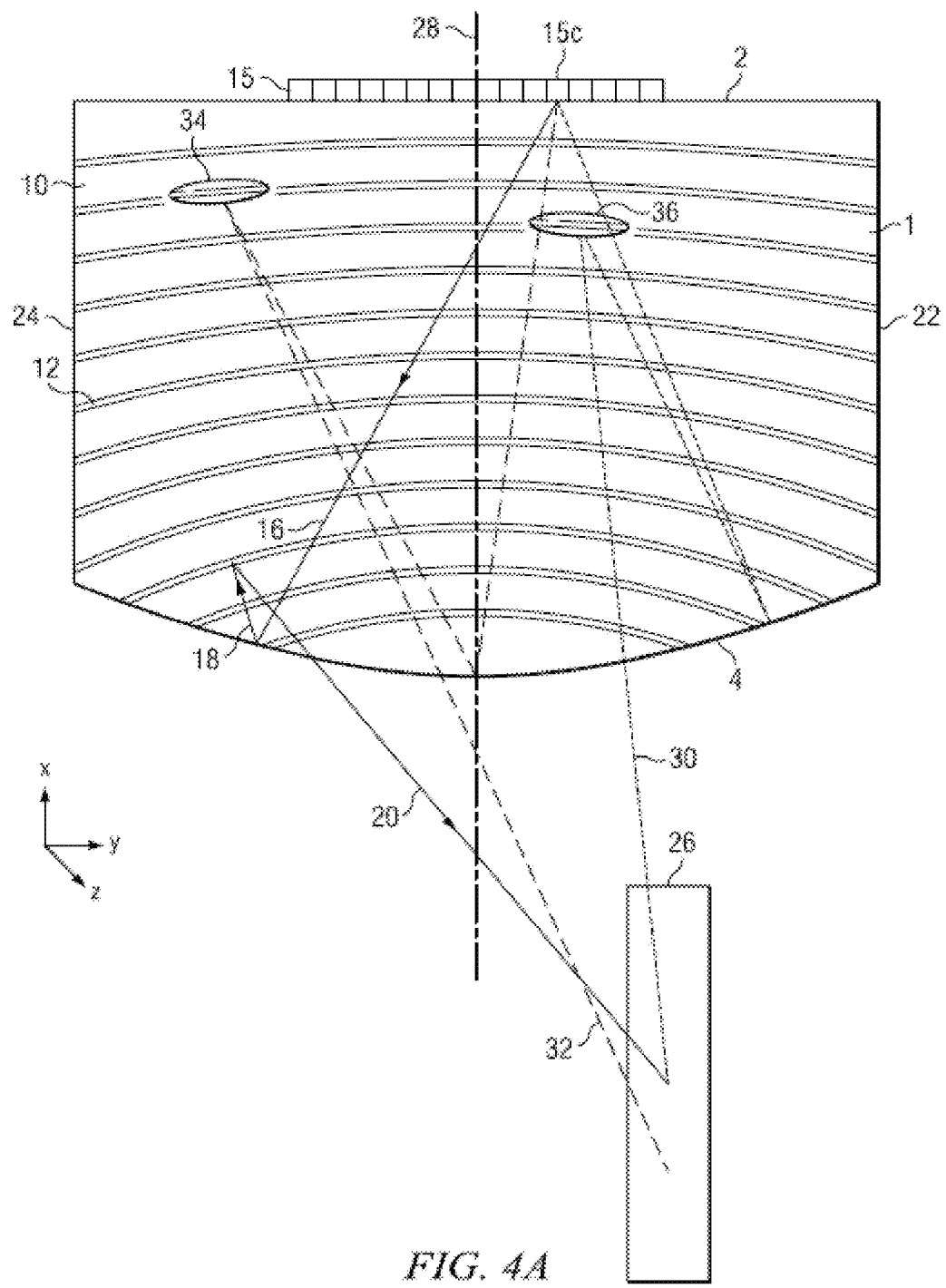
FIG. 4A is schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
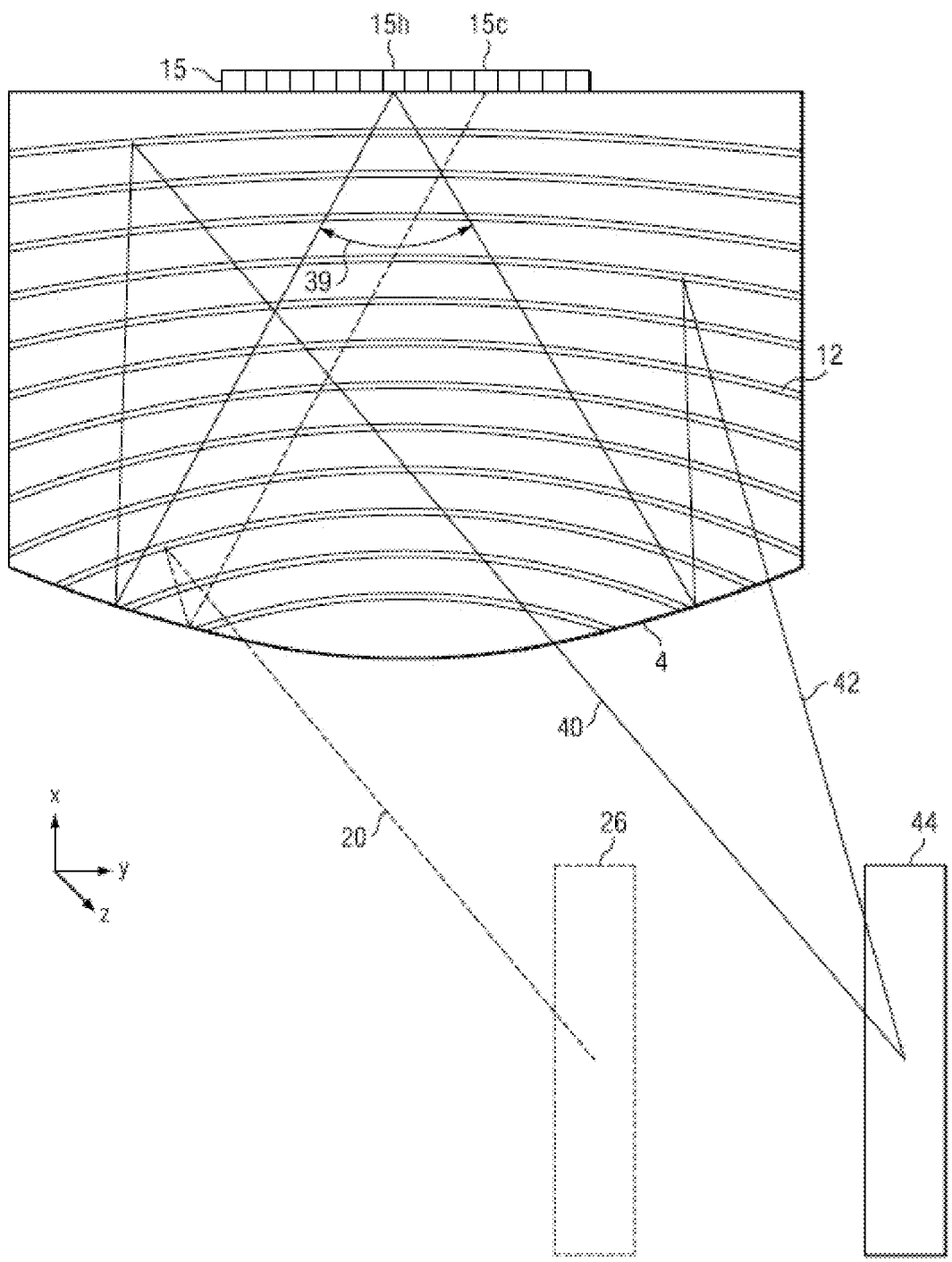
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A, The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
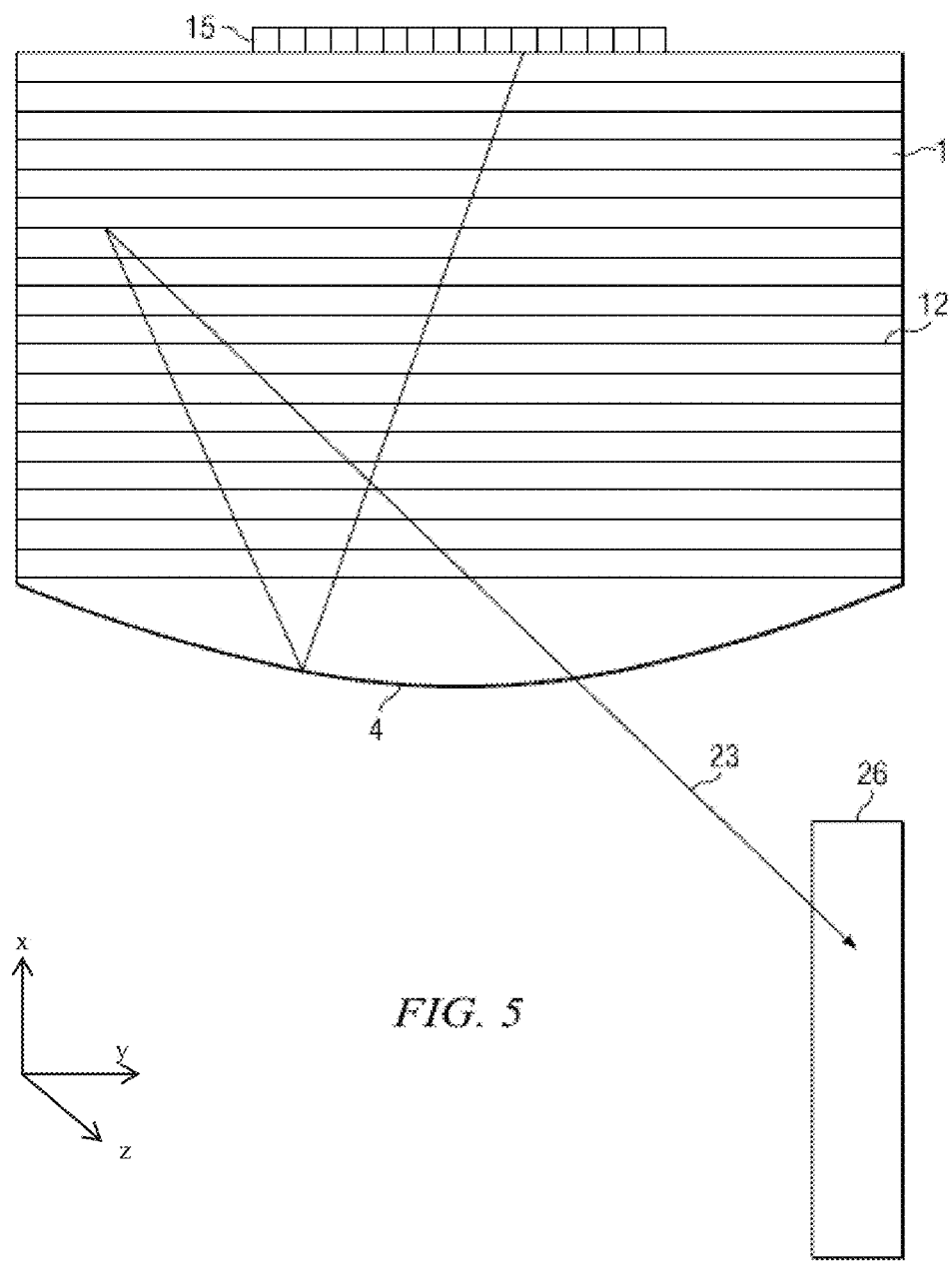
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
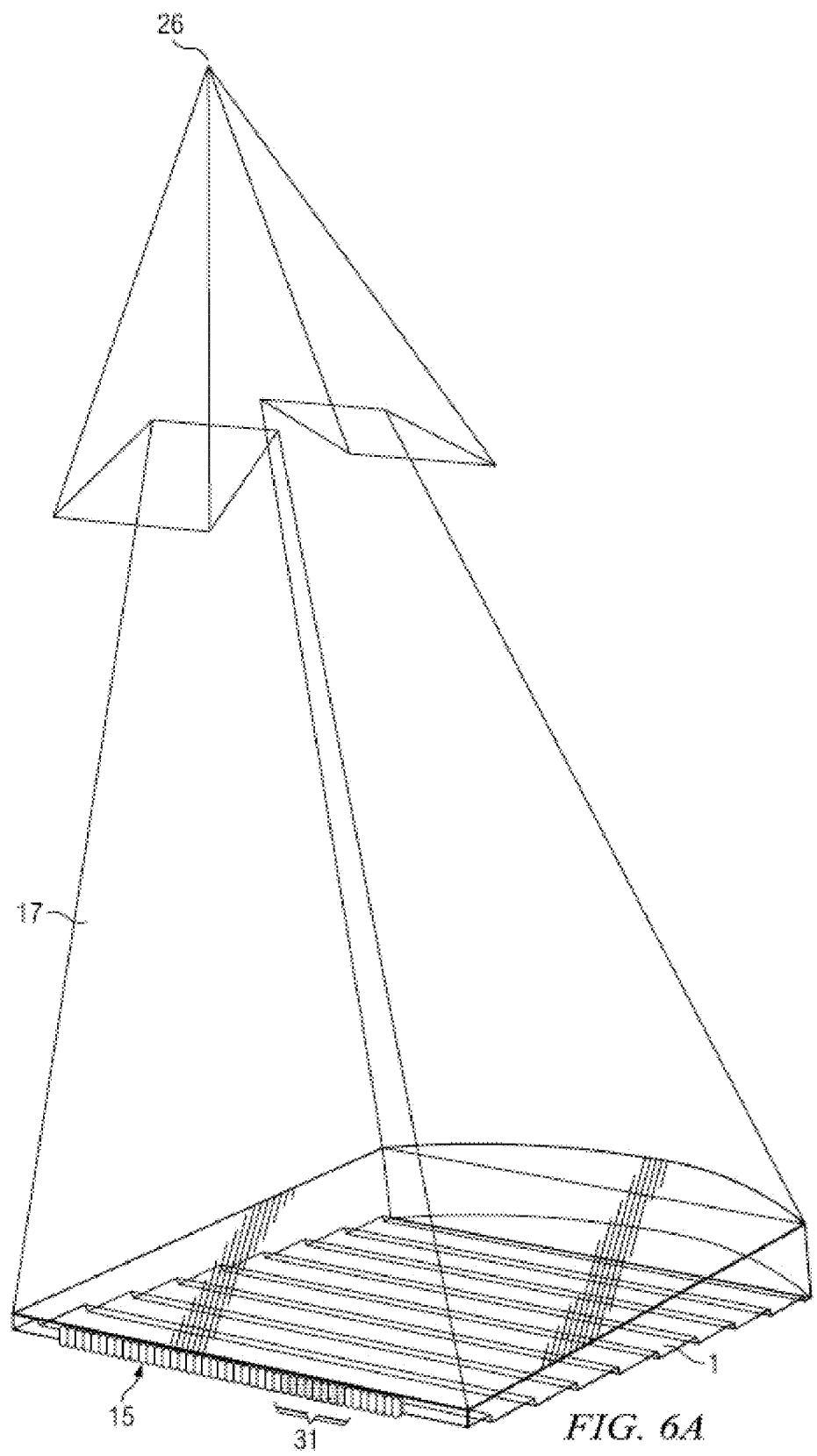
FIG. 6A is a schematic diagram illustrating one embodiment of the generation of a first viewing window in a time multiplexed directional display device in a first time slot, in accordance with the present disclosure.
Figure 6B:
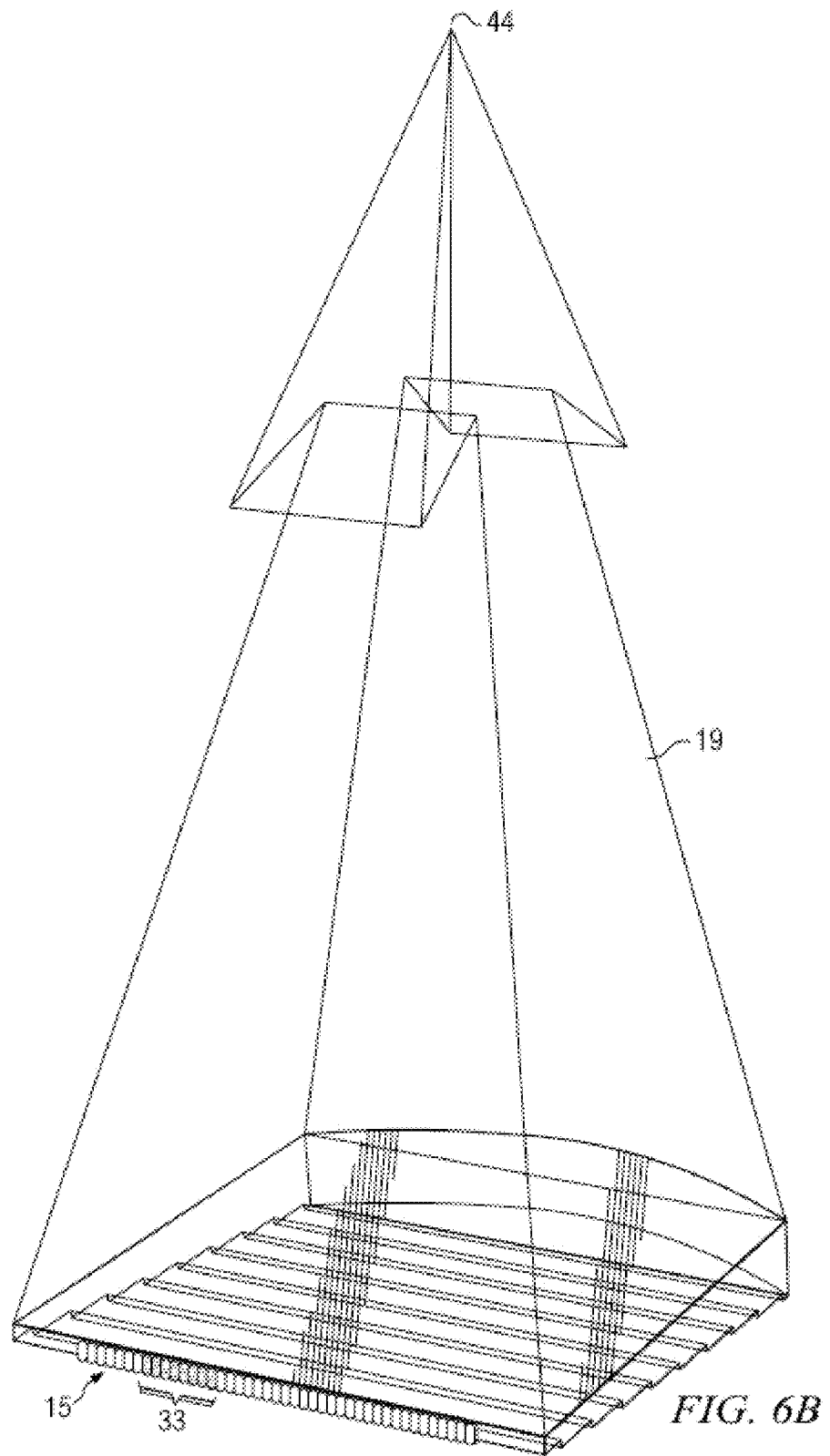
FIG. 6B is a schematic diagram illustrating another embodiment of the generation of a second viewing window in a time multiplexed directional display device in a second time slot, in accordance with the present disclosure.
Figure 6C:
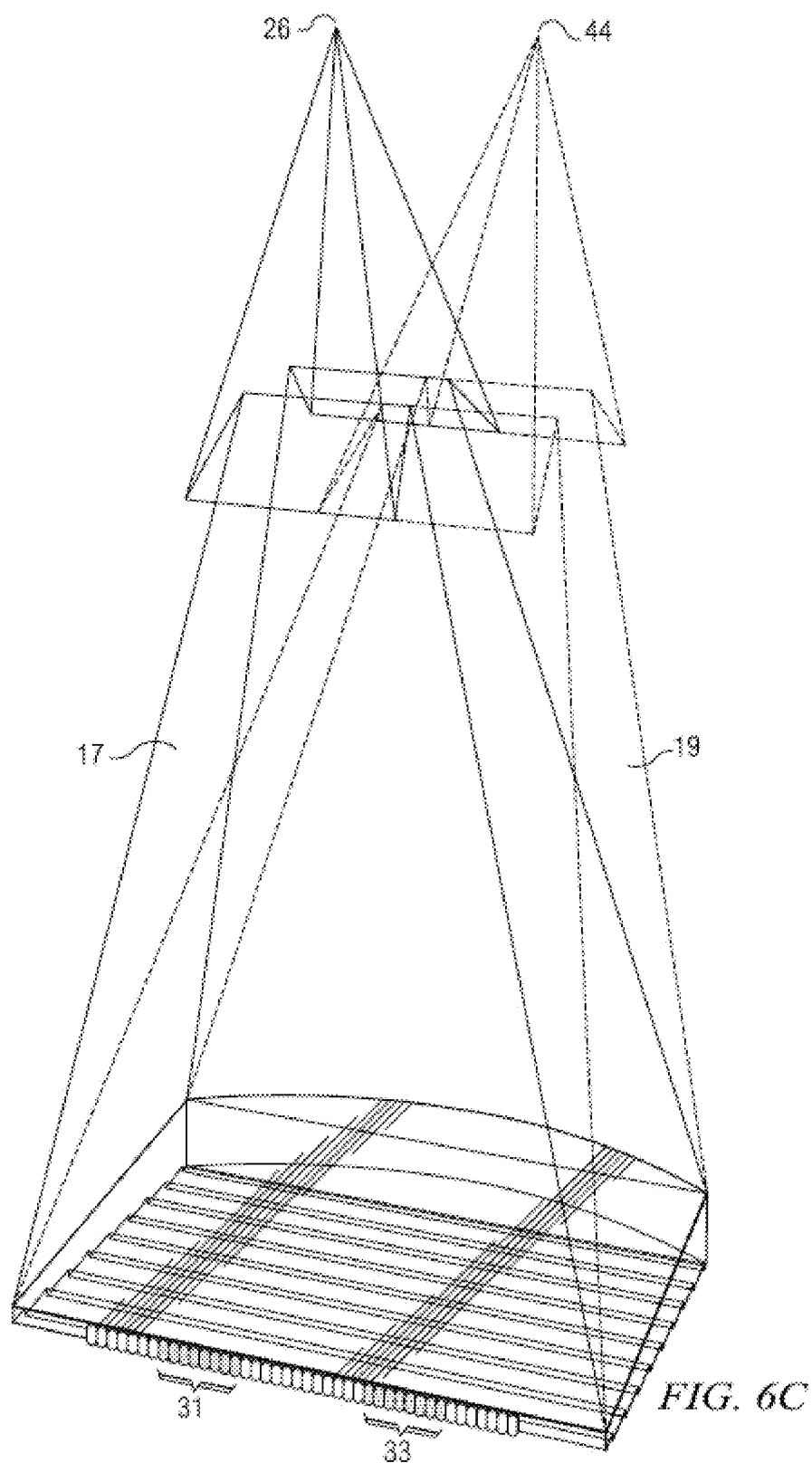
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15a to 15n, where n is an integer greater than one.

Figure 7:
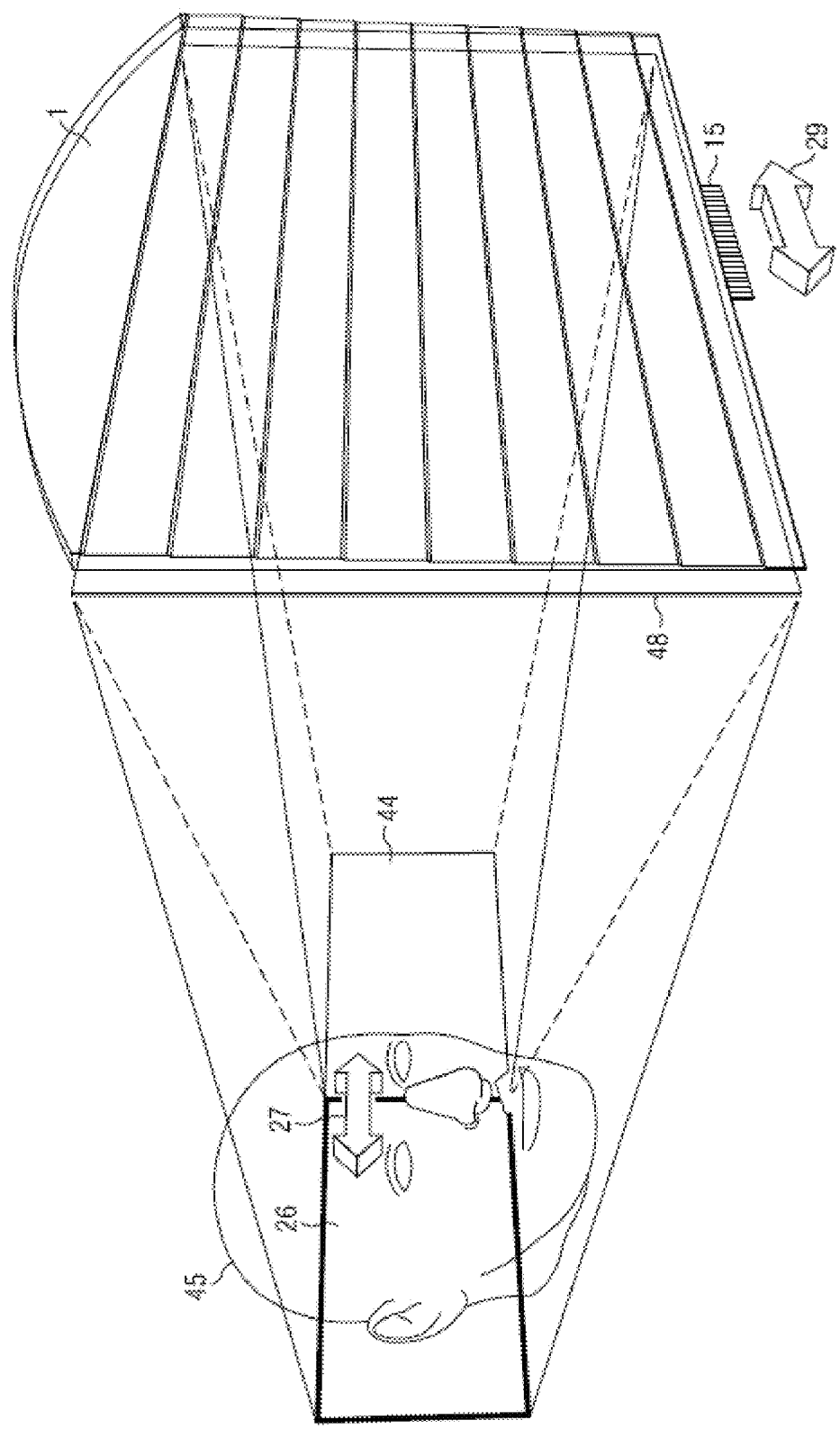
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15a to 15n along axis 29 provides for directional control of viewing windows. The head position of the primary observer 45 may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head of snooper 47 not shown in FIG. 7) and may supply the same left and right eye images to each viewers' left and right eyes providing 3D to all viewers. Again similar operation can be achieved with all the directional backlights described herein.

Figure 8:
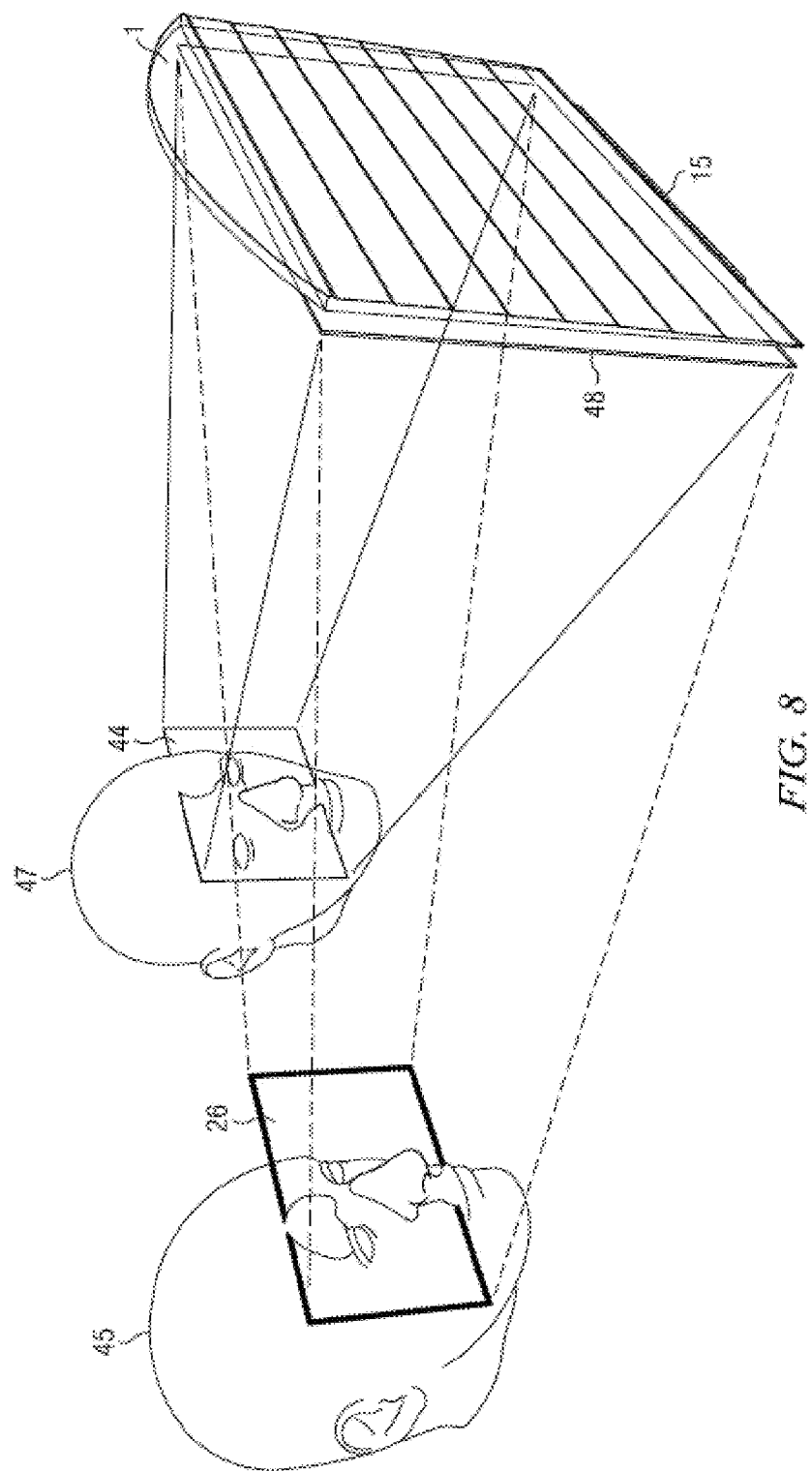
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
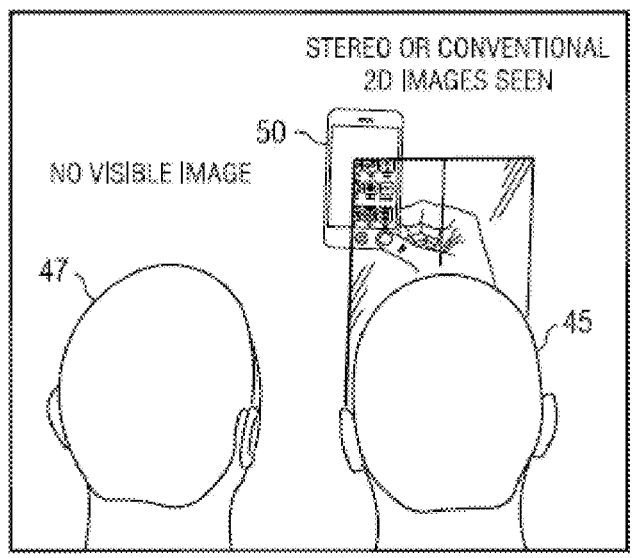
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first observer 45 as shown in FIG. 9. Further, as illustrated in FIG. 9, although first observer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
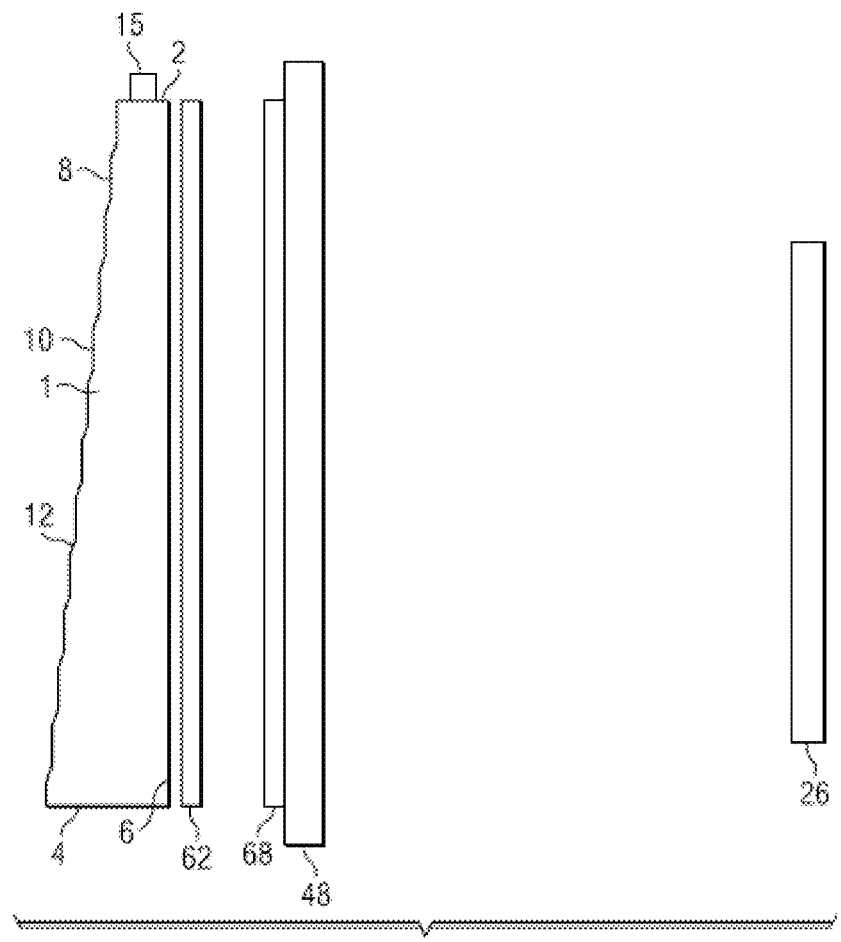
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS seamier. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 11:
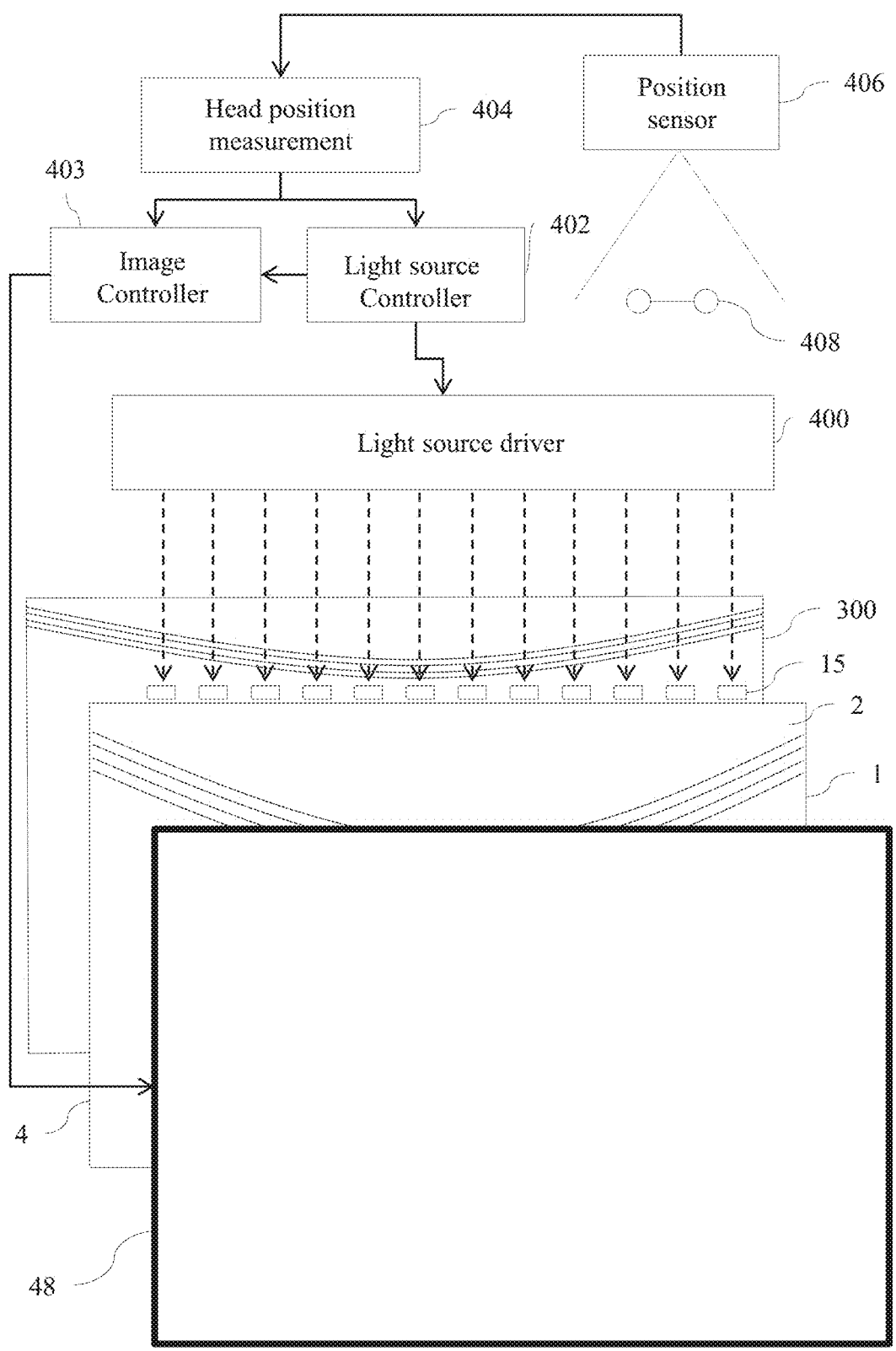
FIG. 11 is a schematic diagram illustrating a directional display apparatus comprising a directional display device and a control system, in accordance with the present disclosure.

FIG. 11 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronization with the illumination of the light sources of the array 15.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 1 may be achieved to correspond with the viewer position so that a first image may be directed to the observer's right eye in a first phase and directed to the observer's left eye in a second phase.

Thus a directional display apparatus may comprise a directional display device and a control system arranged to control the light sources 15a-n.

Figure 12A:
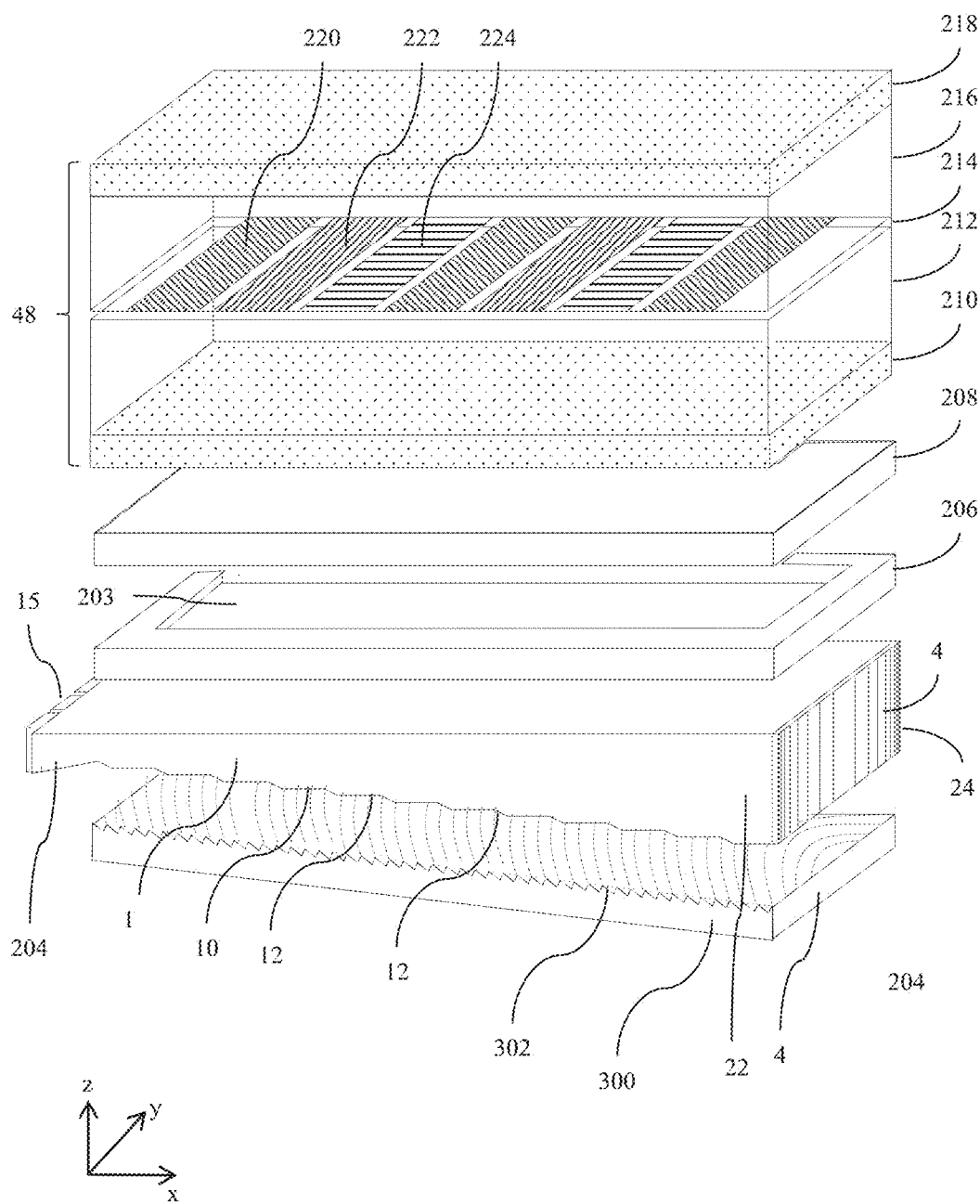
FIG. 12A is a schematic diagram illustrating a perspective view of a directional display apparatus optical stack comprising a directional waveguide with light input at a side that is opposite a reflective side, in accordance with the present disclosure.

FIG. 12A is a schematic diagram illustrating a perspective view of a directional display apparatus optical stack comprising a directional waveguide with light input at a side that is opposite a reflective side.

Reflective end 4 may be provided by a Fresnel mirror. Further taper region 204 may be arranged at the input to the waveguide 1 to increase input coupling efficiency from the light sources 15a-15n of the array of illuminator elements 15 and to increase illumination uniformity. Shading layer 206 with aperture 203 may be arranged to hide light scattering regions at the edge of the waveguide 1. Rear reflector 300 may comprise facets 302 that are curved and arranged to provide viewing windows from groups of optical windows provided by imaging light sources of the array 15 to the window plane. An optical stack 208 may comprise reflective polarizers, retarder layers and diffusers. Rear reflectors 300 and optical stack 208 are described further in U.S. Pat. No. 10,054,732 incorporated herein by reference in its entirety.

Spatial light modulator 48 may comprise a liquid crystal display that may comprise an input polarizer 210, TFT glass substrate 212, liquid crystal layer 214, color filter glass substrate 216 and output polarizer 218. Red pixels 220, green pixels 222 and blue pixels 224 may be arranged in an array at the liquid crystal layer 214. White, yellow, additional green or other color pixels (not shown) may be further arranged in the liquid crystal layer to increase transmission efficiency, color gamut or perceived image resolution.

Figure 12B:
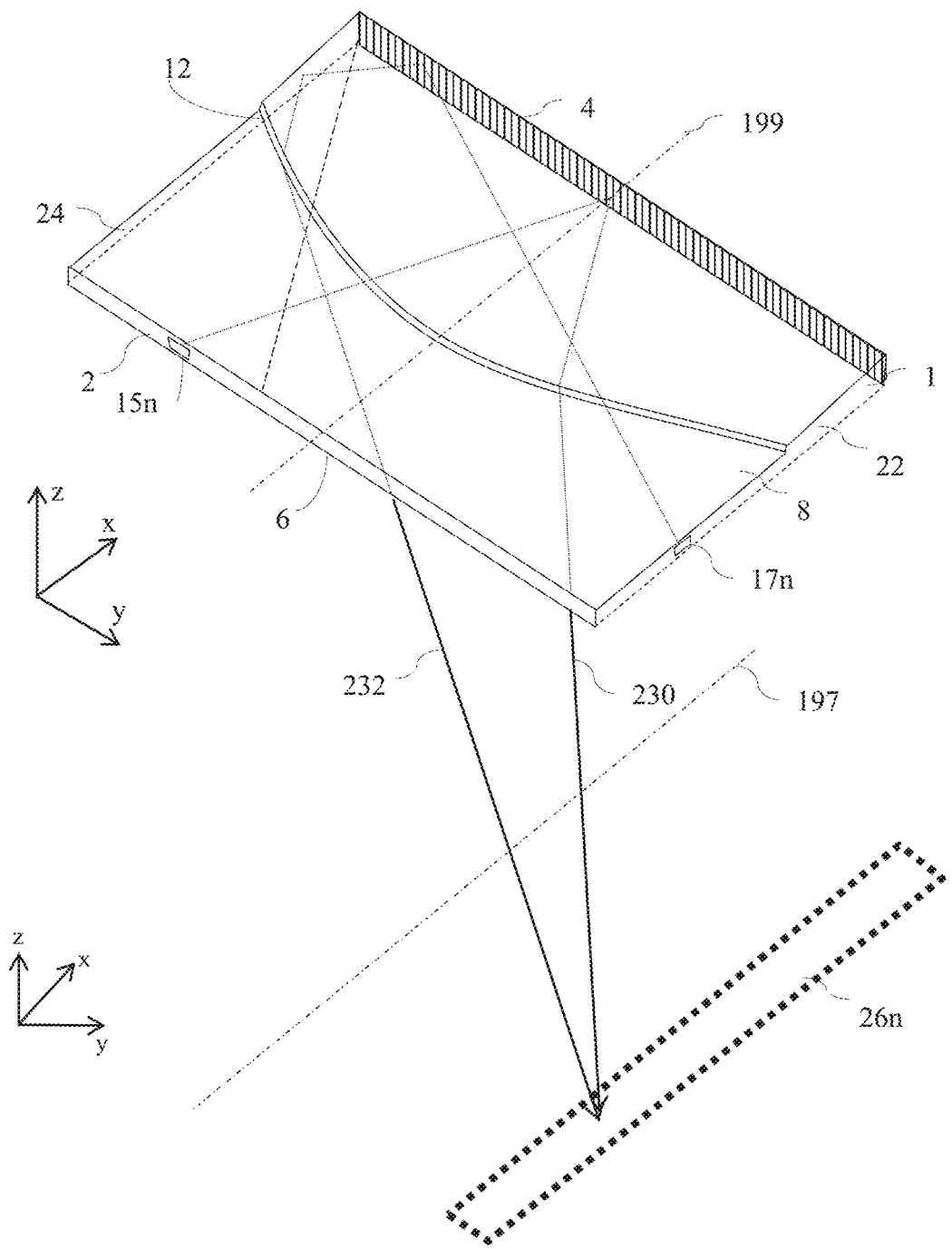
FIG. 12B is a schematic diagram illustrating a perspective view of the formation of optical windows by a directional display apparatus comprising a directional waveguide with light input at a side that is opposite a reflective side, in accordance with the present disclosure.

FIG. 12B is a schematic diagram illustrating a perspective view of the formation of optical windows by a directional display apparatus comprising a directional waveguide with light input at a side that is opposite a reflective side. The input surface 2 may thus be an end of the waveguide 1 may be opposite to the reflective end.

Figure 12C:
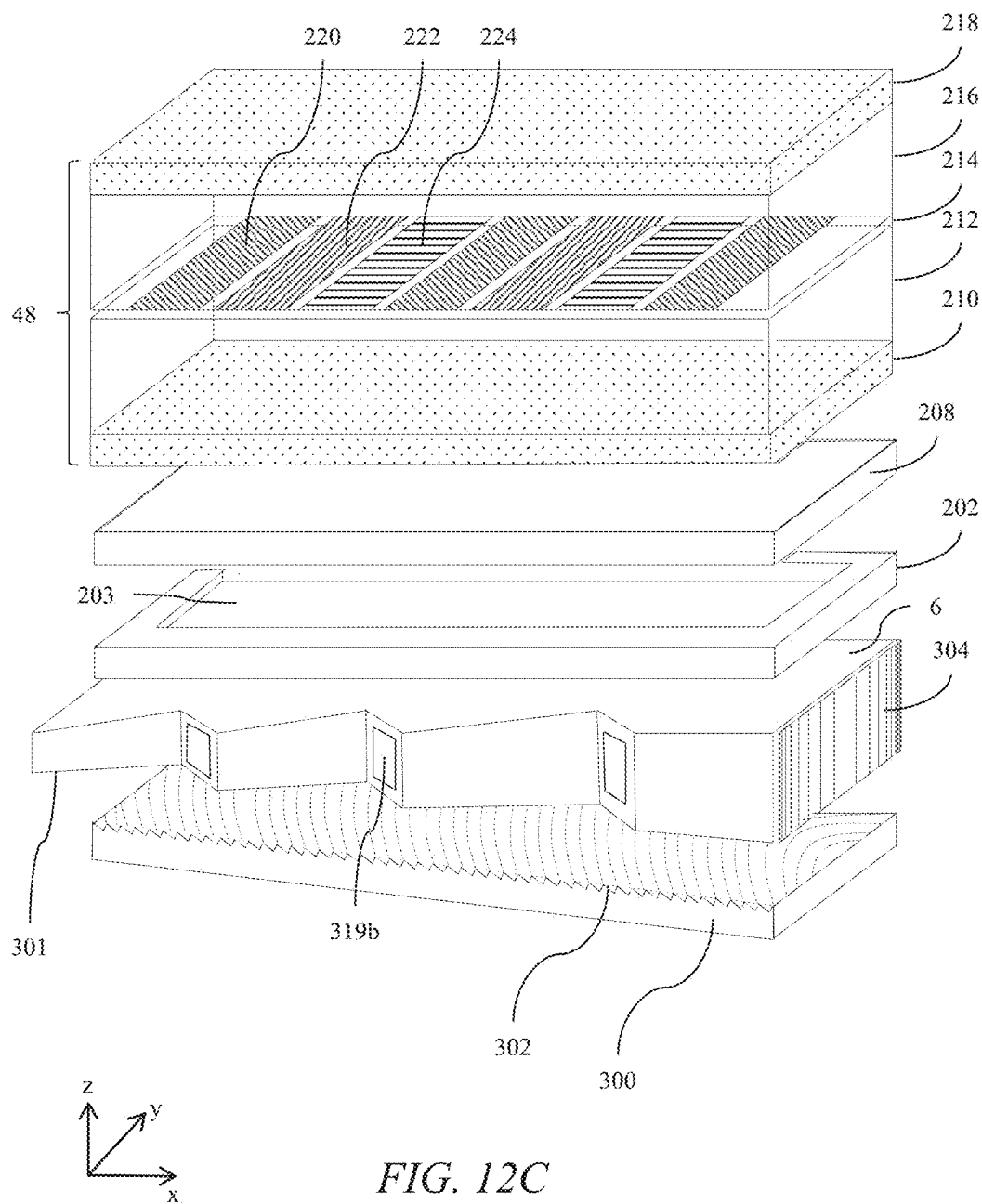
FIG. 12C is a schematic diagram illustrating a perspective view of a directional display apparatus optical stack comprising a directional waveguide with light input at a side that is adjacent a reflective side, in accordance with the present disclosure.

FIG. 12C is a schematic diagram illustrating a perspective view of a directional display apparatus optical stack comprising a directional waveguide with light input at a side that is adjacent a reflective side as described elsewhere in U.S. Patent Publ. No. 2016-0349444, entitled "Wide angle imaging directional backlights," filed May 26, 2016 and incorporated by reference herein in its entirety. Waveguide 301 comprises input sides 322, 324 with aligned light sources 317a-n and 319a-n on respective sides. End 302 opposite reflective end 304 may be arranged to be absorbing or reflective to provide low levels of cross talk or increased efficiency respectively.

Figure 13:
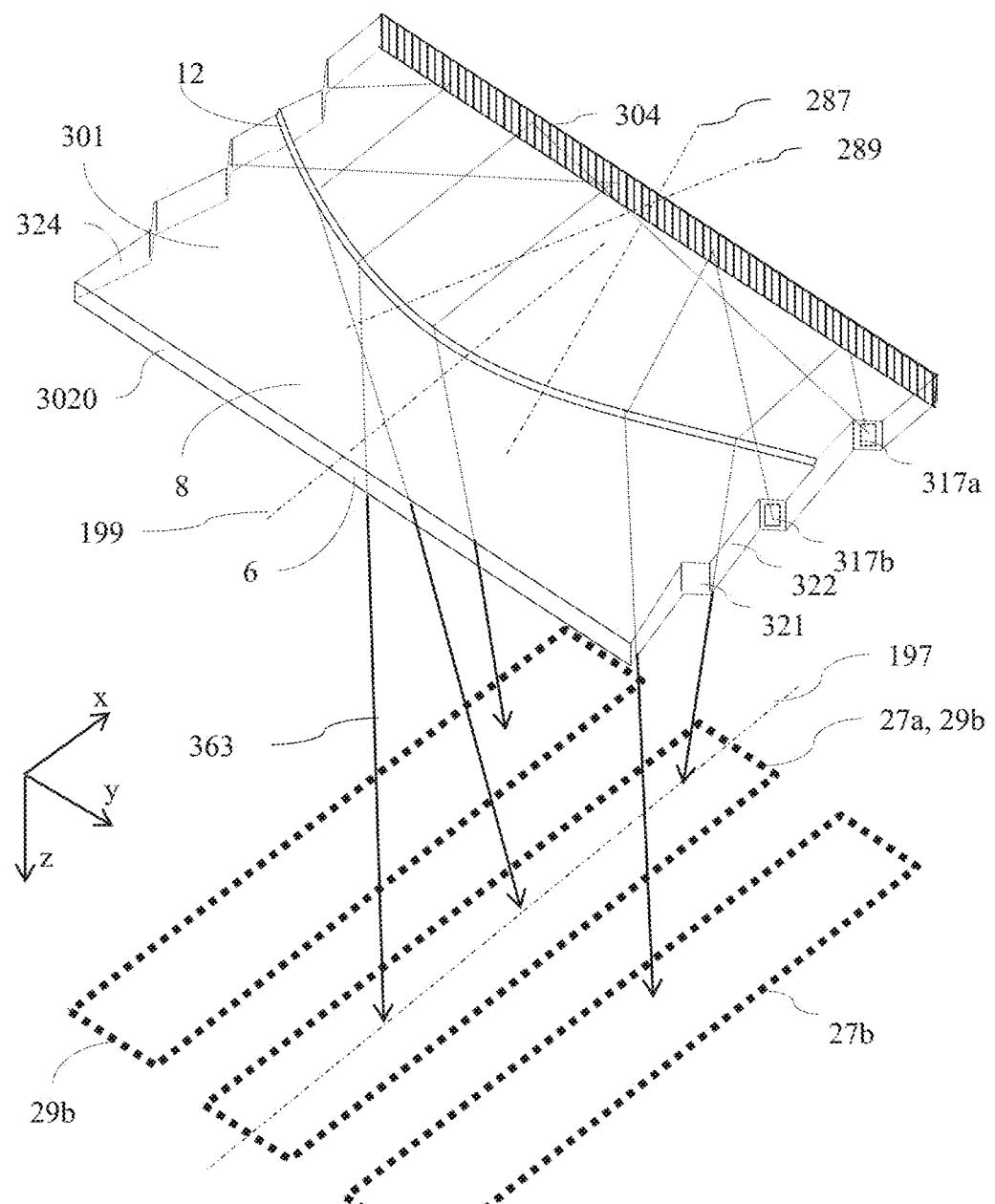
FIG. 13 is a schematic diagram illustrating a perspective view of the formation of optical windows by a directional display apparatus comprising a directional waveguide with light input at a side that is adjacent a reflective side, in accordance with the present disclosure.

FIG. 13 is a schematic diagram illustrating a perspective view of the formation of optical windows by a directional display apparatus comprising a directional waveguide with light input at a side that is adjacent a reflective side. Light sources 317a-n and 319a-n at input facets 321 are arranged to provide optical windows 27a-n and 29a-n respectively about an axis 197. Fresnel mirror 304 is arranged with first and second optical axes 287, 289. The input surface may thus be a side surface 322 of the waveguide 301 extending away from the reflective end 304 towards a thinner end 3020.

A directional backlight thus comprises a first guide surface 6 arranged to guide light by total internal reflection and the second guide surface 8 comprising a plurality of light extraction features 12 oriented to direct light guided along the waveguide 1, 301 in directions allowing exit through the first guide surface 6 as the output light and intermediate regions 10 between the light extraction features 12 that are arranged to guide light along the waveguide 1, 301.

Considering the arrangements of FIGS. 12A-C and FIG. 13, the second guide surface 6 may have a stepped shape in which said light extraction features 12 are facets between the intermediate regions 10. The light extraction features 12 may have positive optical power in a direction between the side surfaces 22, 24 or 322, 324 of the waveguide 1, 301 that extend between the first and second guide surfaces 6,8. The reflective end 4, 304 may have positive optical power in a direction extending between the sides 22, 24 or 322, 324 of the reflective end 4, 304 that extend between the first and second guide surfaces 6, 8.

Thus all sides 2, 4, 6, 8, 22, 24 provide reflections to achieve uniform illumination and low cross talk in privacy mode of operation. If features are applied to many areas of the surface then non-uniformities may be provided due to the spatial location of the waveguide extraction loss at the features.

Thus a directional display device may comprise a waveguide wherein the input surface 322 is a surface of a side of the waveguide 1 extending away from the reflective end 304.

Various terms related to retardation components of liquid crystal displays will now be described.

In the present embodiments, slow axis typically refers to the orientation orthogonal to the normal direction in which linearly polarized light has an electric vector direction parallel to the slow axis travels at the slowest speed. The slow axis direction is the direction of this light with the highest refractive index at the design wavelength.

For positive dielectric anisotropy uniaxial birefringent materials the slow axis direction is the extraordinary axis of the birefringent material. The ordinary axes in such materials are typically parallel to the normal direction, and orthogonal to the normal direction and the slow axis.

The terms half a wavelength and quarter a wavelength refer to the operation of a retarder for a design wavelength $\lambda_0$ that may typically be between 500 nm and 570 nm. The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{eqn. 1}$$

where $\Delta n$ is defined as the difference between the extraordinary and the ordinary index of refraction, i.e.

$$\Delta n = n_e - n_o \qquad \text{eqn. 2}$$

For a half wave retarder, the relationship between d, $\Delta n$, and $\lambda_0$ is chosen so that the phase shift between polarization components is $\Gamma = \pi$. For a quarter wave retarder, the relationship between d, $\Delta n$, and $\lambda_0$ is chosen so that the phase shift between polarization components is $\Gamma = \pi/2$.

The term half wave retarder herein typically refers to light propagating normal to the retarder and normal to the spatial light modulator.

In the present disclosure an 'A-plate' refers to an optical retarder utilizing a layer of birefringent material with its optical axis parallel to the plane of the layer. The plane of the retarders refers to the slow axis of the retarders extend in a plane, that is the x-y plane.

A positive A-plate refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plates, i.e. C-plates with a positive $\Delta n$.

In the present disclosure an 'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with an optical thickness $\Delta n \cdot d$ that varies with wavelength $\lambda$ as $$\Delta n \cdot d / \lambda = k \qquad \text{eqn. 3}$$

where k is substantially a constant. Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

Homogeneous alignment refers to the alignment of liquid crystals in a switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which a rod-like liquid crystalline molecules aligns substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod like molecules have a positive birefringence so that $n_e > n_o$ as described in equation 2. Discotic molecules have negative birefringence so that $n_e < n_o$.

Positive retarders such as A-plates, positive O-plates and positive C-plates may typically be provided by stretched films or rod like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pretilted homeotropic alignment, the alignment layers may have components that are substantially parallel or antiparallel. Hybrid aligned liquid crystal cells may have one homogeneous alignment layer and one homeotropic alignment layer.

Twisted liquid crystal cells may be provided by alignment layers that do not have parallel alignment, for example oriented at 90 degrees to each other.

Crossed A-plates, C-plates and O-plates are known retarder elements for use in LCD to compensate for contrast degradations for off-axis viewing locations, for example European Patent Publ. No. EP 1726987, herein incorporated by reference in its entirety.

Thus in prior art arrangements crossed A-plates, C-plates and O-plates may be provided between an input polariser and an output polariser to operate in cooperation with a liquid crystal layer that is also arranged between the input and output polarisers. In such prior art arrangements, said retarders are arranged to provide compensation for the variation in birefringence of liquid crystal molecules with viewing angles. Such compensation is arranged to provide increased display contrast for off-axis viewing locations. The contrast viewing angle properties of the display may thus be increased.

It would be desirable to provide a switchable directional display with (i) a wide angle mode that can be observed from a wide range of viewing directions and (ii) a privacy mode of operation in which the display can be seen with high image fidelity for a primary user and has low image visibility for a snooper at viewing locations that are different to the intended location for the primary user.

Figure 14:
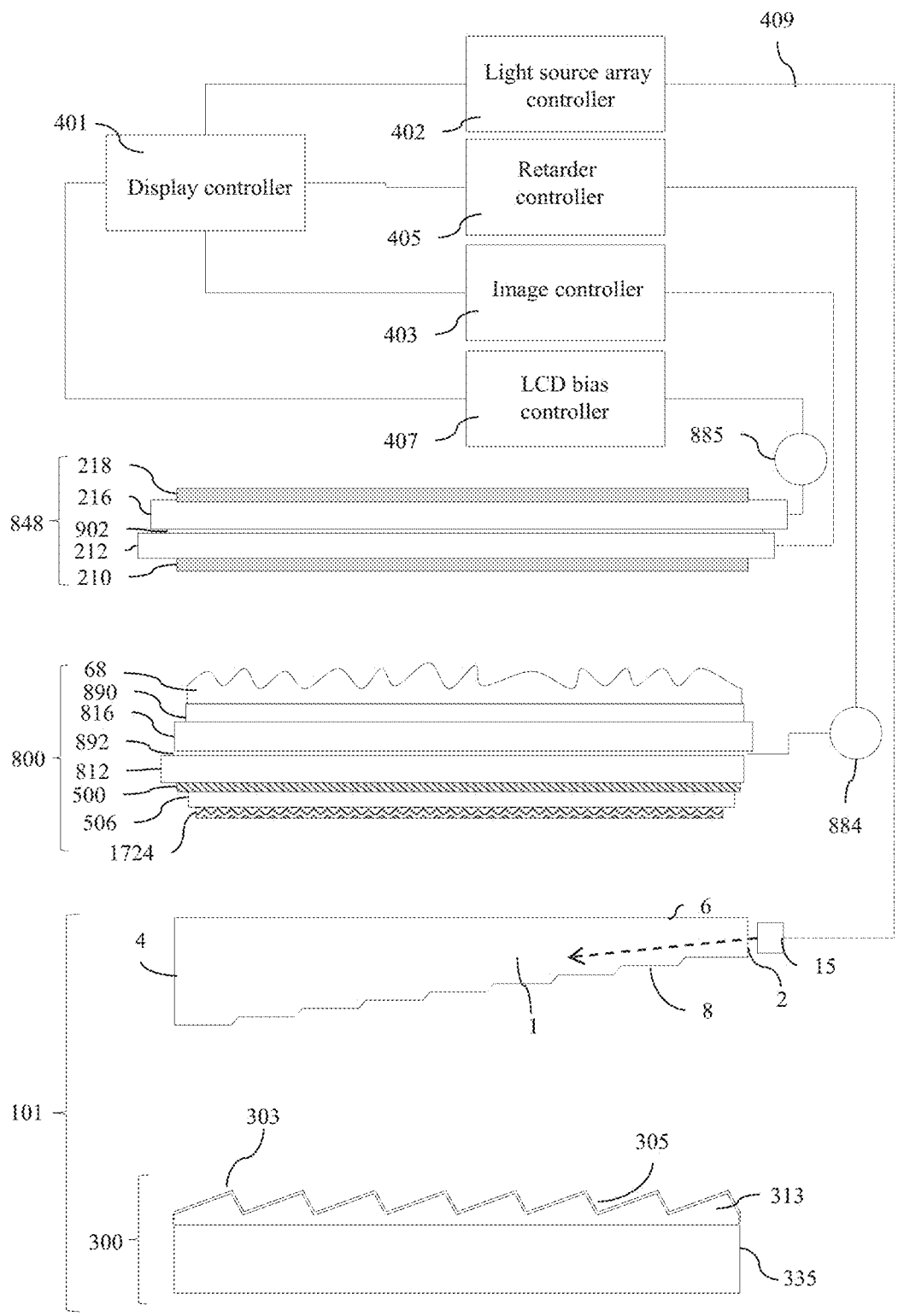
FIG. 14 is a schematic diagram illustrating in side view optical stacking and control of a switchable privacy display, in accordance with the present disclosure.

FIG. 14 is a schematic diagram illustrating in side view optical stacking and control of a switchable privacy display. Spatial light modulator 848 is illuminated by directional backlight 101 that comprises a directional waveguide 1 and rear reflector 300.

An off-axis luminance control optical stack 800 may comprise an additional polariser 500 that may be a reflective polariser; substrates 812, 816 for a switchable liquid crystal layer 892; compensation retarder 890, diffuser 68. The switchable liquid crystal layer 892 may be driven by voltage driver 884 and electrodes arranged on substrates 812, 816.

The operation and selection of the switchable liquid crystal layer 892 and compensation retarder 890 is described further in PCT Appl. No. PCT/US18/31206, filed Sep. 4, 2018, entitled "Optical stack for imaging directional backlights", which is incorporated by reference herein in its entirety. Polarisation recirculation schemes that include retarders 506 and diffusers 1724 are described further U.S. Patent Publ. No. 2018-0196275, filed Jan. 3, 2018, entitled "Optical stack for imaging directional backlights", which is incorporated by reference herein in its entirety.

By way of comparison to the liquid crystal layer 214 of the spatial light modulator 48 of FIG. 12A, the liquid crystal layer 902 of spatial light modulator 848 of the present embodiments is provided with a bias control as will be described herein.

Display controller 401 is arranged to provide control signals to light source array controller 402, retarder controller 405, image controller 403 and LCD bias controller 407.

In the present embodiment, the control lines 409 from the individual controllers to the respective controlled elements of the switchable privacy display are illustrated by solid lines if in operation the component is typically operated in a single phase of operation; and by dashed lines if in operation the component is typically operated in at least two phases of operation.

Thus in the present embodiment of FIG. 14, the light source array controller 402 may be arranged to provide at least two different illumination profiles to the light source array 15 in separate phases of operation of the display as will be described further herein. Further the image controller 403 may be arranged to provide at least two different images to the spatial light modulator 848 in separate phases of operation of the display as will be described further herein.

By way of comparison the retarder controller 405 and LCD bias controller 407 may be arranged to provide a first signal to the off-axis luminance control optical stack 800 and spatial light modulator 848 bias electrodes in a wide angle mode of operation, and a second different signal in a privacy mode of operation as will be described further herein.

The operation of various retarder layers in the switchable privacy display of FIG. 14 will now be described when the controllers 401, 402, 403, 405, 407 are arranged to provide, for a wide angle mode of operation.

Figure 15A:
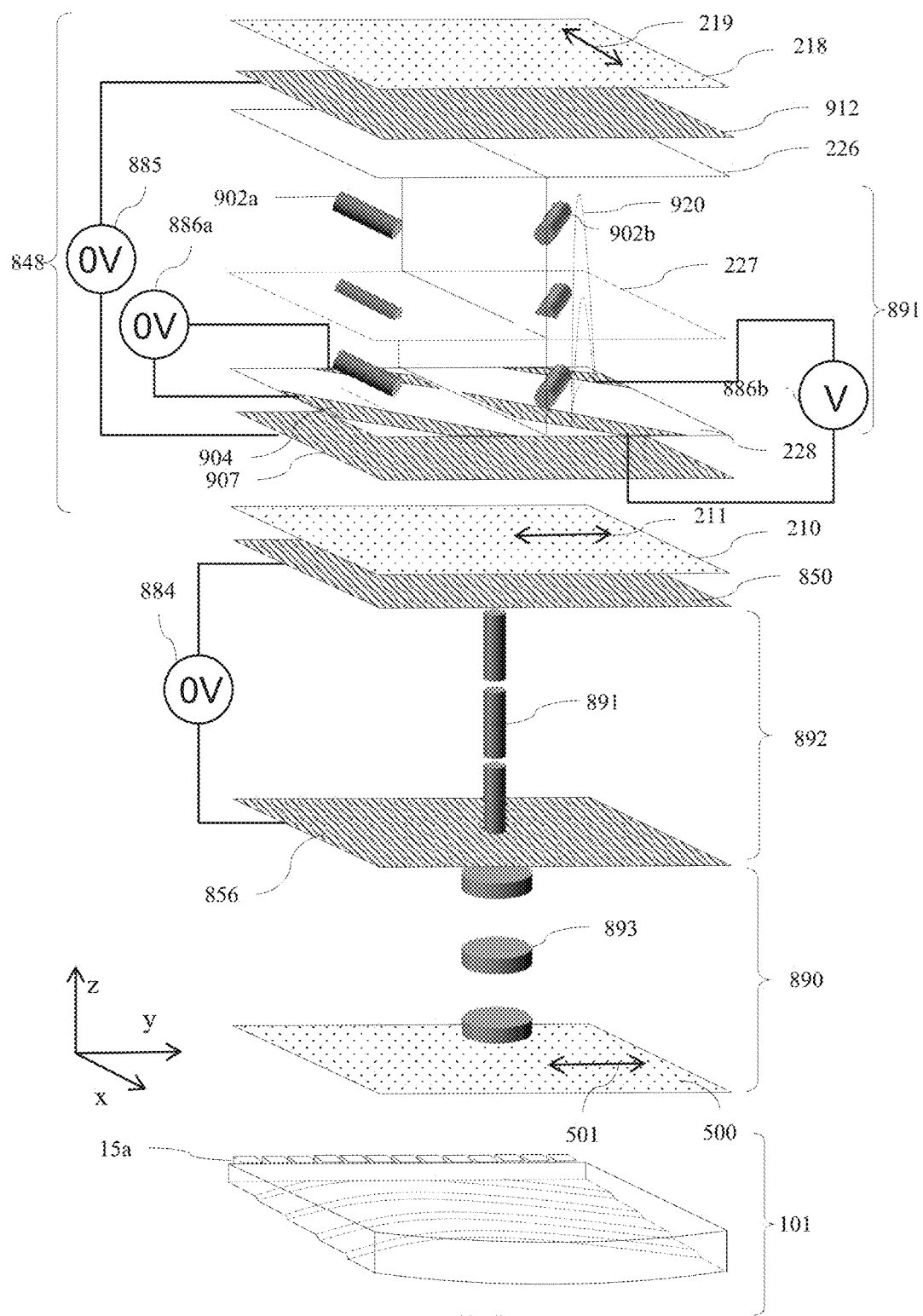
FIG. 15A is a schematic diagram illustrating in perspective side view an arrangement of retarder layers and directional waveguide illumination in a switchable privacy display in a wide angle mode of operation, in accordance with the present disclosure.

FIG. 15A is a schematic diagram illustrating in perspective side view an arrangement of retarder layers and directional waveguide illumination in a switchable privacy display in a wide angle mode of operation.

Directional illuminator 101 is provided by rear reflector 300 (not shown) and directional waveguide 1 that is illuminated by an extended array 15a of light emitting elements arranged across the whole of the input side 2 of the waveguide 1, thus providing a wide angle illumination profile by means of providing multiple optical windows 26 as illustrated in FIG. 12B.

Compensator retarder 890 comprising a negative C-plate birefringent molecules 893 is arranged to receive polarised light with polarisation orientation 501 from additional polariser 500. The operation and various arrangements of the compensation retarder 890 and liquid crystal layer 892 is described further in PCT Appl. No. PCT/US18/31206, filed Sep. 4, 2018, entitled "Optical stack for imaging directional backlights".

Switchable retarder layer 892 comprising addressing electrodes 850, 856 and switchable liquid crystal material 891 is provided to receive light from or to provide light to compensation retarder 890. In wide angle mode of operation, no voltage is provided by voltage driver 884 so that homeotropic liquid crystal alignment is provided through the thickness of the switchable liquid crystal material 891.

Light from the layer 892 is provided to the input polariser 210 of the spatial light modulator 848 polariser electric vector transmission direction 211 that is parallel to direction 501.

Spatial light modulator 848 is provided with bias electrodes 907, 912 that may be uniform across the area of the display (or may be patterned) and driven by voltage driver 885. Liquid crystal grey level control electrodes 904 that are driven by voltage drivers 886a, 886b that are typically provided by TFT drive schemes for each pixel.

Liquid crystal molecules 902a are aligned parallel to one of the polariser 210, 218 electric vector transmission directions 211, 219 such that when no voltage is applied to the pixel a black state is achieved. Liquid crystal molecules 902b are aligned at an offset angle to the directions 211, 219 in the x-y plane. When a voltage is applied to the pixel across electrodes 904, field lines 920 are provided and the molecules 902b reorient. A net retardation is provided in the liquid crystal cell and a grey level output is provided for the respective pixel.

In the present disclosure, the molecules 902 of the layer 891 are illustrated as having positive dielectric anisotropy and homogeneous alignment. Alternatively the molecules 902 may have negative dielectric anisotropy and homeotropic alignment.

In a wide angle mode of operation, no bias voltage is applied across electrodes 907, 912 so that the molecules 902a, 902b lie substantially within the plane 227, that is there is no out of plane tilt. Substantially uniform contrast is provided for a wide range of viewing angles as is known for In-Plane Switching (IPS); Fringe Field Switching (FFS) and other similar liquid crystal modes and will be described further herein.

Figure 15B:
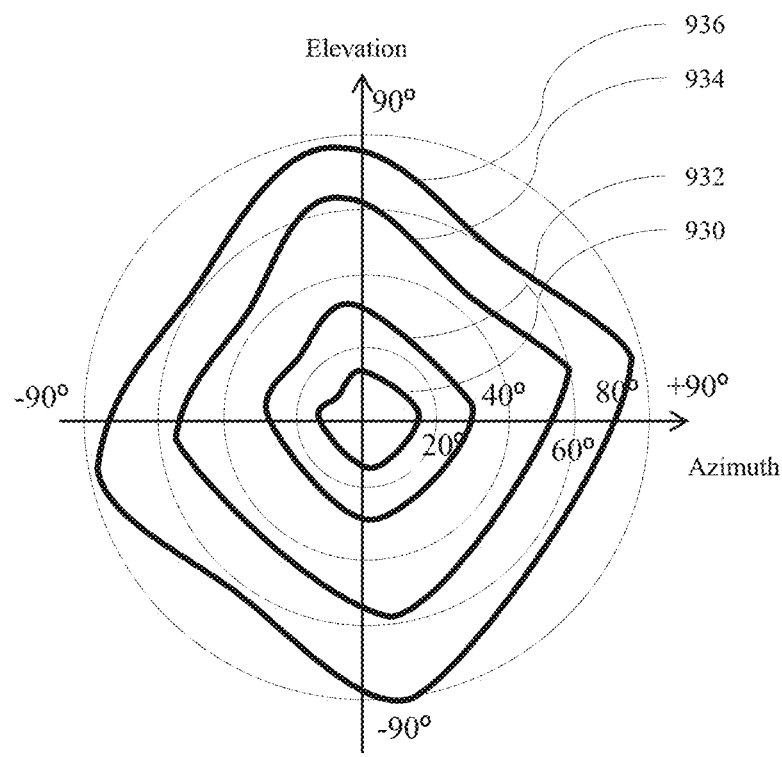
FIG. 15B is a schematic graph illustrating a polar iso-contrast profile of a switchable privacy display in a wide angle mode of operation, in accordance with the present disclosure.

FIG. 15B is a schematic graph illustrating a polar iso-contrast profile of a switchable privacy display in a wide angle mode of operation. In an illustrative example the IPS and FFS arrangement of FIG. 15A may provide iso-contrast contours 930 that illustrate angular regions in elevation and azimuth with contrast greater than 1000:1, contour 932 illustrates contrast greater than 500:1, contour 934 illustrates contrast greater than 100:1, contour 936 illustrates contrast greater than 50:1 for example.

Figure 15C:
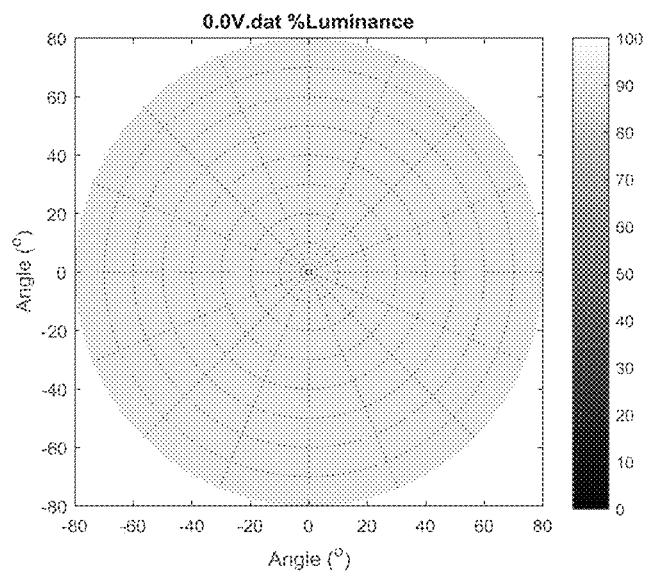
FIG. 15C is a schematic graph illustrating a polar iso-luminance profile of a switchable a switchable area retarder stack in a wide angle mode of operation, in accordance with the present disclosure.

FIG. 15C is a schematic graph illustrating a polar iso-luminance profile of a switchable a switchable area retarder stack in a wide angle mode of operation. Optical simulations provide an expected luminance roll off with angle from the optical stack 800 in wide angle mode that is less than 10% over the polar range.

Advantageously a wide angle luminance mode of operation may be provided with wide luminance profile from backlight 101, small reduction of off-axis luminance by optical stack 800 and wide angular range over which a high contrast image can be observed.

The operation of various retarder layers in the switchable privacy display of FIG. 14 will now be described when the controllers 401, 402, 403, 405, 407 are arranged to provide for a one phase privacy mode of operation.

Figure 16:
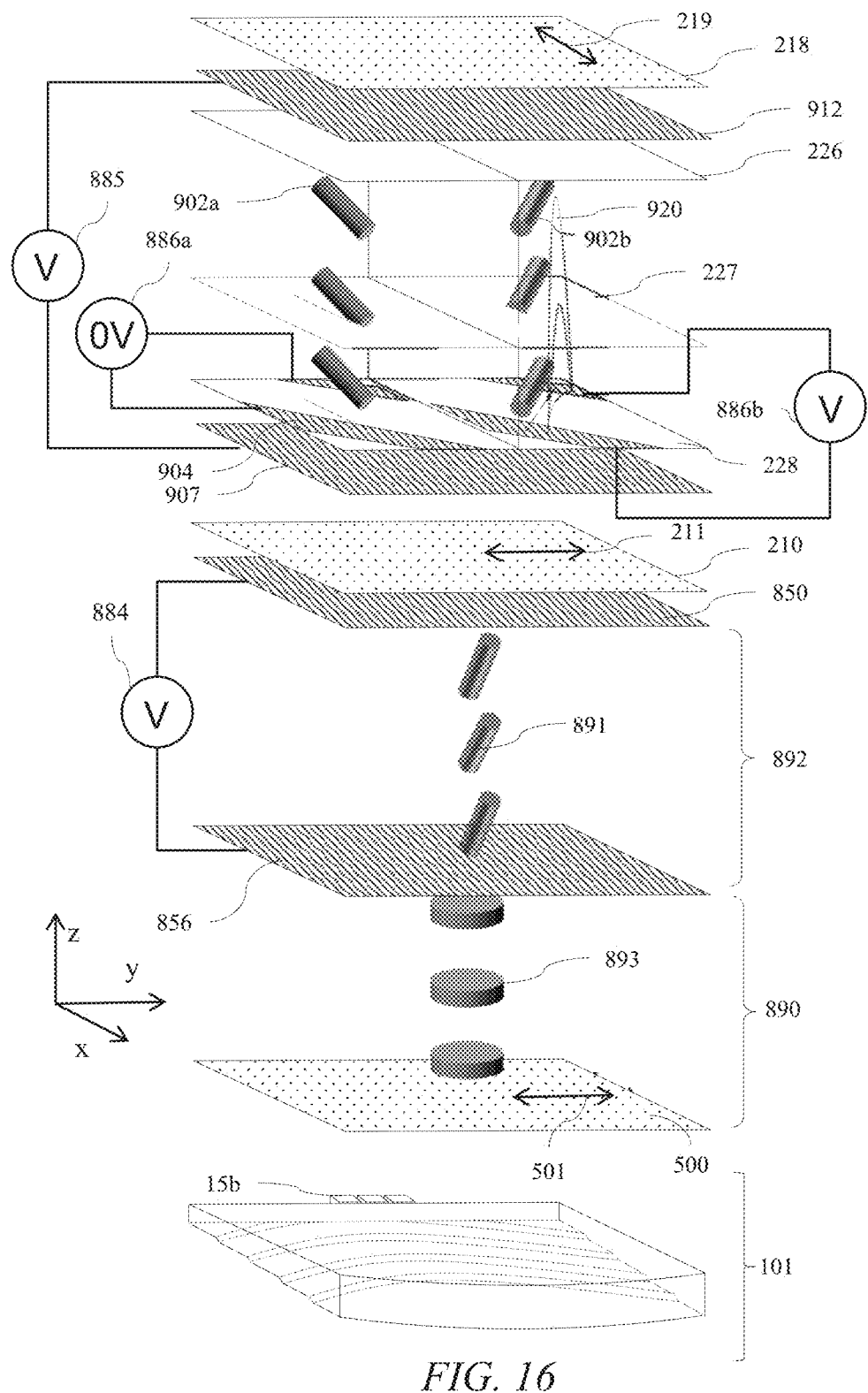
FIG. 16 is a schematic diagram illustrating in perspective side view an arrangement of retarder layers and directional waveguide illumination in a switchable privacy display in a first phase of a privacy mode of operation, in accordance with the present disclosure.

FIG. 16 is a schematic diagram illustrating in perspective side view an arrangement of retarder layers and directional waveguide illumination in a switchable privacy display in a first phase of a privacy mode of operation.

A first privacy effect is provided by light source array 15b with a reduced width in comparison to the arrangement of light source array 15a of FIG. 14 is illuminated providing optical windows 26 over a limited lateral viewing angle, achieving reduced off-axis luminance and provide a first privacy effect.

A second privacy effect is provided by the switchable retarder layer 892. Voltage driver 884 is arranged such that birefringent molecules 891 of the switchable retarder layer are tilted about the y-axis. In the illustrations of the present disclosure driven liquid crystal layers are indicated by a V symbol for the respective driver, and no voltage driving indicated by a 0V symbol. The voltage drive characteristics from each driver may be different and adjusted to provide optimum drive characteristics for the respective liquid crystal layer. The drive voltage may provide DC, balancing of the layer 892, to minimise image sticking effects. Further the drive voltage may be at interim levels to provide grey level driving for a given liquid crystal layer or pixel. The present illustrations are provided for positive dielectric anisotropy for illustrative purposes. The liquid crystal materials in each layer may alternatively have negative dielectric anisotropy wherein a respective drive voltage may be arranged to drive the liquid crystal molecules to a state that is illustrated as undriven in the present illustrations.

In combination with compensation retarder 890 comprising discotic birefringent materials 893, an off-axis luminance reduction may be provided as will be described further hereinbelow. Such an off-axis luminance reduction may provide a second privacy effect that in combination with the first privacy effect achieves enhanced image privacy to an off-axis snooper by luminance reduction.

A third privacy effect is provided by the switchable bias control provided by bias voltage driver 885 across electrodes 907, 912. Liquid crystal molecules 902a, 902b of the spatial light modulator 848 for black and white pixels are tilted out of plane 227 by application of a bias voltage, while achieving black pixels by application of voltages by means of drivers 886a, white pixels by means of voltage drivers 886b and intermediate grey states by means of applying intermediate voltages to each pixel region. Such out of plane tilt of molecules 902a, 902b may provide pixel contrast that reduces for off-axis viewer locations as will be described further hereinbelow. Such an off-axis contrast reduction may provide a third privacy effect that in combination with the first and second privacy effects achieves enhanced image privacy to an off-axis snooper by luminance and contrast reduction as will be described further hereinbelow.

Figures 17A, 17B:
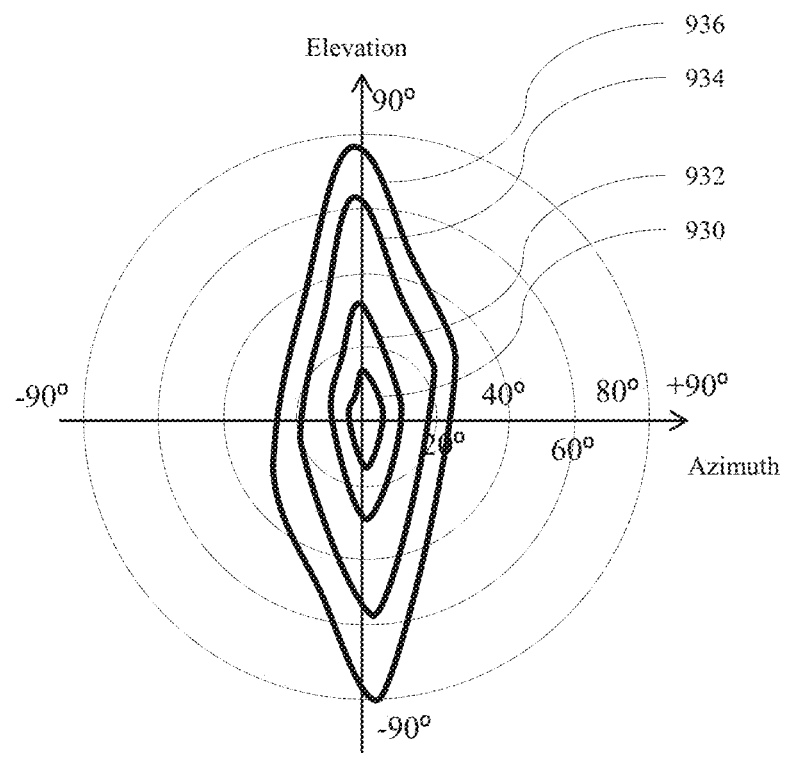
FIG. 17A is a schematic polar graph illustrating typical contrast profiles of the arrangement of FIG. 18A, in accordance with the present disclosure.
FIG. 17B is a schematic polar luminance graph illustrating variation in transmitted luminance of a directional backlight in a privacy mode of operation, in accordance with the present disclosure.

FIG. 17A is a schematic polar graph illustrating typical contrast profiles of the arrangement of FIG. 16, thus representing the third contrast effect. FIG. 17A may illustrate iso-contrast contours 930 that illustrate angular regions in elevation and azimuth with contrast greater than 1000:1, contour 932 illustrates contrast greater than 500:1, contour 934 illustrates contrast greater than 100:1, contour 936 illustrates contrast greater than 50:1 for example. Thus the lateral contrast angular profile has reduced width, so that contrast rolls off for off-axis viewing positions, achieving the third privacy effect.

FIG. 17B is a schematic polar luminance graph illustrating variation in transmitted luminance of a directional backlight in a privacy mode of operation. Thus for snoopers that are away from a central viewing location, a first privacy effect is provided by reduced luminance in comparison to the head-on luminance level 573.

Figure 17C:
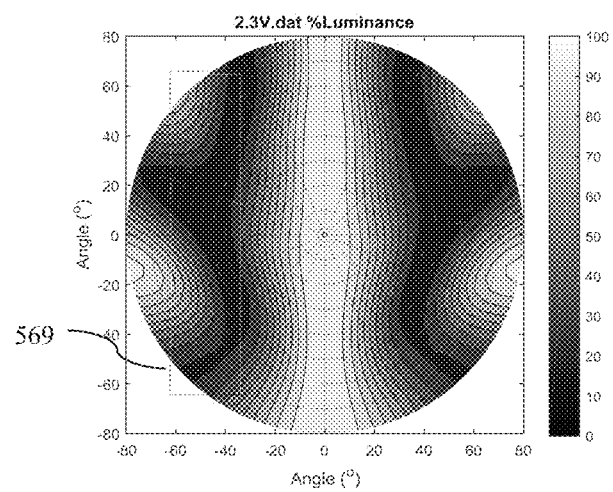
FIG. 17C is a schematic polar luminance graph illustrating variation in transmitted luminance of the off-axis luminance control optical stack of FIG. 16 in a privacy mode of operation, in accordance with the present disclosure.

FIG. 17C is a schematic polar luminance graph illustrating variation in transmitted luminance of the off-axis luminance control optical stack 890, 892 of FIG. 16 that provides a second privacy effect. Thus the first privacy effect as illustrated in FIG. 17A may be modified by a further luminance reduction due to the switchable retarder layer 892 with applied voltage.

Figure 17D:
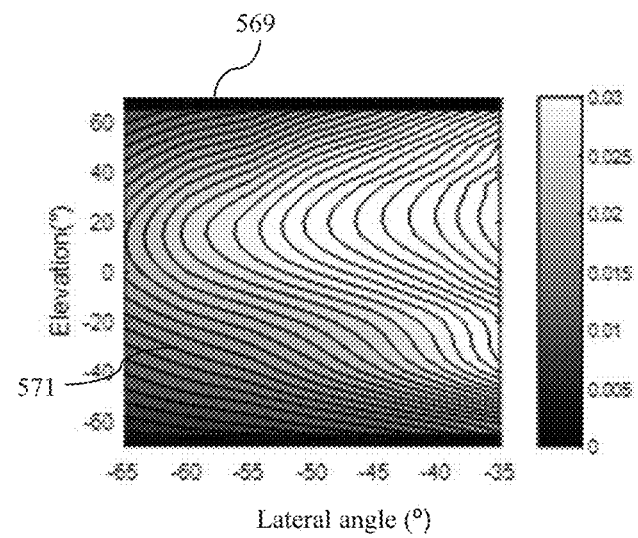
FIG. 17D is a schematic polar luminance graph illustrating variation in transmitted luminance of a directional backlight in a polar region, in accordance with the present disclosure.

FIG. 17D is a schematic polar luminance graph illustrating variation in transmitted luminance of a directional backlight in a polar region 569 of FIG. 17C with no voltage applied to the retarder layer 892. Thus contours 571 illustrate that a luminance level of 3% or greater of head-on luminance may be observable over a wide range of snooper polar viewing locations. Such a luminance level typically provides limited first privacy effect in isolation as will be described hereinbelow.

Figure 17E:
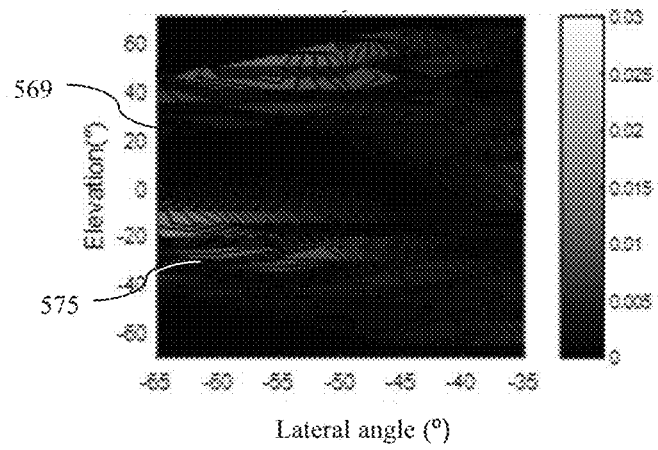
FIG. 17E is a schematic polar luminance graph illustrating variation in transmitted luminance of a directional backlight in a polar region further modulated by the off-axis luminance control optical stack of FIG. 16, in accordance with the present disclosure.

FIG. 17E is a schematic polar luminance graph illustrating variation in transmitted luminance of a directional backlight in a polar region further modulated by the off-axis luminance control optical stack 890, 892 of FIG. 16. Thus the luminance visible to a snooper may be reduced to typically 1.0% of head-on luminance level 573 and preferably less than 0.5% of head-on luminance level 573 over a wide range of snooper polar viewing locations.

As will be further described hereinbelow, such combined first and second privacy effects may still provide some image visibility to a snooper under some conditions of operation.

Further the operation of the third privacy effect may in isolation provide undesirable image quality to the primary user.

It may be desirable to provide high image quality to the primary user and enhanced privacy effect for a wide range of viewing conditions.

The operation of the first privacy effect will now be further described.

Figure 18A:
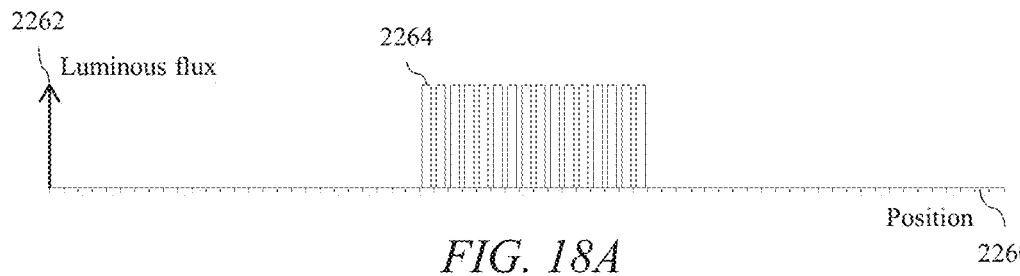
FIG. 18A, FIG. 18B, and FIG. 18C are schematic diagrams illustrating the operation of a directional display in privacy mode wherein a primary image is provided on the spatial light modulator in a first phase of operation, in accordance with the present disclosure.
Figure 18B:
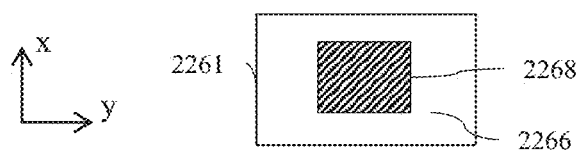
Figure 18C:
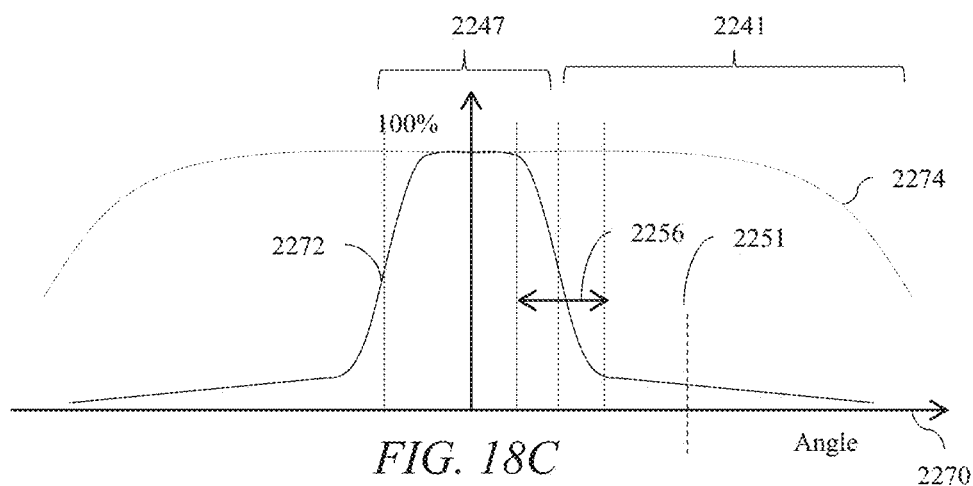
Figures 19A, 19B:
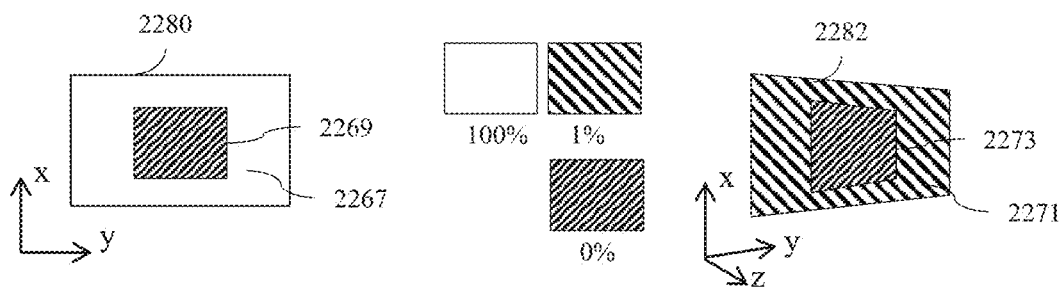
FIG. 19A and FIG. 19B are schematic diagrams illustrating the appearance of on-axis and off-axis images of a directional display in privacy mode wherein a primary image is provided on the spatial light modulator in a first phase of operation, in accordance with the present disclosure.

FIG. 18A, FIG. 18B and FIG. 18C are schematic diagrams illustrating the operation of a directional display in privacy mode wherein a primary image is provided on the spatial light modulator in a first phase of operation; and FIG. 19A and FIG. 19B are schematic diagrams illustrating the appearance of on-axis and off-axis images of a directional display in privacy mode wherein a primary image is provided on the spatial light modulator in a first phase of operation.

FIG. 18A shows the relative luminous flux 2262 of the light sources 15a-n in array 15 of light sources against position 2260. Such an illumination structure will provide a primary illumination structure 2272 in the window plane of the display. The window plane is the plane of the image of the light sources of the array 15, for example at the location of window 26n and optical axis 197 in FIG. 12B.

Accordingly this is an example in which there are plural primary light sources. Thus individual light source flux 2264 may be uniform in a region near the center of the array, and zero in other regions. Alternatively the flux 2264 may vary across the illuminated elements to provide a graded luminance with viewing angle within a primary viewing cone.

FIG. 18B shows an example displayed primary image 2261 on the spatial light modulator 848 that comprises a low transmittance region 2268, for example 0% transmittance and high transmittance region 2266, for example 100%.

FIG. 18C shows a graph that illustrates the variation of relative luminance and contrast with viewing angle 2270 of the display 100 in the window plane. Profile 2272 may be provided by the directional display comprising for example the active retarders layers 892 and additional polarisers as illustrated in FIG. 16 for example.

Thus luminance distribution 2272 comprises a central viewing window 2247 and stray light region 2241 wherein the luminance is non-zero, for example 1% at the angular position 2251 in the following illustrative example. In operation, the amount of stray light may vary within the region 2241, as shown.

FIG. 18C further illustrates a distribution 2274 of contrast of the perceived image seen on the spatial light modulator 848 with viewing angle, that may be substantially uniform other than for high viewing angles. The polar viewing angle properties of the profile 2274 are determined by the optical properties of the liquid crystal layer 214 and polarisers 210, 218 together with an retarders between polarisers 210, 218, and am thus substantially independent of the optical properties of the backlight apparatus.

FIG. 19A illustrates the perceived primary image 2280 for a primary observer in the primary viewing window 2247, such that regions 2267, 2269 have relative luminances of 100% and 0% that are substantially equivalent to relative transmittances of regions 2266, 2268 respectively.

FIG. 19B shows, using a representation of perspective, the perceived secondary image 2282 for angular position 2251 comprising regions 2271, 2273. Region 2273 may have substantially 0% luminance, whereas region 2271 may have 1% luminance in this illustrative example, being the transmittance of region 2266 modulated by the stray light luminance at angular position 2251.

Thus the arrangement of FIGS. 18A-19B may provide a privacy mode operation in which the luminance for a secondary observer is 1% of the luminance for the primary observer. Such an image luminance may provide obscuration of the primary image to the secondary observer by means of luminance as described elsewhere herein.

The contrast of the primary image to the secondary observer may be substantially the same and thus features may still be visible.

It may be desirable to further reduce the visibility images, for example in dark environments where small amounts of light may still provide image readability to snoopers as will be described, hereinbelow.

In the present embodiments, the arrangement of FIGS. 18A-19B may further be provided in a first phase of operation of a temporally multiplexed display in U.S. Patent Publ. No. 2015-0378085, filed Jun. 26, 2015, entitled "Directional privacy display" incorporated herein by reference in its entirety. A second phase of operation is provided to achieve further image obscuration, for example using a frame update rate of greater than 60 Hz, for example 120 Hz.

Figure 20:
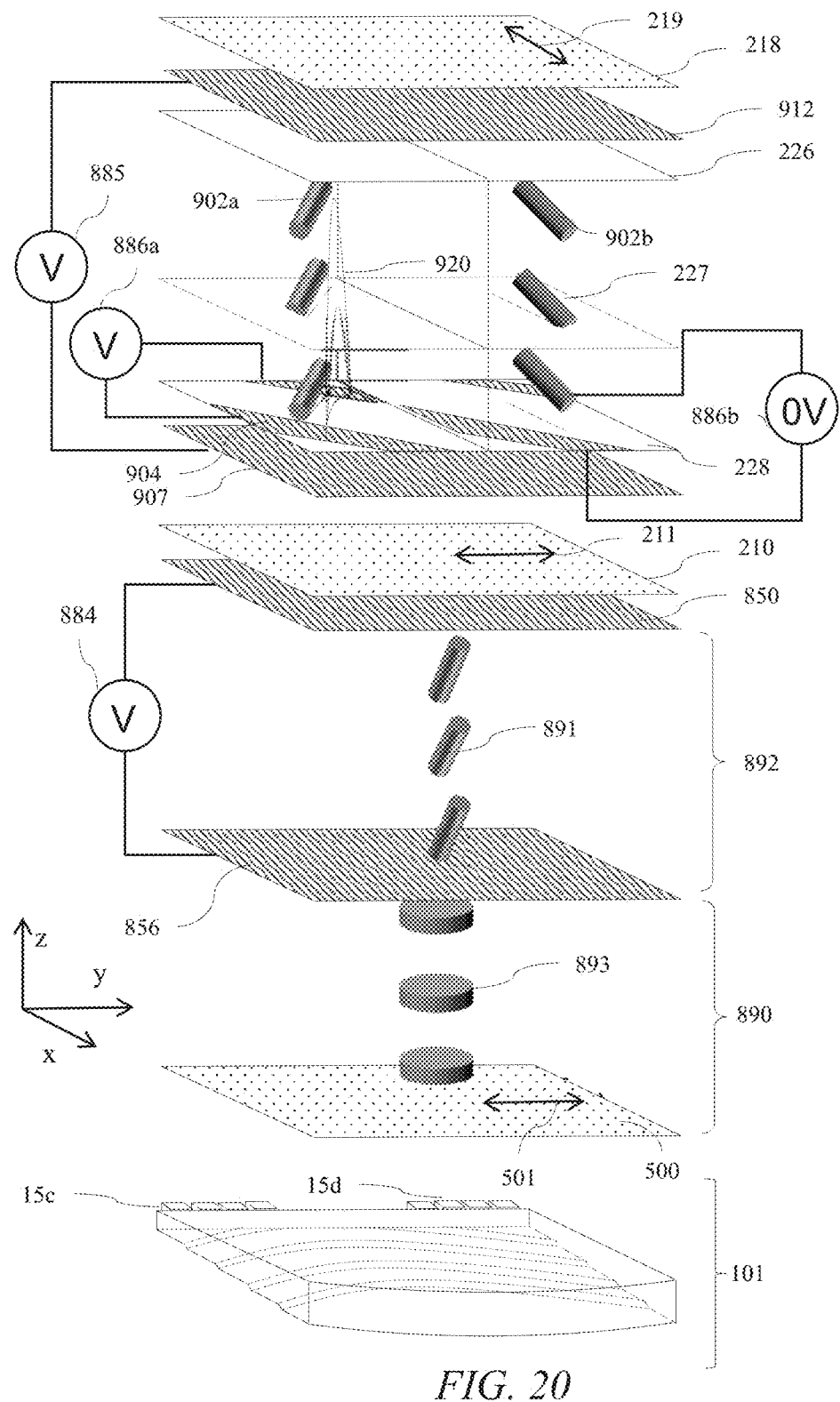
FIG. 20 is a schematic diagram illustrating in perspective side view an arrangement of retarder layers and directional waveguide illumination in a switchable privacy display in a second phase of a privacy mode of operation, in accordance with the present disclosure.

FIG. 20 is a schematic diagram illustrating in perspective side view an arrangement of retarder layers and directional waveguide illumination in a switchable privacy display in a second phase of a privacy mode of operation to achieve a fourth privacy effect.

In comparison to the arrangement of FIG. 16, in a second mode of operation an off-axis illumination profile may be introduced by means of addressing of light source arrays 15c and 15d.

The second privacy effect of reduced off-axis illumination by compensation retarder 890, switchable retarder 892 and additional polariser 500 may be substantially the same as that provided for the first phase of operation.

The third privacy effect of reduced off-axis contrast reduction by means of bias voltage from driver 885 and out of plane tilt by molecules 902a, 902b may be substantially the same as that provided for the first phase of operation.

In comparison to the arrangement of FIG. 16, in the second mode of operation, the image data applied to the pixels may be substantially inverted, so that a black image pixel region for the primary user is provided by application of a voltage to the molecules 902a and a white image pixel region for the primary user is provided by application of no voltage to the molecules 902b; that is the data signals are substantially inverted.

The operation of the fourth privacy effect will now be further described in relation to FIG. 21A, FIG. 21B, FIG. 21C, FIG. 21D, and FIG. 21E which are schematic diagrams illustrating the operation of a directional display in privacy mode in a second phase of operation.

This is an example in which there are plural secondary light sources. FIG. 21A shows that the light sources of array 15 are operated so that the secondary light sources output light with differing luminous flux profile 2265. A secondary illumination structure is achieved such that light source flux 2265 is arranged to provide substantially the same luminance as the stray light from the primary illumination in the stray light region 2241.

FIG. 21B shows secondary image 2263 with 0% transmittance in the region 2290 and 100% transmittance in the region 2292. Thus the displayed secondary image 2263 may for example be inverted compared to the displayed primary image 2261.

As illustrated in FIG. 21C, the luminance structure 2294 may be substantially matched to structure 2272 in the stray light region 2241, and thus in the illustrative embodiment may achieve a luminance of 1% at angular position 2251. The angular contrast distribution 2274 in the secondary phase is the same as for the primary phase.

FIG. 21D illustrates the perceived secondary image 2281 to the primary observer 300 comprising region 2284 with luminance 0% and region 2286 with luminance 1% that comprises stray light 2295 from the secondary light sources. FIG. 21E illustrates a representation of perspective of the perceived secondary image 2283 comprising region 2288 with 0% luminance and region 2290 with 1% luminance, determined by the SEM 848 transmittance for the region 2292 and luminance at position 2251.

It will be observed that the perceived image 2283 in the second phase is substantially the inverse of the perceived image 2282 in the first phase for off-axis viewing positions. The images combine to achieve a perceived secondary image with very low contrast. Advantageously a high degree of obscuration of the primary image to a secondary observer in the secondary viewing windows 2241 may be provided due to contrast reduction.

In operation, matching of perceived primary and secondary images 2282, 2283 may be achieved at a small range of viewing locations, for example location 2251. At other regions of viewing, the matching of the luminance in the two phases for off-axis viewing regions 2241 may be less well matched and residual image contrast may be perceived. In the present disclosure, the luminance for off-axis viewing is reduced.

In comparison to a directional display without the switchable liquid crystal retarder of the present disclosure, the difference in luminance at these non matched angles for first and second phases is smaller. Residual image luminance differences in first and second phases are reduced, and advantageously image contrast is further reduced, advantageously reducing image visibility to a snooper.

In other words the control system 401, 403, 402 may be capable of controlling the spatial light modulator 848 and capable of selectively operating of light sources 15*a-n* to direct light into corresponding optical windows 26*a-n*, wherein stray light in the directional backlight is directed in output directions 2251 outside the optical windows 26 corresponding to selectively operated light sources 2264.

The control system may be further arranged to control the spatial light modulator 848 and the array of light sources 15*a-n* in synchronization with each other so that: (a) the spatial light modulator 848 displays a primary image 2261 while at least one primary light source is selectively operated to direct light into at least one primary optical window for viewing by a primary observer (that is not a snooper), and (b) in a temporally multiplexed manner with the display of the primary image 2261, the spatial light modulator 848 displays a secondary image 2263 while at least one light source other than the at least one primary light source is selectively operated to direct light into secondary optical windows outside the at least one primary optical window, the secondary image 2282 as perceived by a secondary observer (that may be a snooper) outside the primary optical window obscuring the primary image 2282 that modulates the stray light directed outside the primary optical window 2247.

It may be desirable to reduce power consumption of the display further.

The control system may be arranged to control the applied voltage across the switchable liquid crystal retarder in a temporally multiplexed manner. Thus retarder controller 405 may be further arranged to control the voltage across the switchable retarder in synchronisation with the switching of the spatial light modulator and the light sources. The stray light profile may be adjusted in cooperation with the luminous flux on the array 15 of light sources. In the first phase of operation as described with reference to FIG. 19A, the switchable retarder may be provided with a narrow output luminance profile in the lateral direction, whereas in the second phase of operation, a wider output luminance profile may be provided.

In operation, reduced light flux may be provided in the second mode of operation if the switchable retarder has a higher off-axis output in the second phase of operation. Advantageously power consumption may be reduced in the second phase of operation, and the light sources may be driven less hard, extending lifetime and increasing efficiency.

Thus a fourth privacy effect may be provided with reduced off-axis contrast.

The operation of privacy effects under various viewing and illumination conditions will now be described.

Figure 22A:
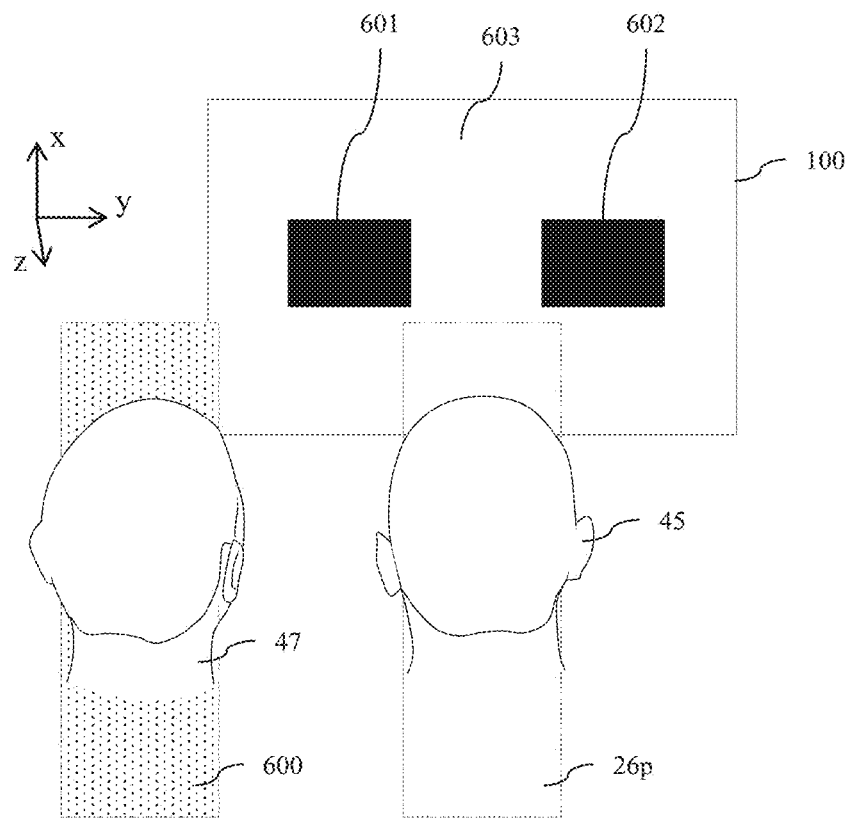
FIG. 22A is a schematic diagram illustrating m perspective front view illumination of a primary viewer and a snooper by a luminance controlled privacy display with no ambient lighting, in accordance with the present disclosure.

FIG. 22A is a schematic diagram illustrating in perspective front view illumination of a primary observer 45 located in optical window 26*p* and a snooper 47 located in viewing locations 600. The display 100 may be a luminance controlled privacy display with, for illustration purposes, white regions 603 and black regions 601, 602.

By way of example, such luminance controlled privacy display 100 may be provided by first and second privacy effects of FIG. 16 and may thus provide off-axis luminance of typically 0.5% of head-on luminance 573 for typical off-axis snooper viewing locations 600.

FIG. 22A further illustrates that no ambient lighting is present.

A schematic representation of the operation of human vision with respect to privacy display appearance will now be described with respect to FIG. 22B which is a schematic graph illustrating the variation 650 of perceived grey level against image grey level for the snooper 47 viewing the display 100 of FIG. 22A. Thus a perceived grey level variation 650 may be provided with a maximum perceived white state 652 and minimum perceived black state 651.

For illustration purposes the variations of perceived against image grey levels are shown as linear variations, in reality the human visual system may have a non-linear response and these variations are non-linear. The present discussion is illustrative and does not account for example for changes in colour perception or shifts between scotopic and photopic vision characteristics.

In human vision, an observer may adapt to a white point on the display, that may be within an angular range of for example 2 degrees of a foveal fixation point. The human visual system has a dynamic range of perhaps seven orders of magnitude. However for a given illumination environment, the human visual system may be capable of clearly resolving perhaps 200 grey levels as will be described further below with reference to FIG. 23.

For the present disclosure perceived dynamic range may be provided by equation 1.

$$\text{Perceived dynamic range} = (W_d - K_d)/(W_d + R_a) \quad \text{Eqn. 1}$$

where, for a given region 601 of the display 100, $W_d$ is the luminance of the display 100 for the snooper 47 when white image data is provided on the spatial light modulator 848 in the region 601 in the absence of ambient illumination 604; $K_d$ is the luminance of the display 100 for the snooper 47 when black image data is provided on the spatial light modulator 848 in the region 601 in the absence of ambient illumination 608; and $R_a$ is the luminance of the display 100 in the region 601 for the snooper 47 when the display is switched off and is illuminated by ambient illumination 608 only.

The perceived dynamic range may be the ratio of the perceived grey level range observed by the snooper 47 to the available grey level range of the snooper's human visual system. The perceived dynamic range thus describes the privacy image modulation to the snooper 47 and is a comparative measure that can be used to compare the privacy appearance to a snooper 47 of various different privacy displays.

It would be desirable to provide privacy displays that have the lowest perceived dynamic range. For human observer that is able to distinguish 200 grey levels, it would be desirable that the perceived dynamic range is less than 0.5%; that is all of the grey levels that are displayed to the primary observer 45 are compressed to 1 grey level or less when observed by the snooper 47.

In the present description, the perceived dynamic range is different to the privacy level which is the ratio of luminance for the off-axis snooper 47 and head-on luminance 573 illustrated in FIG. 17B.

Figure 22B:
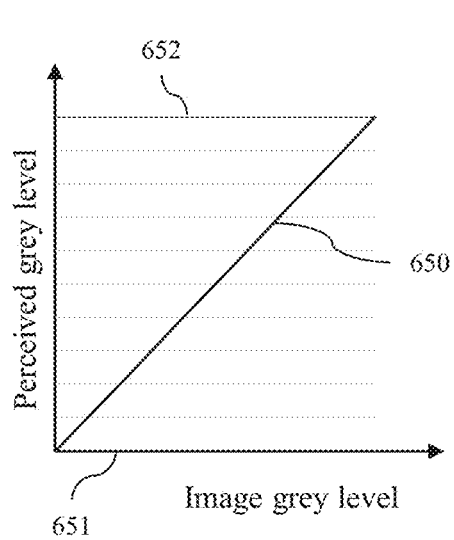
FIG. 22B is a schematic graph illustrating the variation of perceived grey level against image grey level for the snooper viewing the arrangement of FIG. 22A, in accordance with the present disclosure.

In the embodiment of FIG. 22B the perceived dynamic range is 100%, so the image data available to the snooper 47 from the display 100 may be clearly discernible.

Figure 22C:
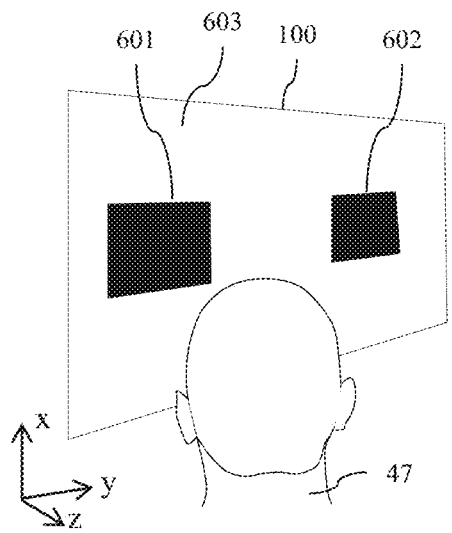
FIG. 22C is a schematic diagram illustrating in perspective side view illumination of a snooper by a luminance controlled privacy display with no ambient lighting, in accordance with the present disclosure.

FIG. 22C is a schematic diagram illustrating in perspective side view illumination of the snooper 47 by a luminance controlled privacy display 100 with no ambient lighting.

In an illustrative embodiment, privacy display 100 may be provided with a head-on luminance 573 of 200 nits to primary observer 45. An off-axis privacy level of 1.5% luminance may be provided, so that in the dark environment with no ambient illumination or reflection of light from surrounding objects, the snooper 47 may perceive a white state luminance $W_d$ from regions 603 of 3 nit while the black state luminance $K_d$ is 0 nits, assuming a high viewing angle spatial light modulator 848 such as an IPS or FFS LCD.

The snooper 47 may thus have access to the full perceived dynamic range, that is the perceived black state 651 and perceived white state 652 represent for example 200 grey levels for displayed black regions 601, 602 and white regions 603.

The image content may be clearly visible to such a snooper 47. Within the constraints of stray light control for typical optical systems in display apparatus, it is thus not convenient to provide cancellation of image data to a snooper 47 in a dark environment by means of off-axis luminance control alone.

The operation of a luminance controlled privacy display 100 with ambient illumination will now be described with reference to FIG. 22D which is a schematic diagram illustrating in perspective front view illumination of a primary observer 45 and a snooper 47 by a luminance controlled privacy display with further ambient lighting 604; FIG. 22E which is a schematic graph illustrating the variation 654 of perceived grey level against image grey level for the snooper 47 viewing the arrangement of FIG. 22D; and FIG. 22F is a schematic diagram illustrating in perspective side view illumination of a snooper 47 by a luminance controlled privacy display 100 with ambient lighting 604.

In comparison to the arrangements of FIG. 22A, the ambient illumination provides white state luminance region 606 for light rays 610 that are reflected from the front surface of the display. The effect of the ambient illumination on the perceived dynamic range of the snooper 47 will now be described.

The appearance of a displayed image to a snooper 47 is adjusted by the frontal illumination of the display 100 so that the perceived dynamic range reduces. The frontal illumination increases the white state luminance and due to changes in the chemical receptors, size of observer's pupil and psychovisual processing the brain of the snooper 47 is less able to perceive the fill grey scale resolution of the image while the primary observer 45 retains a much higher perceived dynamic range due to the higher display luminance in comparison to the reflected ambient illumination.

In an illustrative embodiment display 100 may be illuminated by an ambient illuminance of 500 lux (lumen/m$^2$) that may be typical of an office environment. A Lambertian profile front diffuser (or large area ambient illuminant) with front layer refractive index of 1.5 may provide a reflected luminance level $R_s$ of 6 nits from the front surface of the display 100.

Continuing the illustrative embodiment of FIGS. 22A-C, the white state luminance in regions 603 to a snooper 47 may be the sum of $W_d$ and $R_s$ which is approximately 9 nits and is illustrated by point 608 in FIG. 22E.

Thus the perceived dynamic range may be approximately 33% for the snooper.

By way of comparison, the perceived dynamic range of the primary observer 45 viewing a 200 nit image in an ambient illuminance of 500 lux is 97%.

Thus the image fidelity that is viewable to the snooper 47 may be degraded, however substantial image data may still be visible under such lighting conditions, given that 33% of perceived dynamic range is 'available' to the snooper to discern image content, providing approximately 70 grey levels of visibility of content.

Figure 23:
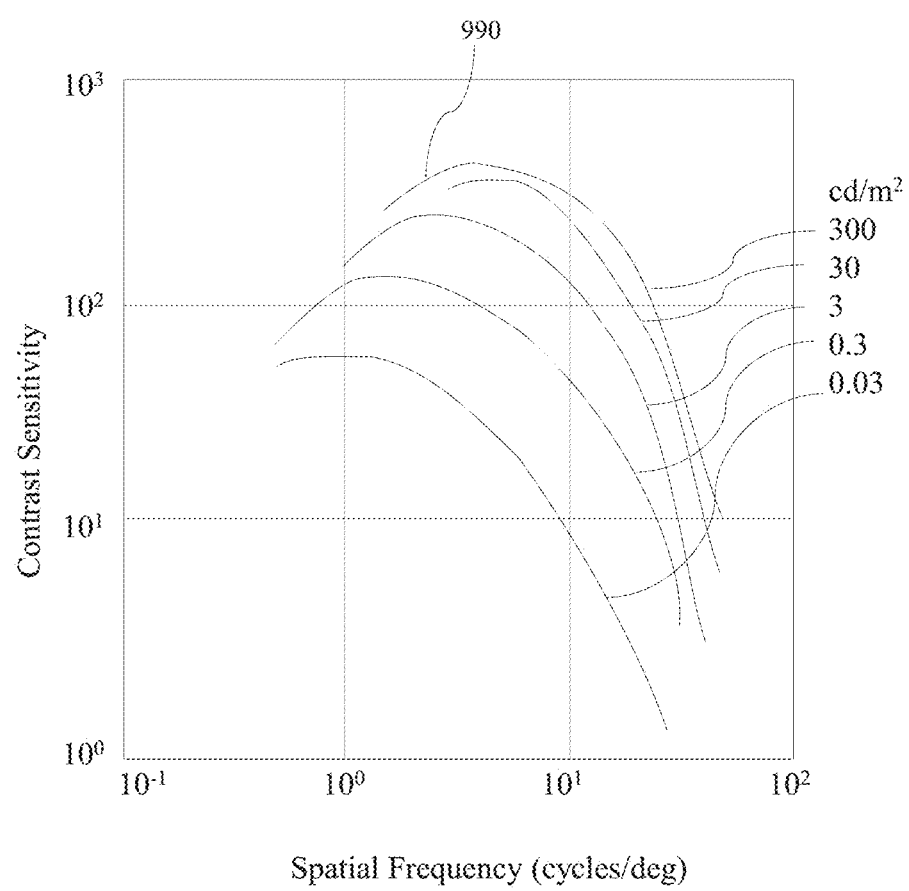
FIG. 23 is a schematic graph illustrating human visual system response to image contrast against spatial frequency for various different display luminance levels, in accordance with the present disclosure.

FIG. 23 is a schematic graph illustrating known human visual system response to image contrast against spatial frequency for various different display luminance levels, for example Robson J. G. "Spatial and temporal contrast-sensitivity functions of the visual system" J. Opt. Soc. Amer., Vol 56, pp 1141-1142, 1966.

The contrast sensitivity is defined as the reciprocal threshold contrast for a given illumination system. Such relationships illustrate that reducing display luminance to a snooper 47 reduces the contrast sensitivity, that is an image with a given contrast level and spatial frequency becomes harder to identify as the display luminance is reduced.

Thus for a snooper observing an image at 1 nit, a peak contrast sensitivity of 200 may be representative of the human visual system response near to 1 cycles per degree.

At a snooper viewing distance of 1000 mm, this corresponds to an image of size approximately 20 mm which may be typical of titles in presentations for example. Thus the threshold contrast is 0.005, that is a luminance level variation of greater than 0.5% can be perceived for such feature sizes.

At different spatial frequencies the contrast sensitivity may be lower, that is the perceived dynamic range required to achieve no image visibility to a snooper 47 may be increased. Thus the privacy image content may be modified to achieve improved image content. For example in flight mode of operation, slide titles and image logos may be reduced in size to achieve reduced visibility to snoopers.

As illustrated in FIG. 23, reducing image luminance has some small effect on visibility of images, however the privacy effect of reducing image luminance alone is limited unless operated in high levels of ambient lighting. In the present disclosure, embodiments are provided that achieve low levels of perceived dynamic range to a snooper 47 by combination of luminance and contrast control that further cooperate to achieve high on-axis quality to the primary observer 45.

It would thus be desirable to achieve improved privacy performance than can be achieved by a luminance controlled privacy display in normal office illuminance environments.

FIG. 24A is a schematic diagram illustrating in perspective front view illumination of a primary observer 45 and a snooper 47 by an ideal contrast controlled privacy display 100 with a conventional wide angle backlight and further ambient light source 604; FIG. 24B is a schematic graph illustrating the variation 656 of perceived grey level against image grey level for the snooper viewing the arrangement of FIG. 24A and FIG. 24C is a schematic diagram illustrating in perspective side view illumination of a snooper by an ideal contrast controlled privacy display with ambient lighting.

In comparison to the arrangement of FIG. 22D, the luminance of viewing region 600 for the snooper 47 may be substantially higher and thus the impact of the ambient light level 608 may be small on the resultant image. As illustrated in FIG. 24C, in an ideal display the contrast of the images means that the luminance of black regions 601, 602 and whit regions 603 are very close and image data is disguised.

Perceived grey levels are illustrated in FIG. 24B such in the ideal case no variation 656 of perceived contrast is provided and perfect privacy cancellation is achieved independent of ambient illumination and image luminance for the snooper 47. In real displays sonic residual grey scale profile such as variation 657a may be provided, or variation 657b that may comprise an inverted grey scale, particularly for far side region 602 that has a higher viewing angle for the snooper 47 with respect to the display normal direction.

In an illustrative example the luminance from a conventional wide angle backlight for a snooper at 45 degrees lateral angle and 0 degrees elevation may be 20% of peak luminance 573 of 200 nits. The image contrast reduction may further reduce the white state image luminance to approximately 10% of peak luminance, that is providing for white image luminance $W_d$ of 20 nits to the snooper 47 with no ambient illumination. The image contrast observed in one region of the display by the snooper 47 may be 1.3:1 for example and the black state image luminance $K_d$ is thus approximately 15 nits. In the absence of ambient illumination the perceived dynamic range may thus be 25%.

For 500 lux illuminance, a frontal luminance $R_a$ from reflected light of 6 nits provides a perceived dynamic range of 19%, approximately 38 perceived grey levels. In operation some regions of the display will have lower contrast ratios as illustrated by variations 657a, 657b in FIG. 24B, and thus the perceived dynamic range of the image for the snooper 47 will vary across the display 100 area.

The operation of measured biased LCD contrast controlled privacy displays will now be described.

Figure 25A:
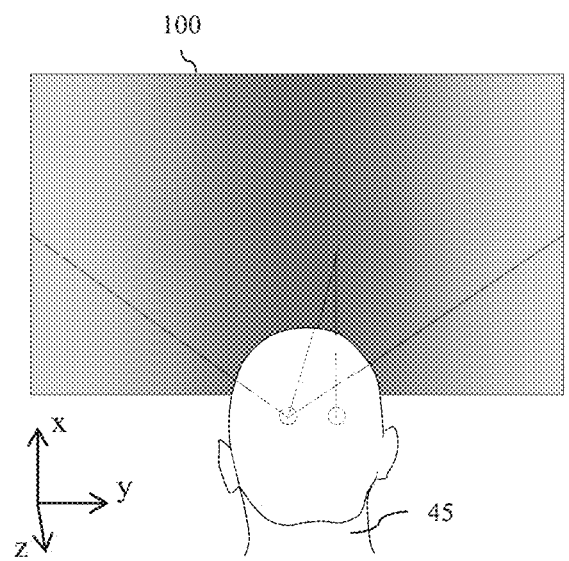
FIG. 25A is a schematic diagram illustrating in perspective front view appearance of an image to a primary viewer of a biased LCD contrast controlled privacy display, in accordance with the present disclosure.
Figure 25B:
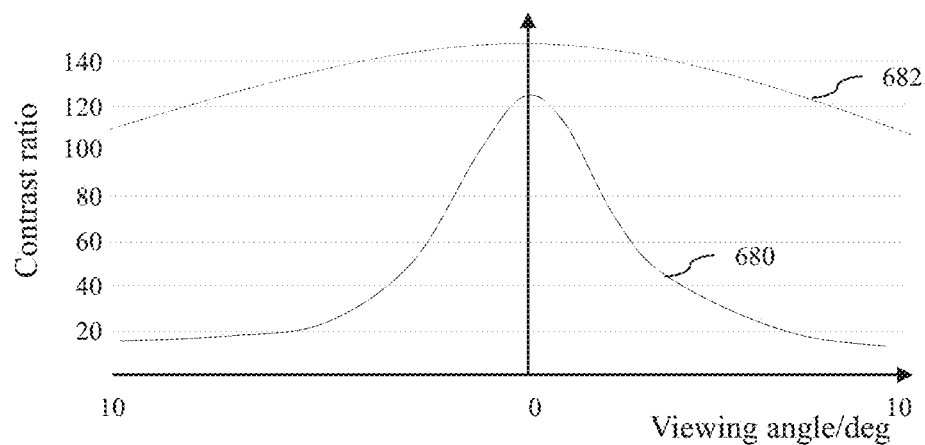
FIG. 25B is a schematic graph illustrating variation of perceived contrast with viewing angle of a biased LCD contrast controlled privacy display, in accordance with the present disclosure.

FIG. 25A is a schematic diagram illustrating in perspective front view appearance of a black image to the right eye of a primary observer 45 of a biased LCD contrast controlled privacy display 100 comprising a wide angle backlight and FIG. 25B is a schematic graph illustrating variation of perceived contrast with viewing angle of a biased LCD contrast controlled privacy display 100 that is arranged to produce high levels of contrast reduction for off-axis snoopers 47.

Considering FIG. 25B, the contrast profile 680 is provided by the polar contrast profile similar to that of FIG. 17A and may achieve an image appearance as illustrated schematically in FIG. 25A that in particular provides a variation in luminance of a black image across the width of the display 100.

In an illustrative example, a centrally located primary observer 45 with an eye separation of 64 mm viewing a 300 mm width display at a viewing distance of 500 mm sees the highest contrast region of the display offset 32 mm from the centre of the display and the left hand edge of the display is at a visual angle of +/−17 degrees such that the perceived head-on image contrast varies from 120:1 in a central location to less than 20:1 at the left and right hand edges of the display. Thus the contrast, colour gamut and left-right eye image matching of the display for the primary observer 45 is significantly degraded.

Figure 25C:
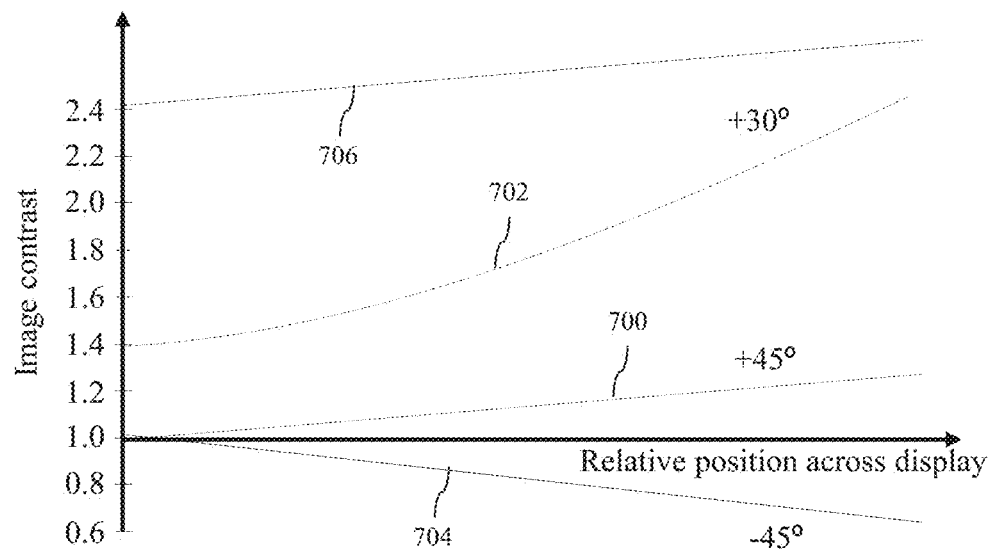
FIG. 25C is a schematic graph illustrating variation of image contrast with screen position for one eye of an observer at 1 m from a bias controlled privacy display, in accordance with the present disclosure.

FIG. 25C is a schematic graph illustrating variations 700, 702, 704 of image contrast with relative position across the display surface for one eye of snooper 47 at 1 m from a bias controlled privacy display for zero degree elevation at each of +45°, +30° and −45° lateral viewing angle respectively. Thus the image contrast may be significantly different from 1.0 for large areas of the display even if high cancellation is provided for a limited region. It would be desirable to provide more uniform cancellation of image appearance.

It would be desirable to provide a contrast reduction privacy effect for snooper 47 while achieving a high image fidelity for the primary observer 45.

Figures 25D, 25E:
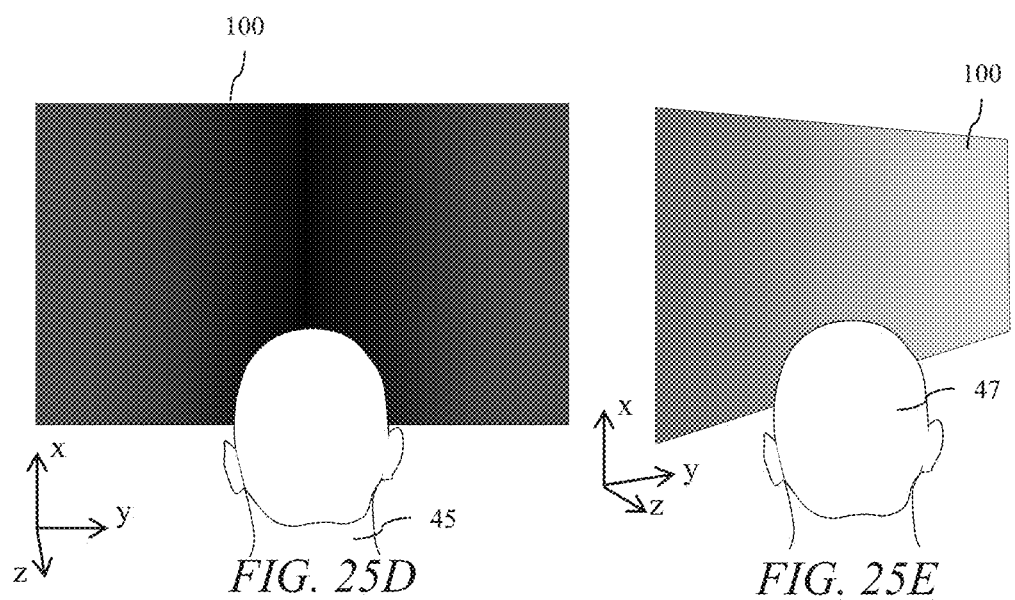
FIG. 25D is a schematic diagram illustrating in perspective front view appearance of an image to a primary viewer of a biased LCD contrast controlled privacy display with a different bias voltage in comparison to the arrangement of FIG. 25A, in accordance with the present disclosure.
FIG. 25E is a schematic diagram illustrating in perspective side view appearance of an image to a snooper of a biased LCD contrast controlled privacy display with different bias voltage, in accordance with the present disclosure.

FIG. 25D is a schematic diagram illustrating in perspective front view appearance of an image to a primary viewer of a biased LCD contrast controlled privacy display with a different bias voltage in comparison to that provided for the arrangement of FIG. 25A and profile 680 of FIG. 25B.

FIG. 25B further illustrates an alternative contrast profile 682 that may be provided for a bias voltage provided by driver 885 that is less than the bias voltage that is provided to achieve the profile 680 and the contrast controlled image similar to that illustrated schematically in FIG. 24C. FIG. 25C further illustrates an alternative variation 706 of image contrast with relative position across the display surface for one eye of a snooper when the bias voltage is reduced.

Thus reducing the bias voltage may increase the central luminance and provide significantly less roll off in contrast level Or increase in black state luminance) across the width of the display. Advantageously image contrast may be increased, colour gamut extended and differences between left and right eye image luminance reduced, to achieve increased image fidelity and comfort of observer 45.

FIG. 25E is a schematic diagram illustrating in perspective side view appearance of an image to a snooper of a biased LCD contrast controlled privacy display with different bias voltage. Thus the contrast of the display is not reduced to the same extent as that illustrated in FIG. 24B for example. In operation near side regions of the display may have higher contrast than far side regions, such that the near side of the display may have a higher contrast compared to the far side of the display and contrast reduction is not uniform over the display area.

The appearance to a snooper 47 of a privacy display 100 comprising reduced off-axis luminance from a privacy backlight 101 with LED array 15b with off-axis luminance reduction and reduced bias LCD bias voltage will now be described.

FIG. 26A is a schematic diagram illustrating in perspective side view appearance of an image to a snooper of a luminance and biased LCD contrast controlled privacy display with different bias voltage in comparison to the arrangement of FIG. 24B, with no ambient lighting. Regions 601, 603 have reduced luminance compared to region 601 of FIG. 24C, and the luminances are different, so that the image contrast of the off-axis image is reduced to the on-axis contrast, but varies across the display width so that there is not a perfectly corrected location on the display performance.

FIG. 26B is a schematic graph illustrating the variation of perceived grey level against image grey level for the snooper viewing the arrangement of FIG. 26A. Thus variation 658a may be provided for region 601 and variation 658b may be provided for region 602b. Thus the contrast privacy effect is not uniform and some regions of the display will have increased visibility to snoopers 47 than other regions.

FIG. 26C is a schematic graph illustrating the variation of perceived grey level against image grey level for the snooper viewing the arrangement of FIG. 26A when further ambient illumination is provided. Thus the ambient light reflection region 606 provides a higher reference white point 608 and the perceived response variations 660a, 660b are compressed with respect to the variations 658a, 658b of FIG. 26B.

FIG. 26D is a schematic graph illustrating the variation of perceived grey level against image grey level for the snooper viewing the arrangement of FIG. 26C. In an illustrative embodiment, the contrast of the region 601 may be 4:1 and the off-axis luminance $W_d$ may be 3 nits for a white state image in region 603, providing maximum perceived grey level 652 and the black state luminance $K_d$ is thus 0.75 nits. For an ambient illumination of 500 lux reflected from a Lambertian front display surface, the perceived dynamic range is 25%.

Thus the image appearance for the primary observer 45 may be substantially improved in comparison to the arrangement of FIG. 25A and profile 680, however the privacy performance may be inferior for the snooper 47.

It would be desirable to further reduce the perceived dynamic range of the privacy display 100.

Figure 26E:
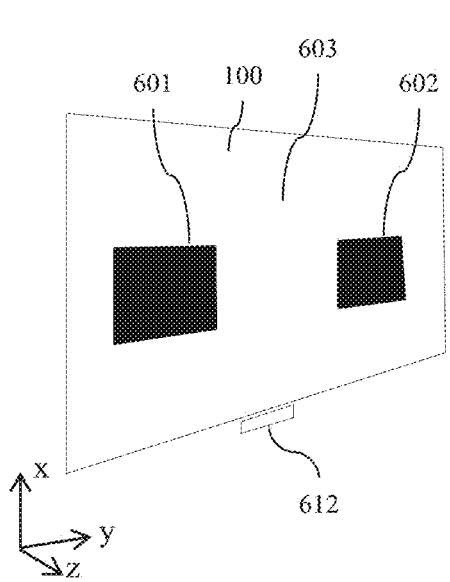
FIG. 26E is a schematic diagram illustrating in perspective side view illumination in the direction of a snooper by a phased illumination contrast controlled privacy display in a first illumination phase, in accordance with the present disclosure.
Figure 26F:
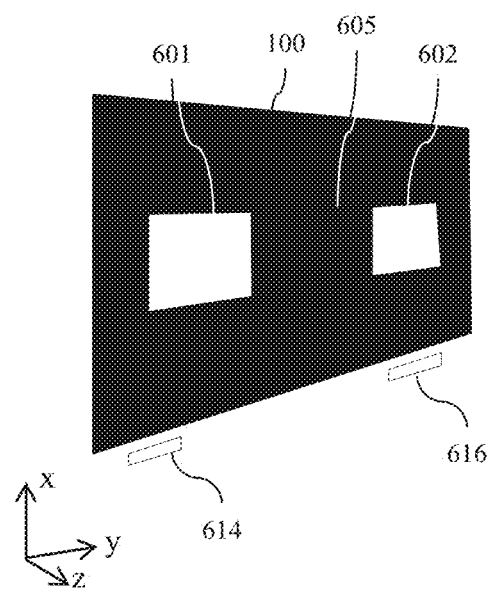
FIG. 26F is a schematic diagram illustrating in perspective side view illumination in the direction of a snooper by a phased illumination contrast controlled privacy display in a second illumination phase, in accordance with the present disclosure.

FIG. 26E is a schematic diagram illustrating in perspective side view illumination in the direction of a snooper 47 by a phased illumination contrast controlled privacy display in a first illumination phase; and FIG. 26F is a schematic diagram illustrating in perspective side view illumination in the direction of a snooper by a phased illumination contrast controlled privacy display in a second illumination phase.

Figure 26G:
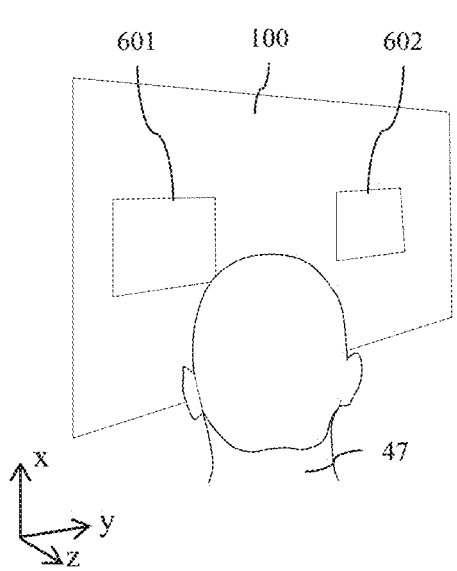
FIG. 26G is a schematic diagram illustrating in perspective side view ideal illumination of a snooper by a phased illumination contrast controlled privacy display, in accordance with the present disclosure.
Figure 26H:
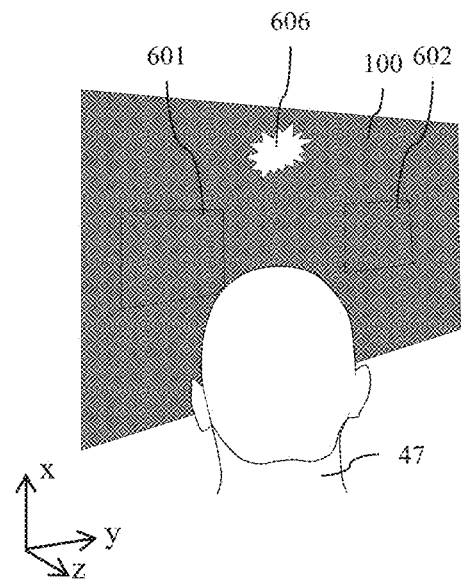
FIG. 26H is a schematic diagram illustrating in perspective side view ideal illumination of a snooper by a phased illumination contrast controlled privacy display in a second illumination phase, in accordance with the present disclosure.

As illustrated herein with relation to FIGS. 18A-21C, in an ideal display FIG. 26G is a schematic diagram illustrating in perspective side view ideal illumination of a snooper by a phased illumination contrast controlled privacy display; and FIG. 26H is a schematic diagram illustrating in perspective side view ideal illumination of a snooper by a phased illumination contrast controlled privacy display in a second illumination phase.

In a similar manner to FIG. 24C, in an ideal display such contrast reduction can achieve very small perceived dynamic ranges. Further, as illustrated in FIG. 26H, the luminance for the snooper 47 is reduced in comparison to the arrangement of FIG. 24C.

To continue the illustrative embodiment, the white state luminance $W_d$ may be 3 nits and black state luminance $K_d$ of 2.3 nits for a region of the display 100 that has a contrast ratio of 1.3:1. In an office environment with $R_a$ of 6 nits, the perceived dynamic range may be 8%.

Figure 27A:
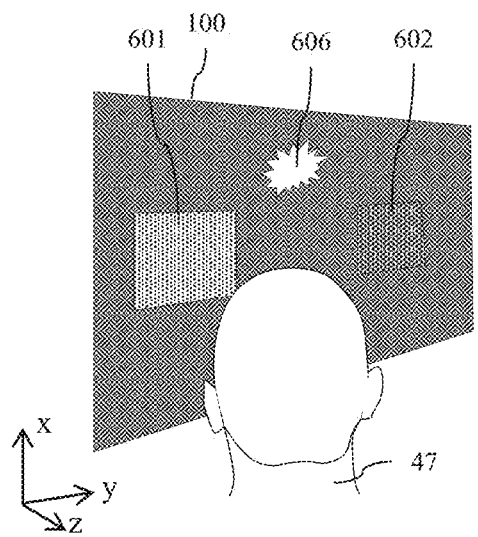
FIG. 27A is a schematic graph illustrating the variation of perceived grey level against image grey level for the snooper viewing the arrangement of FIG. 27G, in accordance with the present disclosure.
Figure 27B:
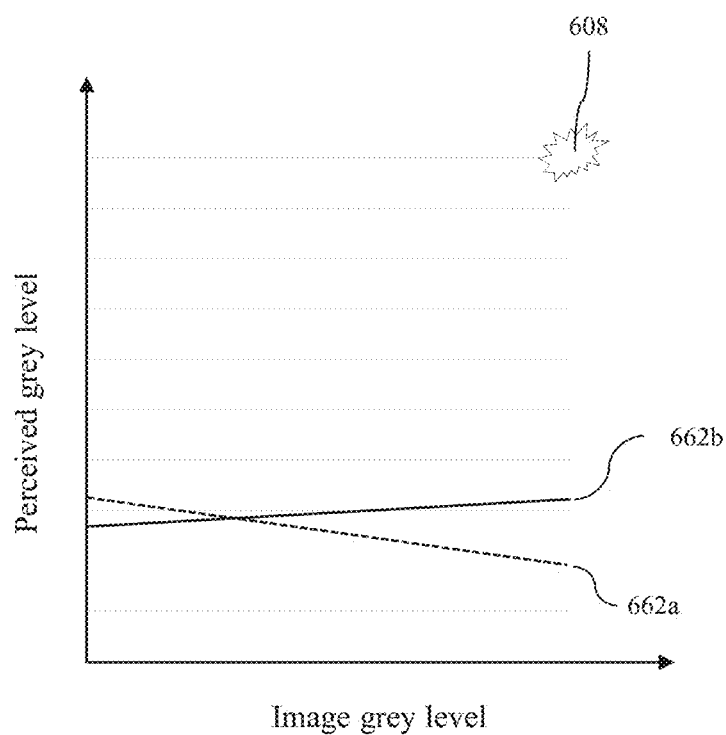
FIG. 27B is a schematic graph illustrating the variation of perceived grey level against image grey level for the snooper viewing the arrangement of FIG. 27E, in accordance with the present disclosure.

FIG. 27A is a schematic diagram illustrating in perspective side view illumination of a snooper by a phased illumination contrast controlled privacy display with illumination non-uniformities and ambient illumination; and FIG. 27B is a schematic graph illustrating the variation of perceived grey level against image grey level for the snooper viewing the arrangement of FIG. 27A.

In operation, the uniformity of a two phase privacy display may provide non-uniformities of across the area of the display 100 such that the contrast of the corrected images seen by the snooper 47 varies across the display area such that regions 601 may have perceived grey level variations 662a and regions 602 may have variations 662b that may be inverted for example.

Such non uniformities may be provided by non-uniformities of illumination of the snooper 47 by the waveguide 1 or by optical aberrations of the imaging of the light sources 612 compared to the imaging of the light sources 614, 616 that are intended to provide the compensating luminance.

Thus the contrast of the privacy image may vary across the display area, and the perceived dynamic range may vary, undesirably providing snooper 47 with visibility of parts of the image.

It would be desirable to reduce non-uniformity image contrast in a privacy display comprising two phases of operation.

The operation FIGS. 16-20 for a snooper will now be described wherein a bias voltage is applied to the spatial light modulator 848 in both first and second phases of operation.

Figure 28A:
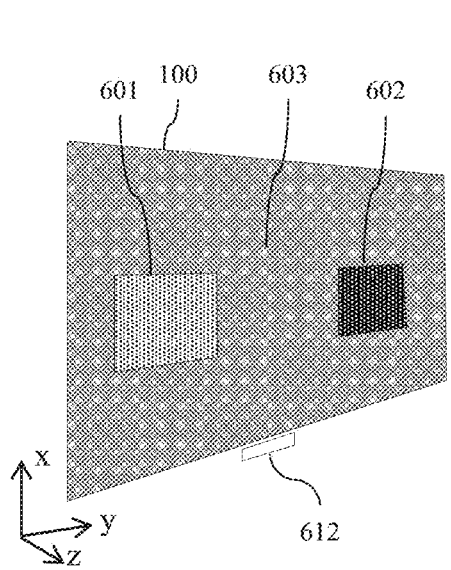
FIG. 28A is a schematic diagram illustrating in perspective side view illumination of a snooper by a luminance controlled, phased illumination contrast controlled and biased LCD contrast controlled privacy display in a first phase of operation, in accordance with the present disclosure.
Figure 28B:
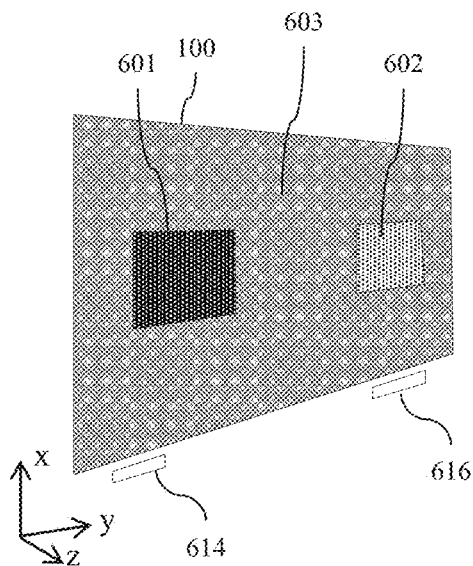
FIG. 28B is a schematic diagram illustrating in perspective side view illumination of a snooper by a luminance controlled, phased illumination contrast controlled and biased LCD contrast controlled privacy display in a second phase of operation, in accordance with the present disclosure.

FIG. 28A is a schematic diagram illustrating in perspective side view illumination of a snooper by a luminance controlled, phased illumination contrast controlled and biased LCD contrast controlled privacy display in a first phase of operation; and FIG. 28B is a schematic diagram illustrating in perspective side view illumination of a snooper by a luminance controlled, phased illumination contrast controlled and biased LCD contrast controlled privacy display in a second phase of operation.

Thus in the first phase of operation, the white region 603 has reduced off-axis illuminance due to the contrast reduction of the display, while the region 601 may have increased black level that is different from the increased black level of region 602, that is the display contrast change is not uniform.

In the second phase of operation the black region 603 has increased off-axis luminance while the white regions 601, 602 have reduced luminance due to the bias voltage applied to the spatial light modulator 848.

In each phase of operation, the contrast of the regions 601, 602 may be for example 2.0 and 3.0 respectively for a bias mode voltage that is less than that to achieve the contrast properties illustrate in FIG. 25C.

Figure 28C:
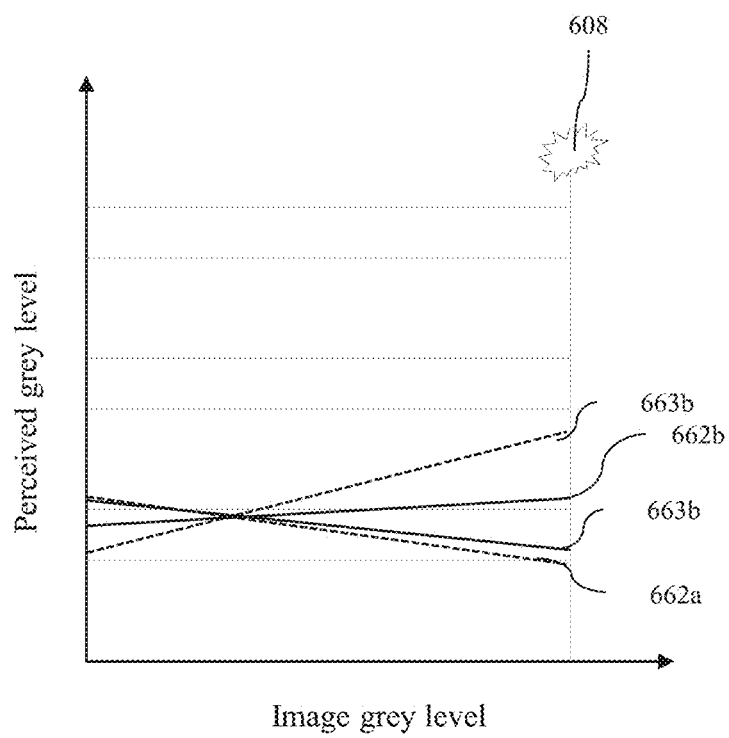
FIG. 28C is a schematic graph illustrating the variations of perceived grey level against image grey level for the snooper viewing the arrangements of FIGS. 28A and 28B, in accordance with the present disclosure.
Figure 28G:
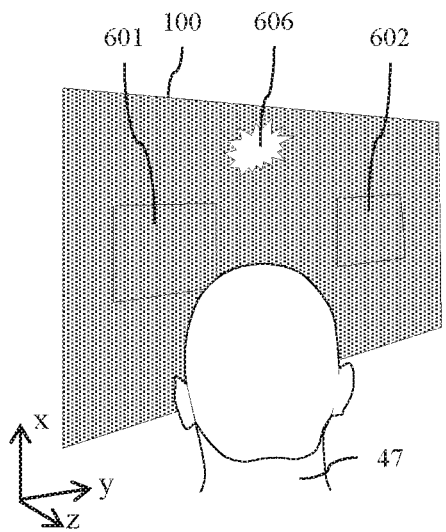
FIG. 28G is a schematic diagram illustrating in perspective side view illumination of a snooper, in accordance with the present disclosure.
Figure 28D:
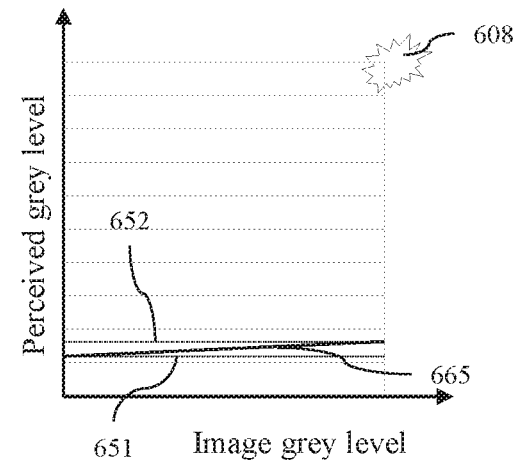
FIG. 28D is a schematic graph illustrating the resultant perceived dynamic range of a display comprising a directional backlight, a spatial light modulator with a bias voltage applied and a two phase operation arranged to reduce contrast, in accordance with the present disclosure.

FIG. 28C is a schematic graph illustrating the variations of perceived grey level against image grey level for the snooper viewing the arrangements of FIGS. 28A and 28B; and FIG. 28D is a schematic graph illustrating the resultant perceived dynamic range of a display comprising a directional backlight, a spatial light modulator 848 with a bias voltage applied and a two phase operation arranged to reduce contrast.

so that in the first phase grey level variations 662a and 662b are provided for regions 601, 602 whereas in the second phase of operation variations 663a and 663b are provided in the second phase of operation. Thus for a region 601, variations 662a and 662b may cooperate to reduced image contrast to region 603; and for region 602, variations 663a and 663b may provide further reduction in image contrast to region 603. Advantageously image contrast is reduced and uniformity of contrast is increased.

The combined images seen by the user will have reduced contrast in comparison to the arrangements that are observed with bias control alone or two phase privacy mode operation alone. Further, the luminance of the images are reduced by the directional backlight 101 and thus ambient illumination is reduced, as illustrated by white state luminance 608.

In an illustrative embodiment, a substantially uniform contrast of between 0.95 and 1.05 may be provided across the display width, in an ambient illumination of 500 lux and with an off-axis luminance of 5 nits. Thus a maximum perceived dynamic range of approximately 2% may be achieved.

Advantageously, the bias contrast control and two phase contrast control interact to achieve increased uniformity of contrast across a display for a snooper 47. Further the absolute contrast may be provided closer to 1.0 over a wider angular range, reducing perceived dynamic range. Further, the luminance of the display 100 to the snooper 47 may be reduced so that ambient illumination 606 further compresses the perceived dynamic range.

The threshold of contrast sensitivity may be approximately 200 so that it would be desirable to provide further reduction of visibility of an image to a snooper uniformly over a display area.

Figure 28E:
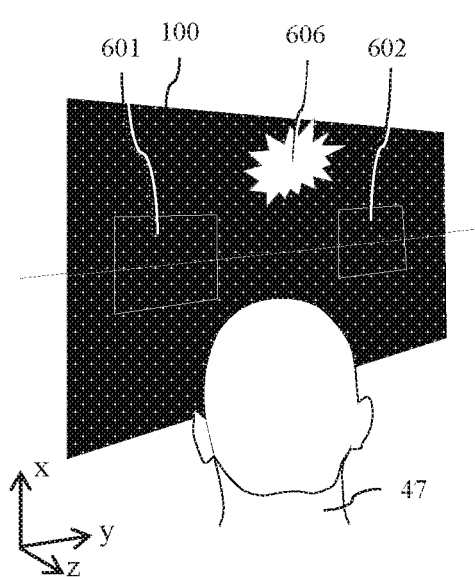
FIG. 28E is a schematic diagram illustrating in perspective side view illumination of a snooper by the arrangement of FIG. 28G with a further angular luminance control layer provided, in accordance with the present disclosure.
Figure 28F:
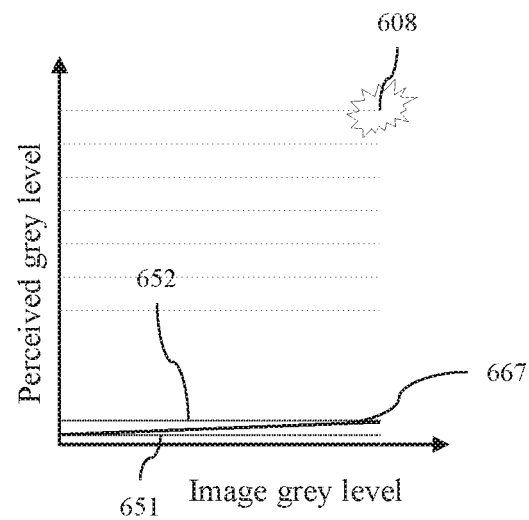
FIG. 28F is a schematic graph illustrating the variation of perceived grey level against image grey level for the snooper viewing the arrangement of FIG. 28E with ambient illumination, in accordance with the present disclosure.

FIG. 28E is a schematic diagram illustrating in perspective side view illumination of a snooper by the arrangement of FIG. 28G with a further angular luminance control layer provided as illustrated in FIGS. 16-20, and FIG. 28F is a schematic graph illustrating the variation of perceived grey level against image grey level for the snooper viewing the arrangement of FIG. 28E with ambient illumination.

In an illustrative embodiment, the angular luminance level may be reduced by the switchable retarder layer 892, compensator layer 890 and additional polariser 500 of FIG. 16. The luminance at a lateral angle of 45 degrees may be reduced from 5 nits to 1 nit when a voltage is applied by driver 884. For a contrast ratio of 1.05, the perceived dynamic range may be 0.7% which is close to the limit of visibility of contrast.

Advantageously the arrangements of FIGS. 16-20 may thus in combination provide an unexpected interaction that can achieve a uniform privacy display with perceived dynamic range that approaches the threshold of the human visual system in an office environment.

In a dark environment, the perceived dynamic range in the present illustrative embodiment is 5%, which provides a high level of privacy.

The present embodiments may be switched between a mode with a high level of image privacy and a wide angle mode for regular operation.

It may be desirable to reduce the thickness of the display in comparison to the arrangement of FIG. 15 for example.

Figure 29A:
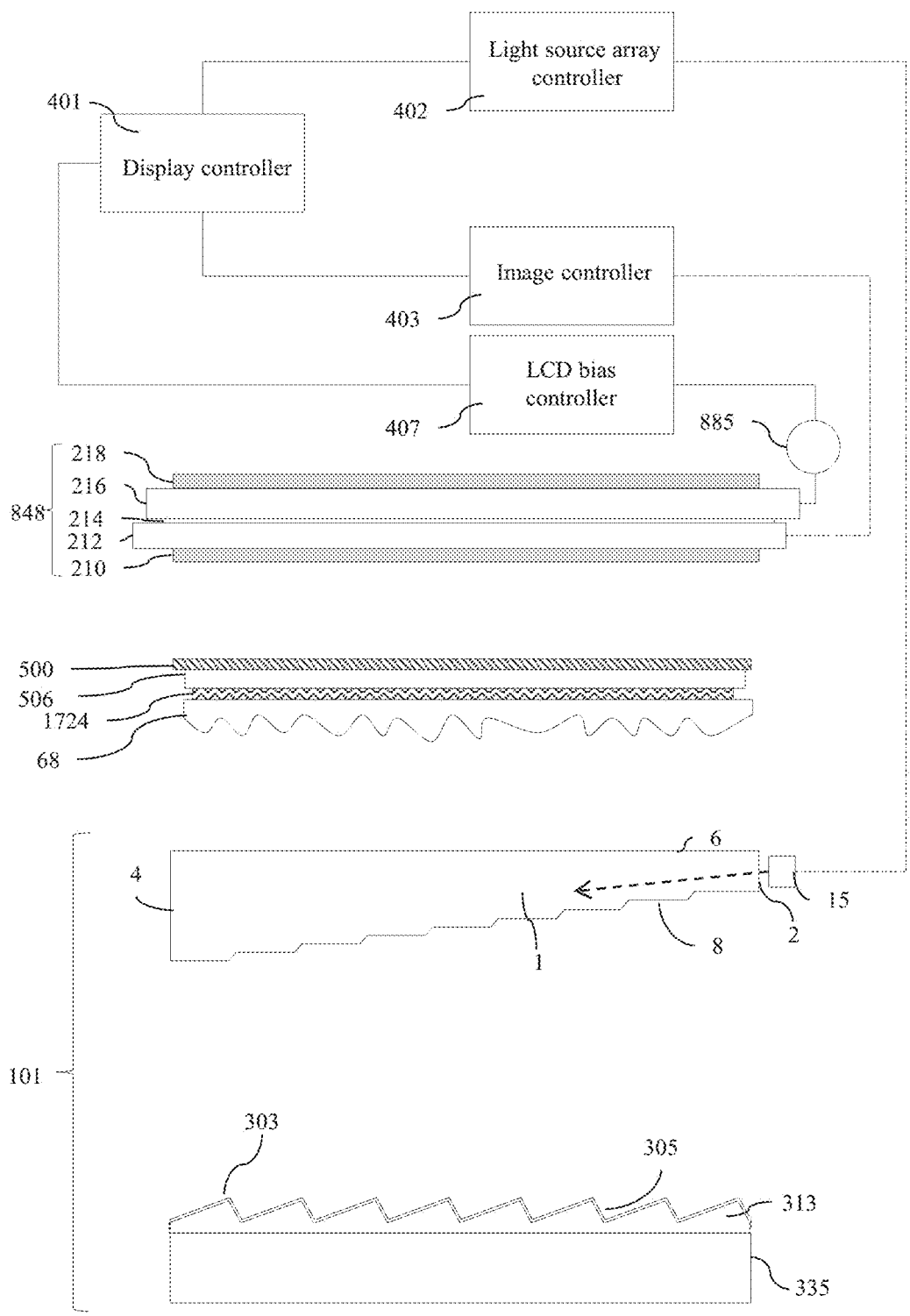
FIG. 29A is a schematic diagram illustrating in side view optical stacking and control of a switchable privacy display comprising biased LCD contrast control and phased illumination contrast control, in accordance with the present disclosure.
Figure 29B:
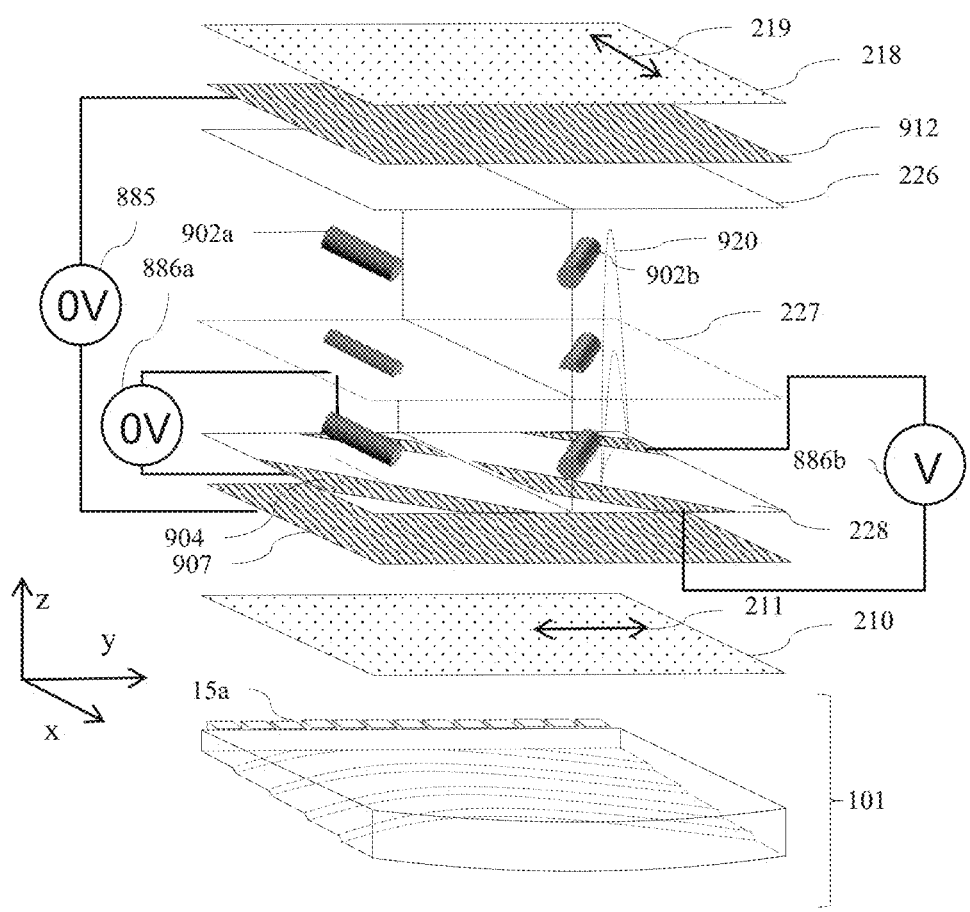
FIG. 29B is a schematic diagram illustrating in perspective side view an arrangement of retarder layers and directional waveguide illumination in a switchable privacy display comprising biased LCD contrast control and phased illumination contrast control in a wide angle mode of operation, in accordance with the present disclosure.
Figure 29C:
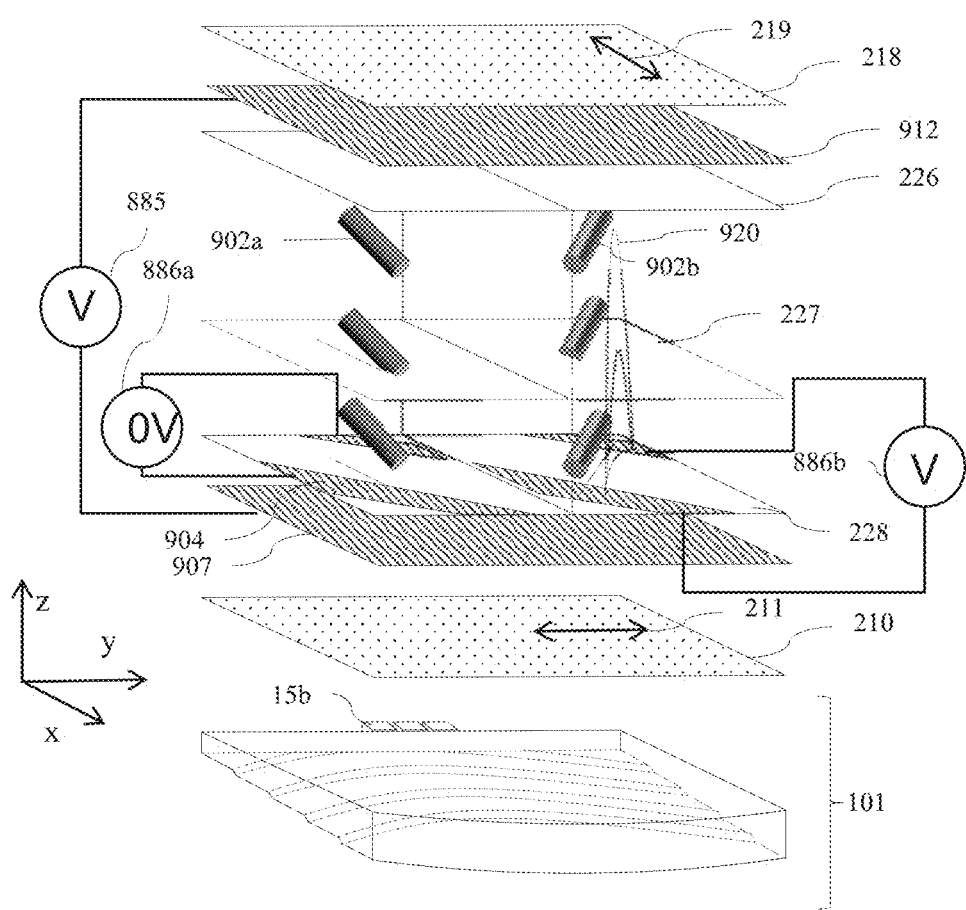
FIG. 29C is a schematic diagram illustrating in perspective side view an arrangement of retarder layers and directional waveguide illumination in a switchable privacy display comprising biased LCD contrast control and luminance control in a privacy mode of operation, in accordance with the present disclosure.
Figure 29D:
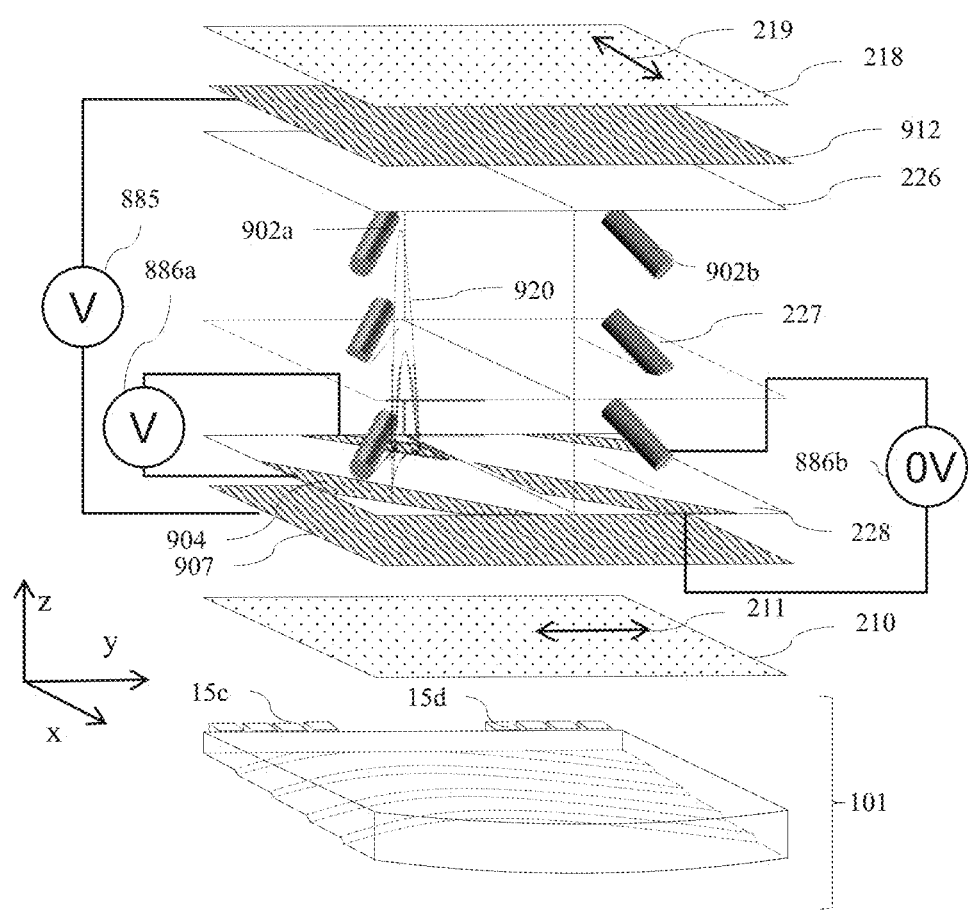
FIG. 29D is a schematic diagram illustrating in perspective side view an arrangement of retarder layers and directional waveguide illumination in a switchable privacy display comprising biased LCD contrast control and phased illumination contrast control in a second phase of a privacy mode of operation, in accordance with the present disclosure.

FIG. 29A is a schematic diagram illustrating in side view optical stacking and control of a switchable privacy display comprising biased LCD contrast control and phased illumination contrast control; FIG. 29B is a schematic diagram illustrating in perspective side view an arrangement of retarder layers and directional waveguide illumination in a switchable privacy display comprising biased LCD contrast control and phased illumination contrast control in a wide angle mode of operation; FIG. 29C is a schematic diagram illustrating in perspective side view an arrangement of retarder layers and directional waveguide illumination in a switchable privacy display comprising biased LCD contrast control and luminance control in a privacy mode of operation, and FIG. 29D is a schematic diagram illustrating in perspective side view an arrangement of retarder layers and directional waveguide illumination in a switchable privacy display comprising biased LCD contrast control and phased illumination contrast control in a second phase of a privacy mode of operation.

The operation of the embodiment of FIGS. 29A-29D is similar to the operation of FIGS. 16-20 other than the switchable retarder layer 892 is not provided. In comparison the embodiment has reduced thickness, with increased perceived dynamic range in environments with ambient illumination.

The embodiments of FIGS. 16-20 and FIGS. 29A-D use a time multiplexed spatial light modulator 848. It would be desirable to provide a conventional frame rate spatial light modulator.

Figure 30A:
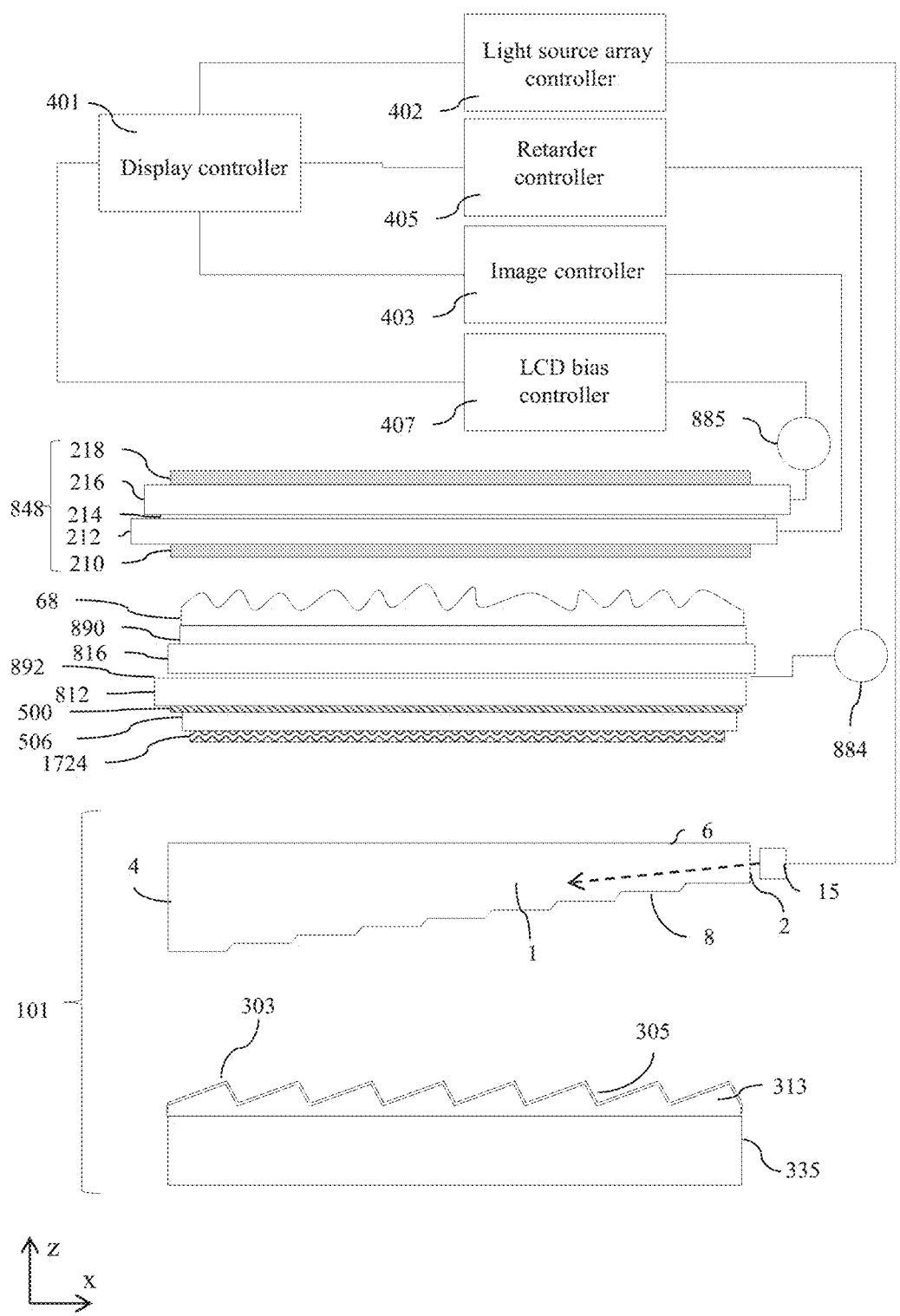
FIG. 30A is a schematic diagram illustrating in side view optical stacking and control of a switchable privacy display comprising biased LCD contrast control and off-axis luminance control, in accordance with the present disclosure.
Figure 30B:
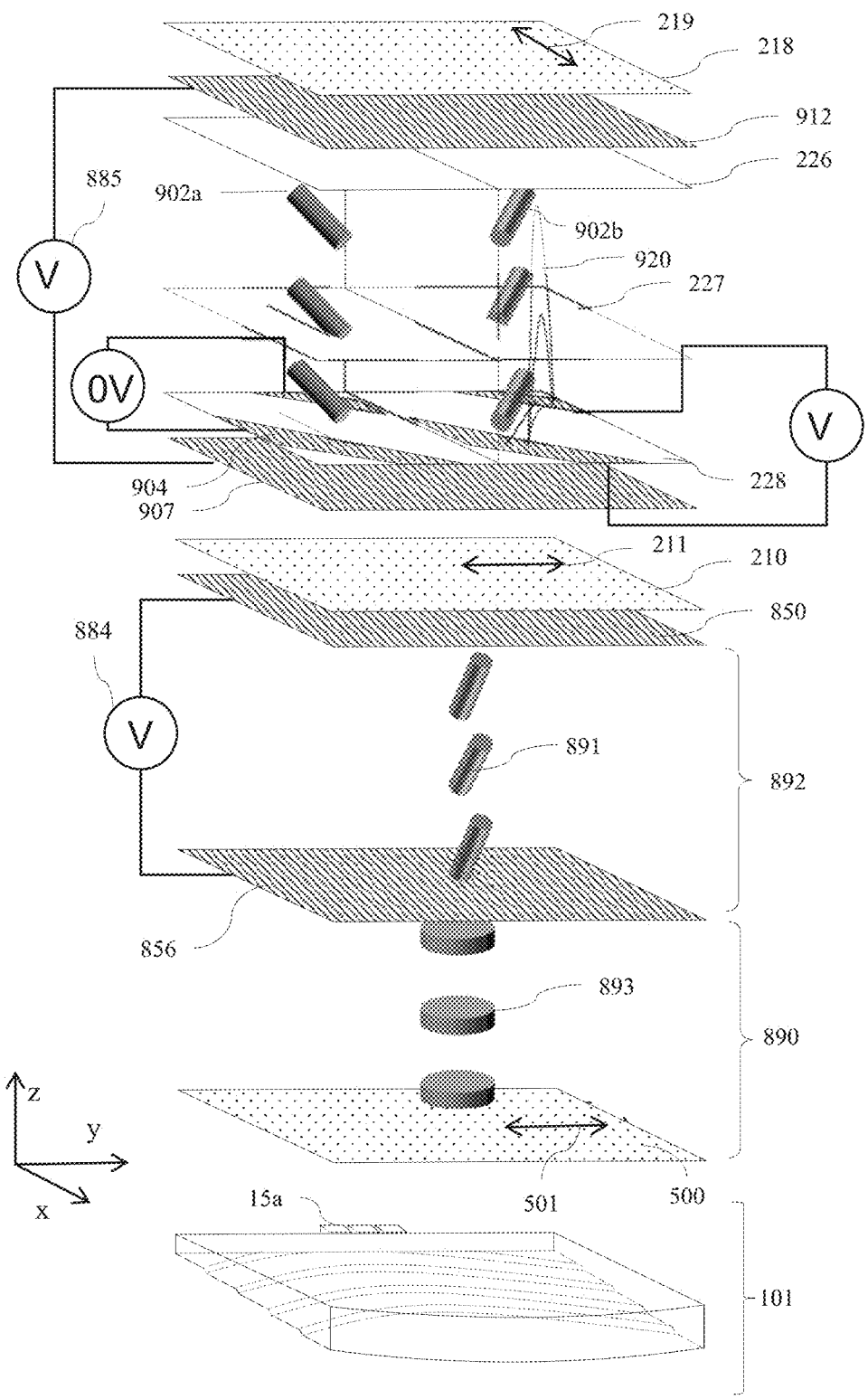
FIG. 30B is a schematic diagram illustrating in perspective side view an arrangement of retarder layers and directional waveguide illumination in a switchable privacy display comprising biased LCD contrast control and off-axis luminance control in a privacy mode of operation, in accordance with the present disclosure.

FIG. 30A is a schematic diagram illustrating in side view optical stacking and control of a switchable privacy display comprising biased LCD contrast control and off-axis luminance control; and FIG. 30B is a schematic diagram illustrating in perspective side view an arrangement of retarder layers and directional waveguide illumination in a switchable privacy display comprising biased LCD contrast control and off-axis luminance control in a privacy mode of operation.

In comparison to the time multiplexed embodiments, the spatial light modulator 848 cost may be reduced. Further the illumination slot width for the privacy mode of operation may be increased, so that the privacy mode may have higher luminance for the primary observer 45.

Figure 31A:
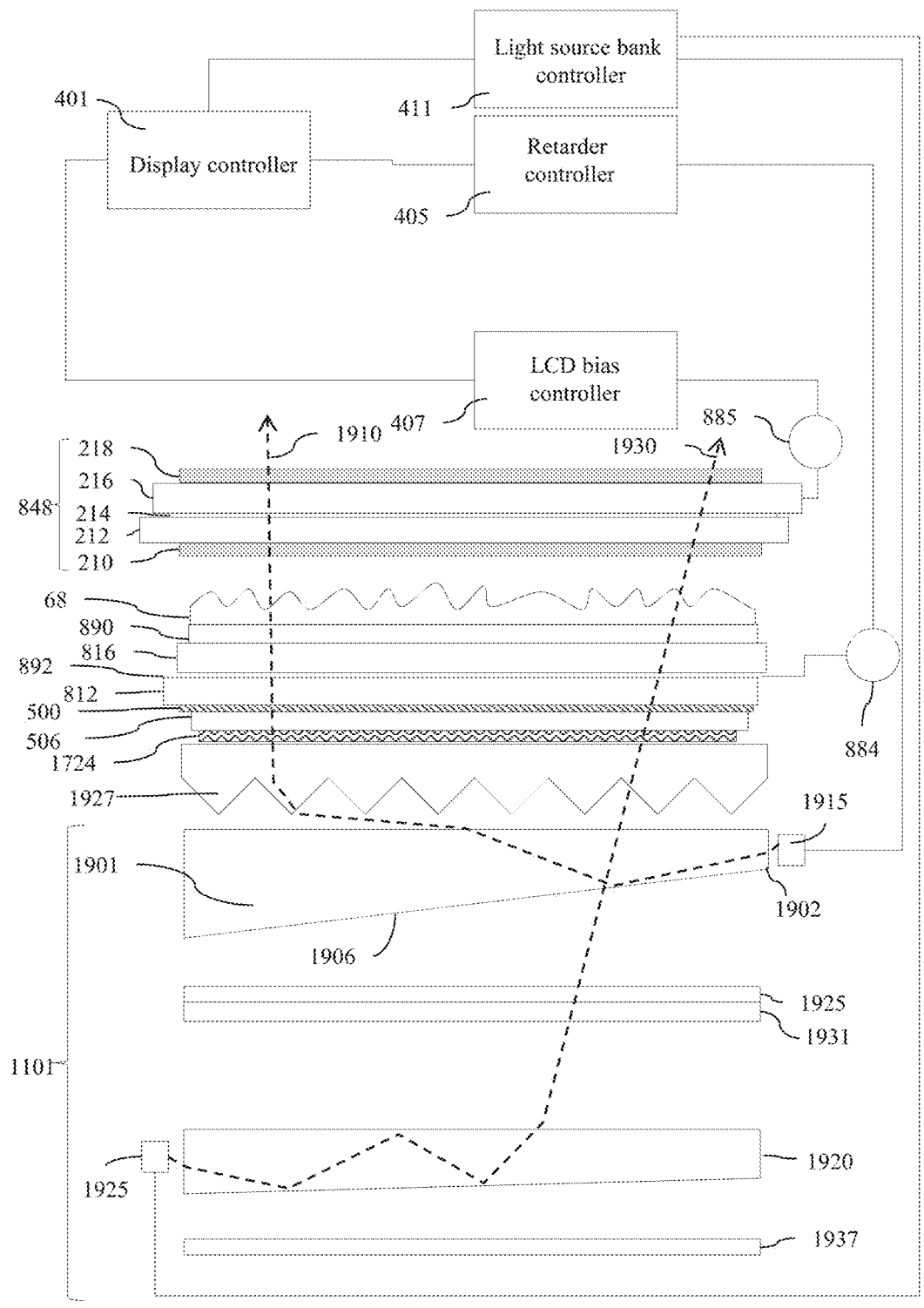
FIG. 31A is a schematic diagram illustrating in side view optical stacking and control of a switchable privacy display comprising multiple waveguides, biased LCD contrast control and off-axis luminance control, in accordance with the present disclosure.

Directional backlights comprising other types of waveguide will now be described FIG. 31A is a schematic diagram illustrating a side view of a directional display apparatus optical stack comprising a switchable directional backlight 1101 that comprises a light scattering waveguide 1901 and a wide angle waveguide 1920; a switchable liquid crystal O-plate 892 and a compensation retarder 890 arranged between additional polariser 500 and input polariser 210.

Light source bank controller 411 may be arranged to provide operation of light sources 1925 in a wide angle mode of operation and operation of either light source 1915 or light sources 1915 and 1925 in a privacy mode of operation.

In operation fixed collimating waveguide 1901 is illuminated on side 1902 by light source 1915. The waveguide 1901 is provided with at least one scattering side 1906 and optionally a taper that has a cross sectional shape that increases in width for light propagating in the waveguide 1901 in a direction away from the light sources at the input end 1902. The waveguide 1901 may further be provided by light redirecting micro structures. Light rays 1910 that leak from the upper surface 1906 and are incident on prism array 1926. Prism array 1927 deflects grazing incidence light rays 1910 towards the normal direction, providing a narrow light cone angle in the lateral direction (y-z plane) that may be partially diffused by diffuser 1929. The direction of the ray 1910 is substantially independent of the location of the light source 1915 on the input side 1902 and the fixed collimating waveguide 1901 does not image the source 1915 in comparison to imaging waveguide 1 that provides optical windows.

Thus a directional backlight may comprise a waveguide 1920 that is arranged to deflect input light rays 1910 guided through the waveguide 1920 from the light sources 1915 to exit through the first guide surface 1906. One of the optical components 726 may comprise a prism array 1927 arranged to deflect light rays 1910 that exit through the first guide surface 1906 of the waveguide 1901.

To provide a wide angle mode of operation, a second wide angle waveguide 1920 may be provided. Wide angle waveguide 1920 is provided with microstructures (not shown) on the surfaces 1921, 1919 to provide scattered light for light rays 1930 from light sources 1925.

Switchable liquid crystal retarder 892 and compensation retarder 890 may advantageously achieve substantially reduced off-axis image visibility to a snooper 47 in privacy mode of operation.

In an illustrative embodiment of the privacy mode, such a display with a head-on luminance of 200 nits and with an off-axis luminance of 1 nit and an image contrast ratio of 3:1 may be operated in an ambient illumination of 500 lux. The primary observer 45 will see an increased contrast and colour uniformity of the display in comparison to the arrangement of profile 680 in FIG. 25B. Such a display may provide a perceived dynamic range of 10%.

By way of comparison FIG. 25C illustrates the contrast change across an image of a bias spatial light modulator 848, where even for a display with a contrast ratio of 1.0 in one region, a contrast ratio of 1.2 will be seen in other regions. Such a biased LCD with a conventional wide angle backlight may have a luminance at 45 degrees of 20 nits and thus a perceived dynamic range of 13% in a 500 lux environment.

Thus the present embodiments provide interaction of luminance reduction and contrast control that may advantageously achieve increased fidelity for head-on contrast uniformity, while maintaining or improving privacy performance for off-axis snoopers 47.

Figure 31B:
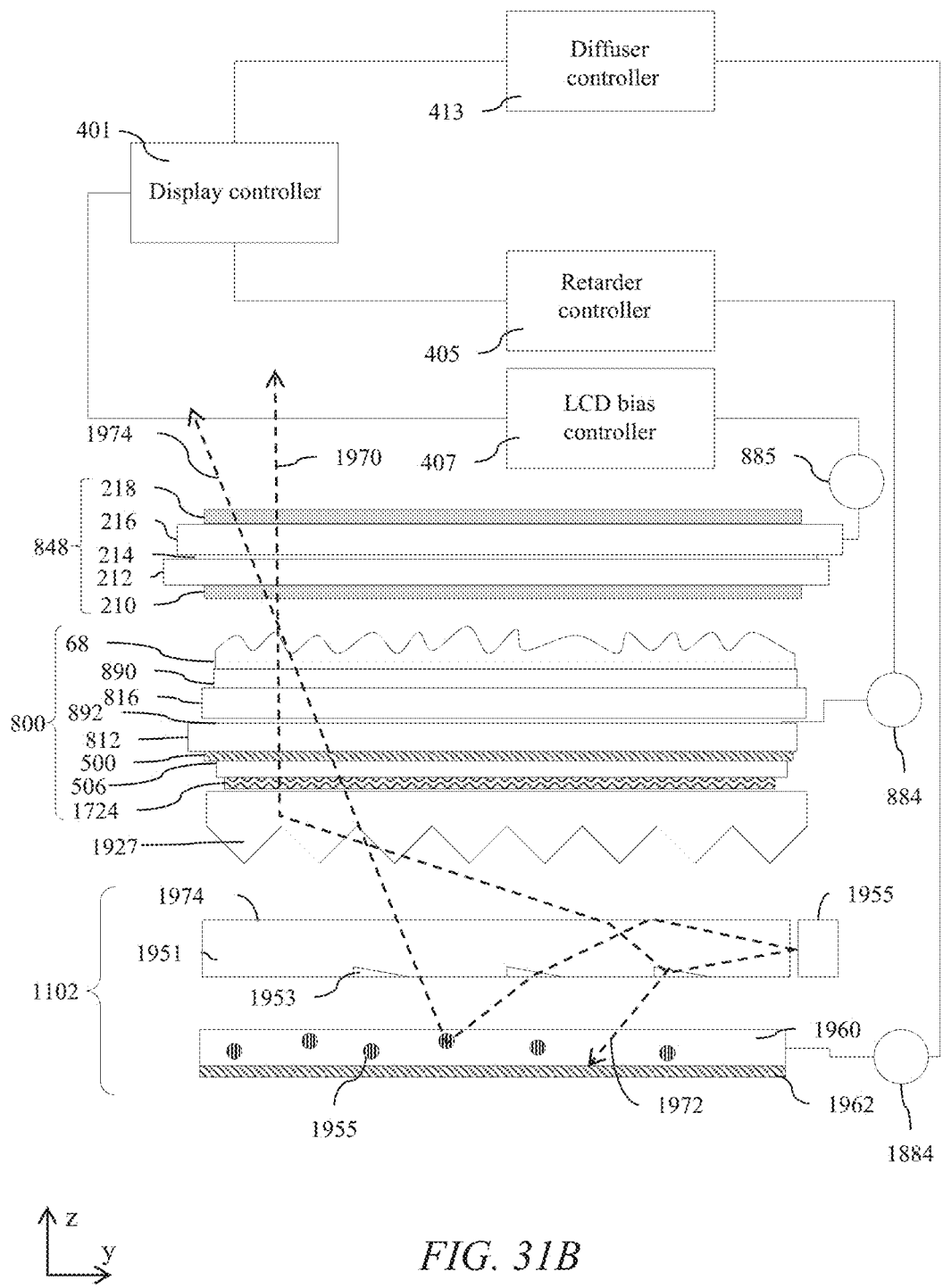
FIG. 31B is a schematic diagram illustrating in side view optical stacking and control of a switchable privacy display comprising a collimated waveguide, a switchable diffuser, biased LCD contrast control and off-axis luminance control, in accordance with the present disclosure.

FIG. 31B is a schematic diagram illustrating a side view of a directional display apparatus optical stack comprising a switchable directional backlight 1102 comprising a collimating waveguide 1951 and switchable diffuser 1960; a switchable liquid crystal O-plate 892 and a compensation retarder.

Display controller 401 may provide control signals to diffuser controller 413 that is arranged to switch diffuser 1960 between a diffusing state for a wide angle mode of operation and clear state for privacy operation.

Fixed collimating waveguide 1951 may be provided with microstructures 1953 that couple some light rays 1970 from light source 1955 into the vertical direction by means of reflection at prism array 726. The microstructures operate in a similar manner to the waveguide of FIG. 31B, thus the at least one waveguide 1951 comprises an array of microstructures 1953.

The backlight may further incorporate a switchable diffuser layer 1960 comprising polymer dispersed liquid crystal (PDLC) 1955. In a narrow angle mode of operation, the liquid crystal is arranged to transmit light rays 1972 that are transmitted, through microstructures 1953. Light rays 1972 are absorbed by absorbing layer 1962 and thus not output through the spatial light modulator 848.

In a wide angle mode of operation, the liquid crystal molecules in the PDLC 1955 are switched to provide a scattering function with the surrounding medium and thus light rays 1974 are scattered to a wide range of viewing positions.

Switchable liquid crystal retarder 892 and compensation retarder 890 may advantageously achieve substantially reduced off-axis image visibility to a snooper in privacy mode of operation.

It may be desirable to increase the control of off-axis contrast to a snooper while maintaining on-axis contrast performance to the primary observer 45.

Figure 32A:
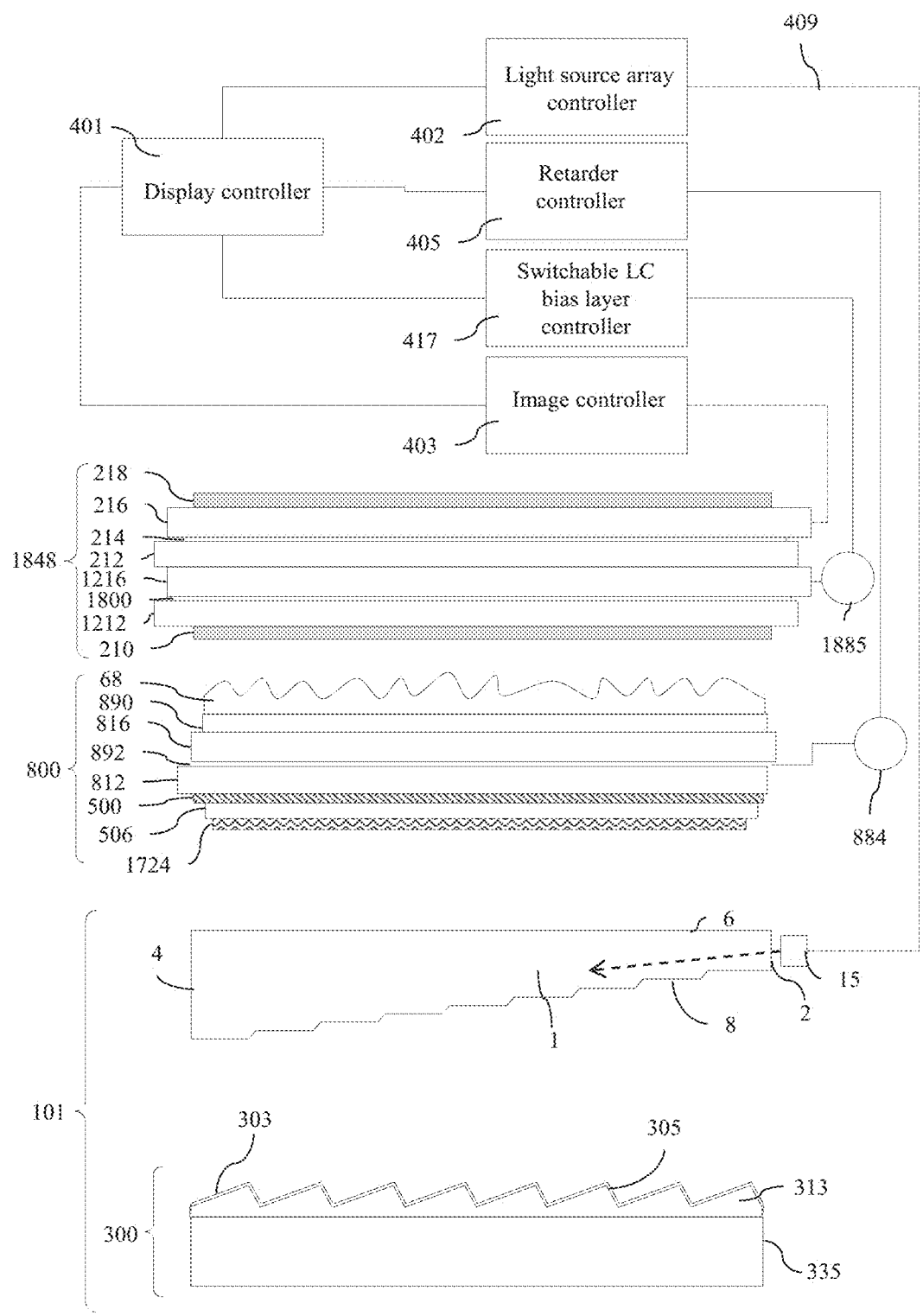
FIG. 32A is a schematic diagram illustrating in side view optical stacking and control of a switchable privacy display comprising a switchable liquid crystal bias layer arranged between the input and output polariser of a spatial light modulator, in accordance with the present disclosure.

FIG. 32A is a schematic diagram illustrating in side view optical stacking and control of a switchable privacy display comprising a switchable liquid crystal bias layer 1800 arranged between the input polariser 210 and output polariser 218 of a spatial light modulator 1848. Switchable liquid crystal bias layer 1800 may be provided between substrates 1216, 1212 with transparent driving electrodes. Layers 1216, 212 may be provided on a single substrate to provide reduced cost.

Further compensation retarders (not shown) may be provided to modify the retardance properties of the liquid crystal bias layer. Switchable LC bias layer controller 417 may be arranged to control driver 1885 that is arranged to drive a voltage across the layer 1800.

The operation of the privacy display of FIG. 32A is similar to that illustrated in FIG. 14, other than the liquid crystal pixel layer 214 is formed in a conventional manner without an applied bias field. Further liquid crystal bias layer 1800 is provided to achieve off-axis contrast reduction in a privacy mode of operation, and maintain off-axis contrast in a wide angle mode of operation.

Figure 32B:
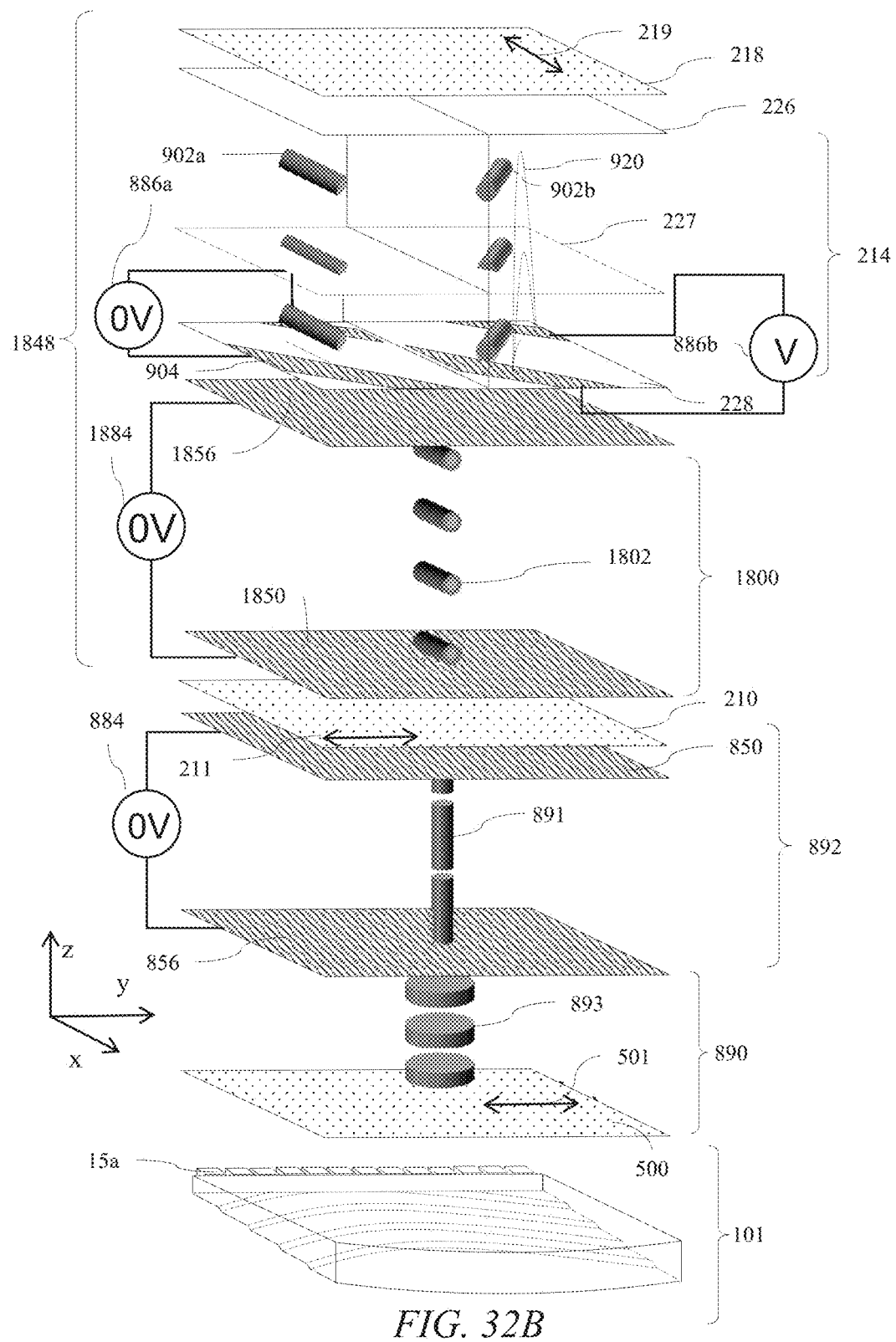
FIG. 32B is a schematic diagram illustrating in perspective side view an arrangement comprising directional backlight illumination, switchable retarder layer, and a spatial light modulator comprising a pixel layer and a switchable liquid crystal bias layer in a wide angle mode of operation of a switchable privacy display, in accordance with the present disclosure.

FIG. 32B is a schematic diagram illustrating in perspective side view an arrangement of directional backlight 101 illumination, switchable retarder layer 892, and a spatial light modulator 1848 comprising pixel layer 214 and a switchable liquid crystal bias layer in a wide angle mode of operation of a switchable privacy display. As illustrated for FIG. 15A, the directional backlight 101 and retarder layer 892 cooperate to provide a wide angle luminance profile, such as illustrated in FIG. 15C.

Switchable liquid crystal layer 1800 is provided that may have homogeneous alignment at alignment layers (not shown) and no bias voltage is applied by driver 1884 so that the molecules 1802 have substantially homogenous alignment.

In operation, the molecules 1802 are substantially aligned parallel or orthogonal to the polarisation state 211 transmitted by the input polariser 210. The layer 1800 may be provided with substantially no off-axis birefringence and a wide angle contrast profile may be achieved by the spatial light modulator 1848.

Figure 32C:
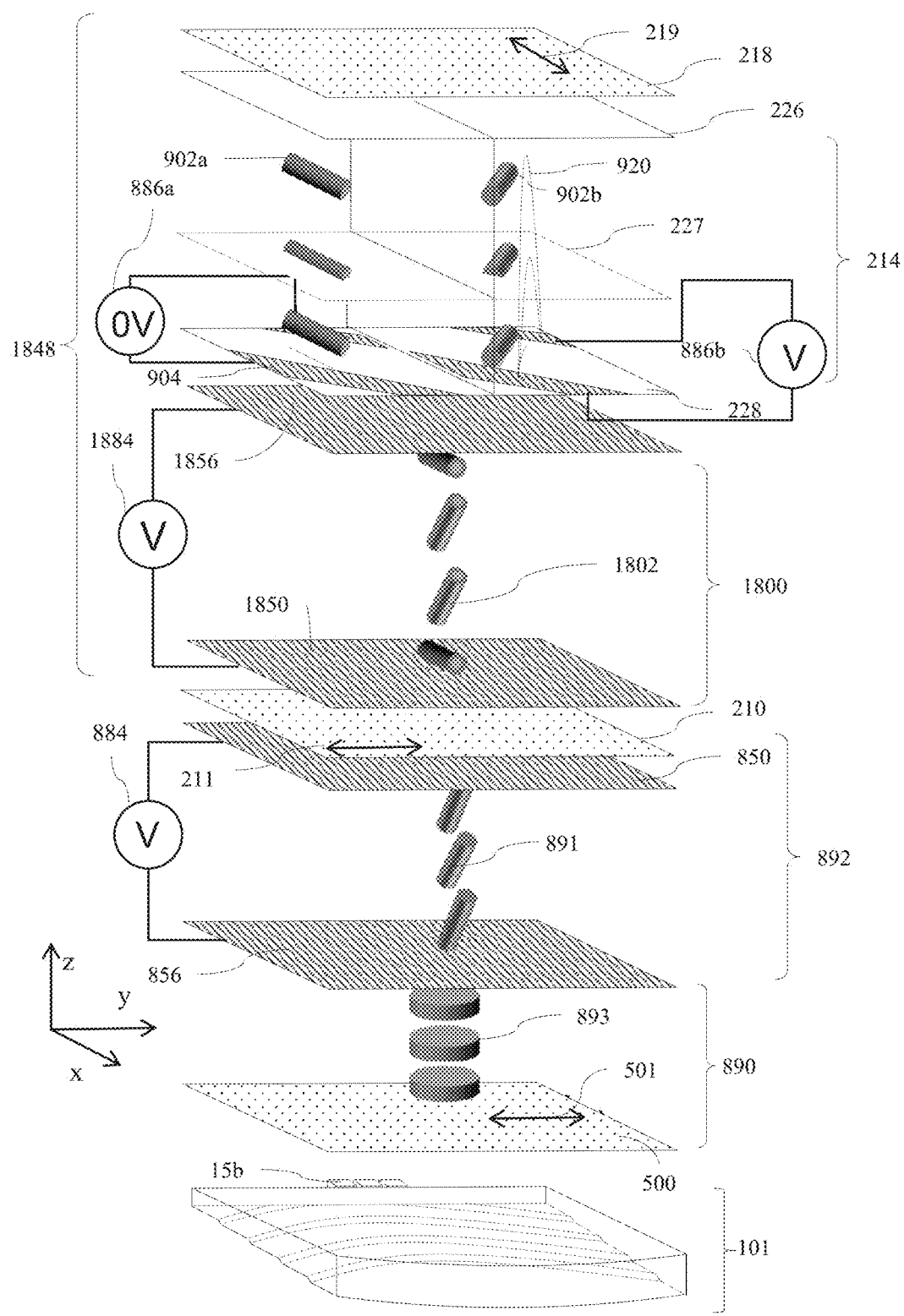
FIG. 32C is a schematic diagram illustrating in perspective side view an arrangement comprising directional backlight illumination, switchable retarder layer, and a spatial light modulator comprising a pixel layer and a switchable liquid crystal bias layer in a wide angle mode of operation of a switchable privacy display in a first phase of a privacy mode of operation, in accordance with the present disclosure.

FIG. 32C is a schematic diagram illustrating in perspective side view an arrangement of directional backlight 101 illumination, switchable retarder layer 892, and a spatial light modulator 1848 comprising pixel layer 214 and a switchable liquid crystal bias layer 1800 in a first phase of a privacy mode of operation.

In comparison to the arrangement of FIG. 16, bias electrodes are not provided across the liquid crystal pixel layer 214, and the layer 214 may operate as a conventional liquid crystal pixel layer.

Switchable liquid crystal bias layer 1800 may be driven by a bias voltage that is applied by means of driver 1884 so that the molecules 1802 have an O-plate arrangement, that is the directors of the molecules 1802 may be tilted at locations not close to respective upper and lower alignment layers (not shown). Such a tilt may provide off-axis birefringence such that the polar contrast profile of the display is modified.

A privacy display may operate in only a first phase of operation. A conventional low frame rate LCD may be used for the pixel layer 214, such that power consumption and power consumption of the spatial light modulator is reduced in comparison to high frame rate pixel layers 214.

In comparison to the arrangement of FIG. 16, the arrangement of FIG. 32C may provide polar contrast modification independently of pixel data provided by the pixel layer 214.

In the biased LCD 848 of FIG. 16, the optical thickness of the liquid crystal pixel layer may be set to provide optimum transmission in the wide angle mode of operation. During switching to the privacy mode, the optical thickness of the cell may reduce due to the tilt of the molecules 902, so that on-axis transmission is degraded for head-on operation.

Further the arrangement of the pixels may typically be multi-domain to enhance the angular viewing profile in the wide angle mode; that is multiple orientations of white state pixels are provided. When a bias voltage is applied, the molecules undergo both tilt and twist orientations, providing undesirable white state and contrast angular characteristics for small changes of viewing angle. Further the tilt of the molecules 902 in the black state provides a rapid variation of image contrast with viewing angle, providing the angular contrast properties as described with reference to FIGS. 25A-B.

By way of comparison, in the embodiment of FIG. 32C, the optical thickness of the layer 1800 may be adjusted so that in the privacy mode of operation, the luminance of head-on illumination is increased. The tilt and twist orientations of the molecules 902b is consistent with well know liquid crystal orientations. The polarisation modification operation of the liquid crystal pixels is thus similar to that of a conventional display and improved angular luminance profiles may be provided.

Advantageously improved contrast properties may be provided for head-on operation in comparison to the arrangement of FIG. 16.

For off-axis locations, the polarisation state that is incident onto the pixel layer 214 is modified so that black state luminance is increased, and white state luminance decreased as will be described.

It may be desirable to achieve further reduction of perceived dynamic range by means of two phase contrast reduction.

Figure 32D:
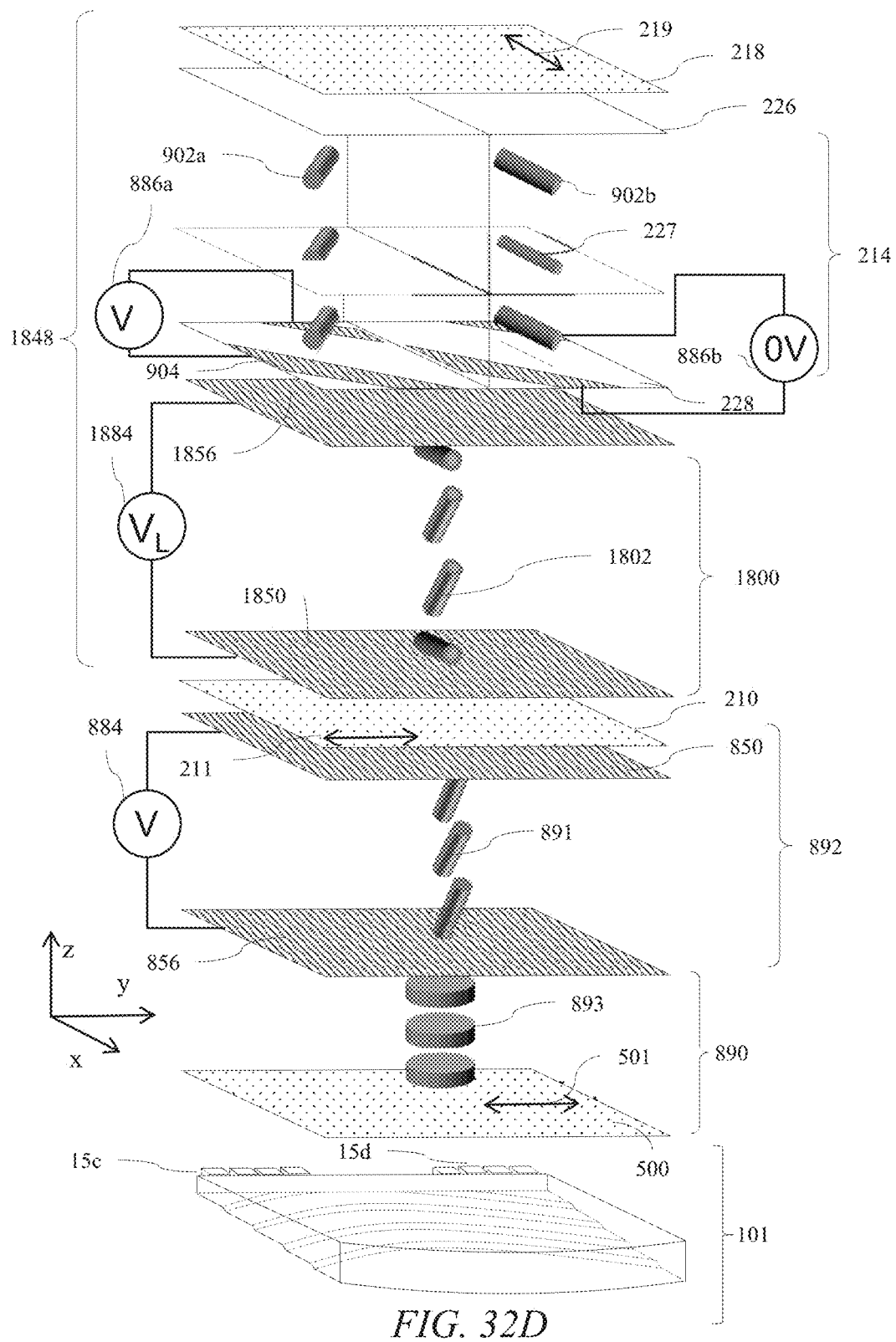
FIG. 32D is a schematic diagram illustrating in perspective side view an arrangement comprising directional backlight illumination, switchable retarder layer, and a spatial light modulator comprising a pixel layer and a switchable liquid crystal bias layer in a wide angle mode of operation of a switchable privacy display in a second phase of a privacy mode of operation, in accordance with the present disclosure.

FIG. 32D is a schematic diagram illustrating in perspective side view an arrangement of directional backlight 101 illumination, switchable retarder layer 892, and a spatial light modulator 1848 comprising pixel layer 214 and a switchable liquid crystal bias layer in a second phase of a privacy mode of operation.

The operation of the apparatus of FIG. 32C is similar to the arrangement of FIG. 20, however the liquid crystal bias layer 1800 remains driven as illustrated in FIG. 32C to achieve further off-axis contrast reduction. Alternatively the switching layer 1800 may further be controlled so that the off-axis image contrast is adjusted in response to the switching characteristics of the layer 214.

Advantageously very low levels of perceived dynamic range may be provided to snooper 47.

It would be desirable to provide a reduced contrast image over a wide viewing angle.

Figure 32E:
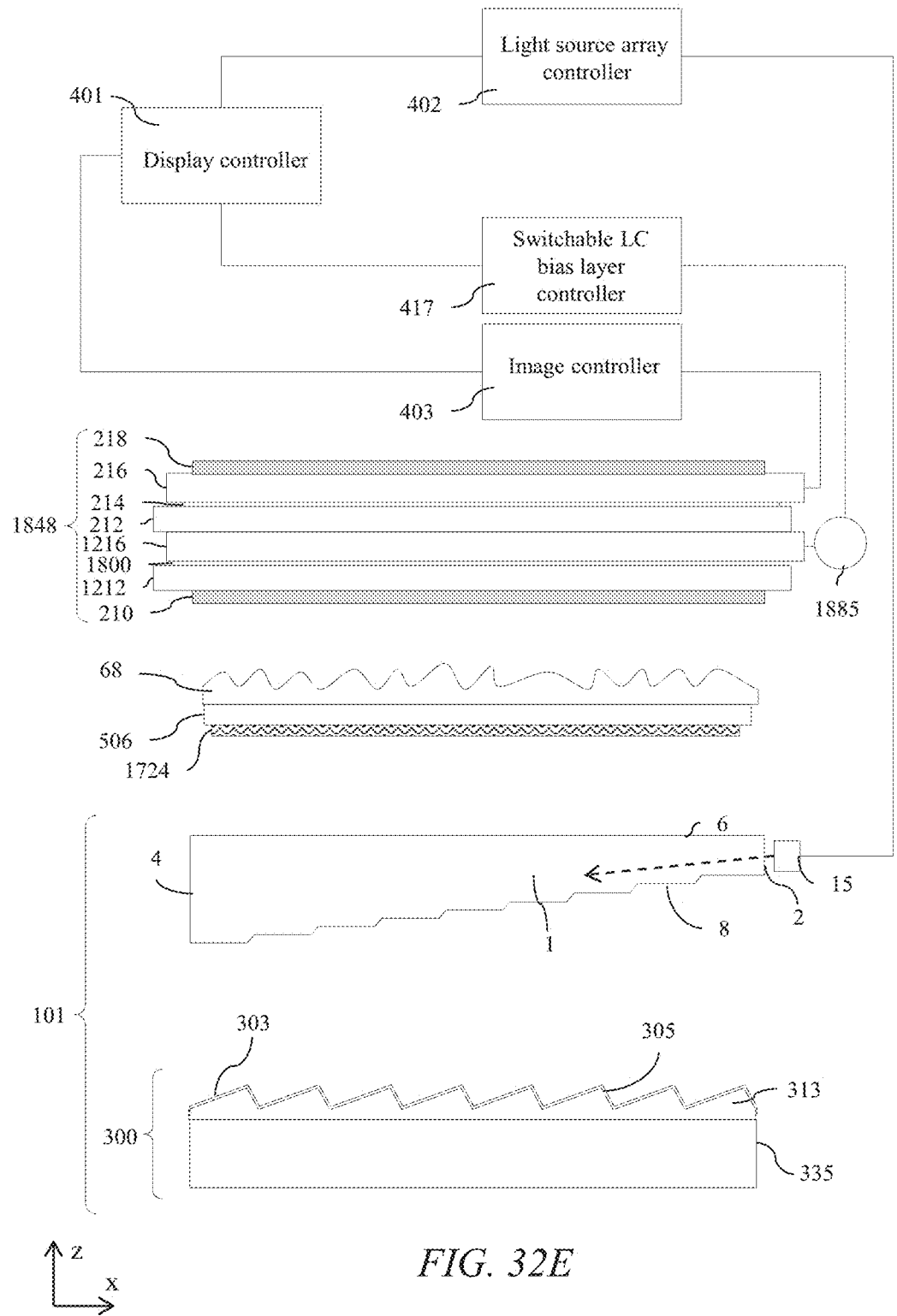
FIG. 32E is a schematic diagram illustrating in side view optical stacking and control of a switchable privacy display comprising a modulated switchable liquid crystal bias layer arranged between the input and output polariser of a spatial light modulator, in accordance with the present disclosure.
Figure 32F:
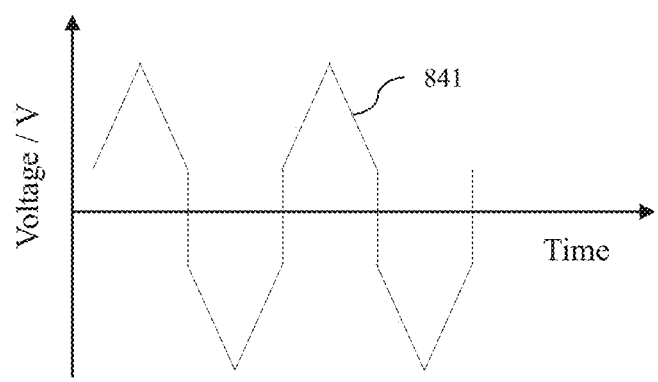
FIG. 32F is a schematic graph illustrating a variation in voltage against time across the bias liquid crystal layer of FIG. 32C, in accordance with the present disclosure.

FIG. 32E is a schematic diagram illustrating in side view optical stacking and control of a switchable privacy display comprising a modulated switchable liquid crystal bias layer arranged between the input and output polarises of a spatial light modulator. Driver 1885 may be provided with a modulate voltage signal by bias layer controller 417 such as shown in FIG. 32F which is a schematic graph illustrating a variation in voltage against time across the bias liquid crystal layer 1800 of FIG. 32C. The time interval between adjacent peaks may be arranged so that the eye integrates the resultant contrast profile produced by the display without image flicker for a given viewing polar location. In an illustrative example, the profile may have a frequency of 100 Hz or greater.

Figure 32G:
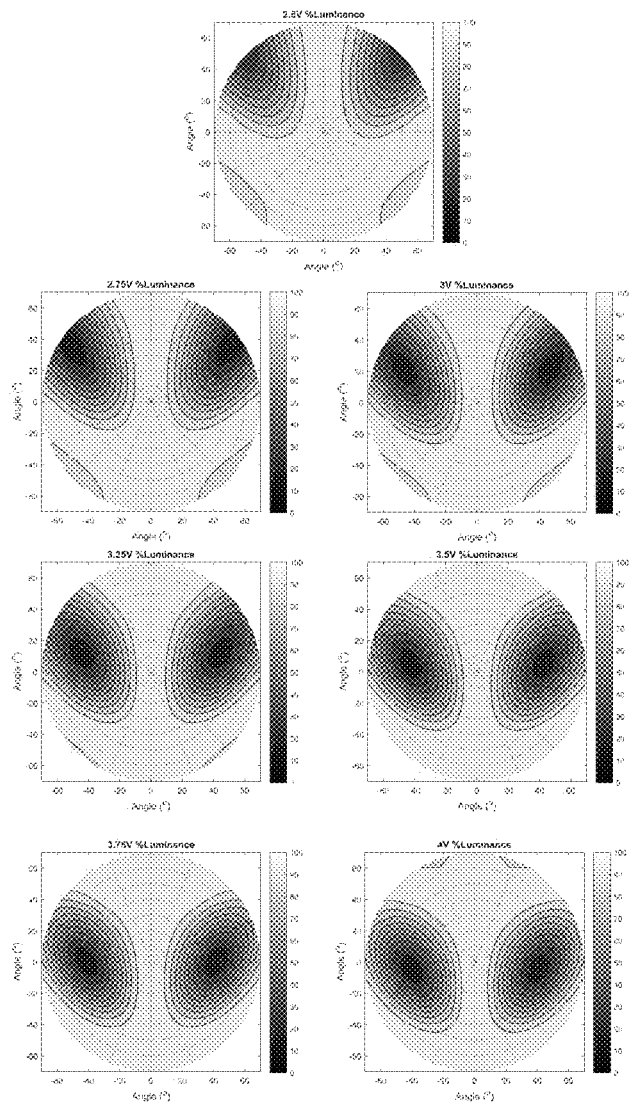
FIG. 32G are schematic polar luminance graphs illustrating variation in transmitted luminance of a modulated liquid crystal O-plate arranged between parallel polarisers for different voltages, in accordance with the present disclosure.

FIG. 32G are schematic polar luminance graphs illustrating variation in transmitted luminance of a modulated liquid crystal O-plate arranged between parallel polarisers for different voltages. While the graphs illustrate luminance differences between parallel polarisers, they also provide an indication of the polarisation state that is incident onto the pixel layer 214, and thus the polar contrast profile of the display 100. It can be observed that the minimum polarisation state is provided as a 'bulls-eye' polar profile, and thus the contrast cancellation may have a limited polar range for a given drive voltage. On driving with a signal similar to that illustrated in FIG. 32F, the bulls eye may translate in polar coordinates.

Figure 32H:
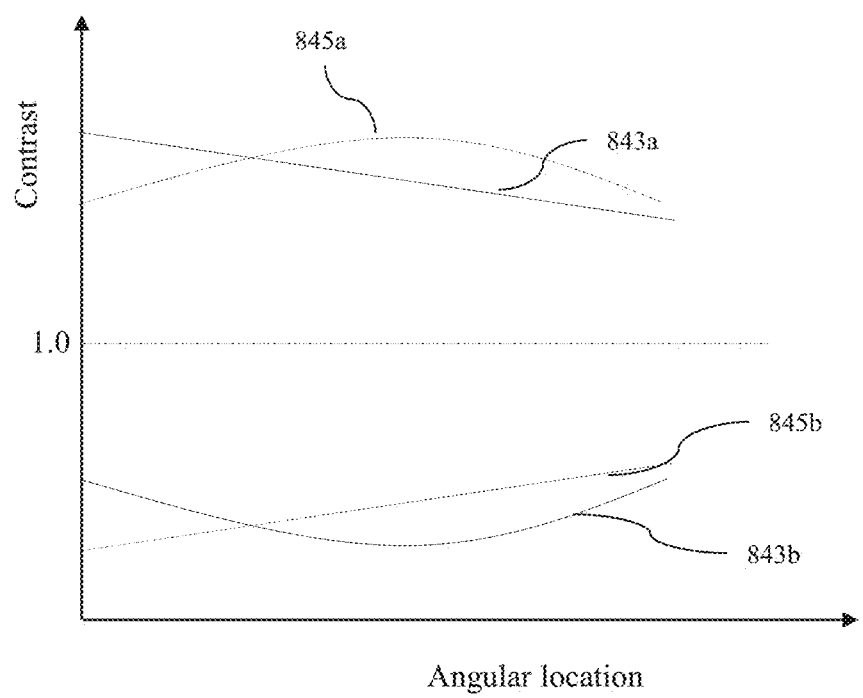
FIG. 32H is a schematic graph illustrating a variation in contrast against viewing angle for a bias liquid crystal layer of FIG. 32C controlled with the voltage signal of FIG. 32F, in accordance with the present disclosure.

FIG. 32H is a schematic graph illustrating a variation in contrast against viewing angle for a bias liquid crystal layer of FIG. 32C controlled with the voltage signal of FIG. 32F.

In an illustrative example, an observer may be located at a polar location of 45 degrees lateral angle and zero degrees elevation. At one time instant, the contrast profile 843a may be provided across the display width. At a second time instant, the voltage across the cell may be adjusted so that the contrast profile 843b is provided which has an inverted contrast profile. The snooper's visual system may integrate the respective contrast images such that a reduced contrast image (i.e. a contrast closer to 1.0) is provided.

Similarly for a different viewing location, profiles 845a, 845b may be provided during the cycling of the voltage across the bias liquid crystal layer 1800. Advantageously the viewing angle of the display may be increased in comparison to a fixed voltage level. Further DC balancing of the liquid crystal layer may be provided.

FIG. 32F are schematic polar luminance graphs illustrating variation in transmitted luminance of a modulated liquid crystal O-plate arranged between parallel polarisers for different voltages for different voltages from 2.5V to 4V. Thus the applied voltage may provide control of the polar luminance minima locations in the privacy mode of operation. Further the luminance minima may be controlled between an elevation that is zero or less to elevations that are in the upper quadrants of the polar profile.

It may be desirable to further reduce the visibility of a privacy image to a snooper 47 by means of providing image camouflage.

Figure 33A:
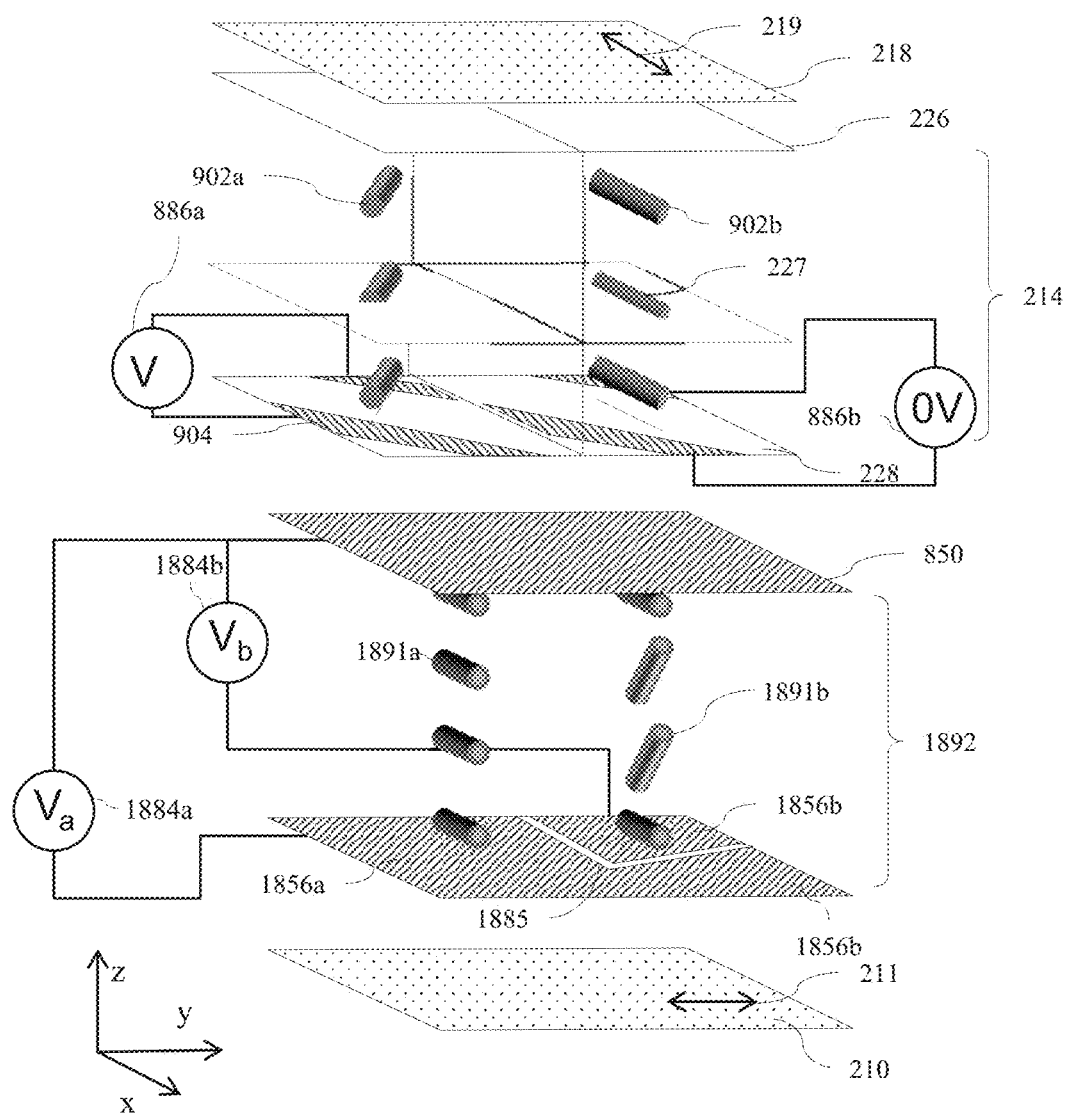
FIG. 33A is a schematic diagram illustrating in perspective side view orientations of a homogeneously aligned switchable liquid crystal O-plate arranged between the input and output polarisers of a spatial light modulator further comprising switchable camouflage regions in a contrast controlled privacy mode of operation, in accordance with the present disclosure.

FIG. 33A is a schematic diagram illustrating in perspective side view orientations of a homogeneously aligned switchable liquid crystal O-plate 892 arranged between the input and output polarisers 210, 218 of a spatial light modulator 1848 further comprising switchable camouflage regions in a contrast controlled privacy mode of operation. At least one of the electrodes 1850, 1856 may be patterned, in this example electrode 1856 is patterned with regions 1856a, 1856b and driven by respective voltage drivers 1884a, 1884b with voltages Va, Vb. Gaps 1885 may be provided between the electrode regions 1856a, 1856b. The tilt of the molecules 1891a, 1891b may thus be adjusted independently to reveal a camouflage pattern with different contrast levels for off-axis viewing.

Figure 33B:
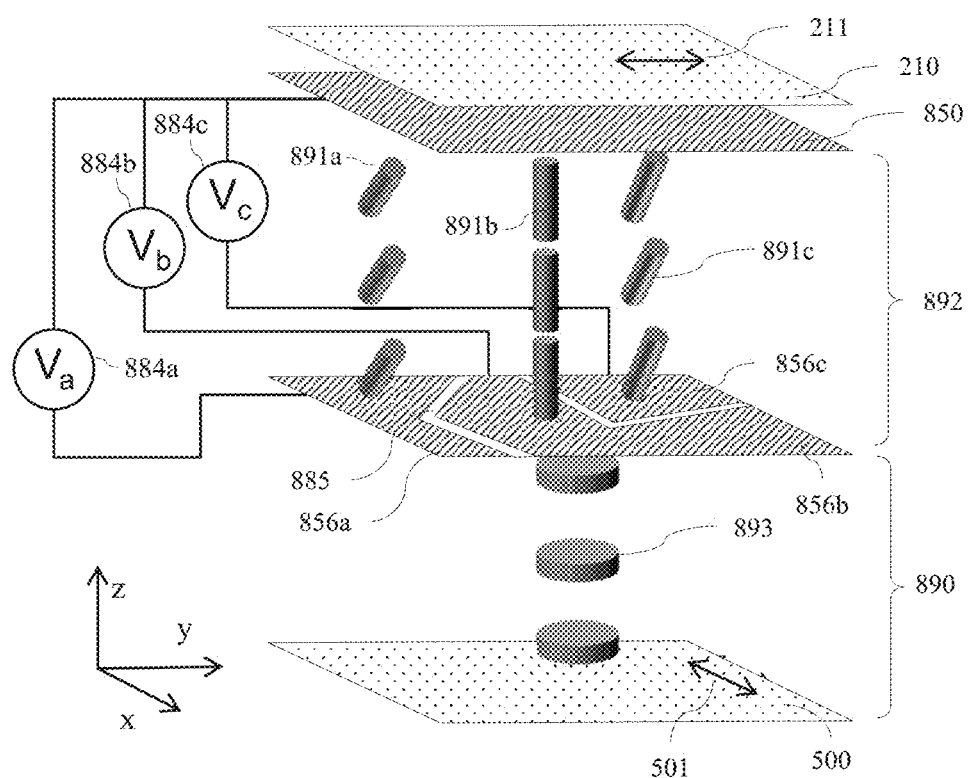
FIG. 33B is a schematic diagram illustrating in perspective side view orientations of a homeotropically aligned switchable liquid crystal O-plate and compensation C-plate arranged between the input polarizer of a spatial light modulator and an additional polarizer, further comprising switchable camouflage regions in a luminance controlled privacy mode of operation, in accordance with the present disclosure.

FIG. 33B is a schematic diagram illustrating in perspective side view orientations of a homeotropically aligned switchable liquid crystal O-plate and compensation C-plate arranged between the input polariser 210 of a spatial light modulator 48, 848, 1848 and an additional polariser 500, further comprising switchable camouflage regions in a luminance controlled privacy mode of operation. At least one of the electrodes 850, 856 may be patterned, in this example electrode 856 is patterned with regions 856a, 856b and driven by respective voltage drivers 884a, 884b with voltages Va, Vb. Gaps 885 may be provided between the electrode regions 856a, 856b. The tilt of the molecules 891a,

891*b* may thus be adjusted independently to reveal a camouflage pattern with different contrast levels for off-axis viewing.

Figure 33C:
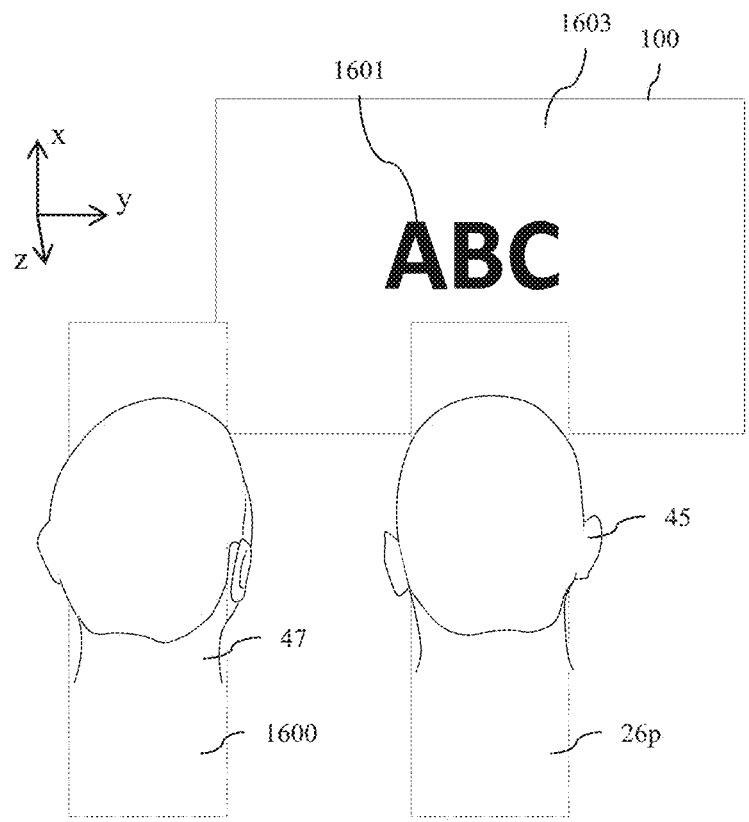
FIG. 33C is a schematic diagram illustrating in perspective front view illumination of a primary observer and a snooper by a camouflaged luminance controlled privacy display, in accordance with the present disclosure.

FIG. 33C is a schematic diagram illustrating in perspective front view illumination of a primary observer 45 and a snooper 47 by a camouflaged luminance and contrast controlled privacy display. As described above, the liquid crystal material tilts in the head-on operation provide substantially no visibility of the camouflage image to the primary observer 45.

Figure 33D:
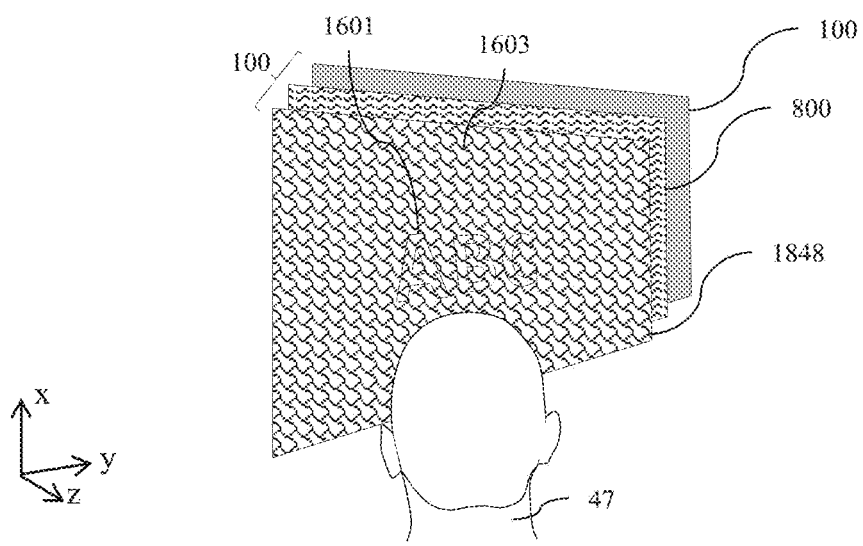
FIG. 33D is a schematic diagram illustrating in perspective side view illumination of a snooper by a camouflaged luminance and contrast controlled privacy display, in accordance with the present disclosure.

FIG. 33D is a schematic diagram illustrating in perspective side view illumination of a snooper 47 by a camouflaged luminance and contrast controlled privacy display 100 comprising camouflage bias layer 1892 for contrast controlled camouflage and layer 892 for luminance controlled camouflage. Multiple camouflage patterns may be revealed to the snooper in privacy mode of operation for luminance, contrast or both luminance and contrast. Further Moiré effects may be provided between the two separated camouflaged layers, further providing image disruption to the snooper 47 while maintaining a substantially uniform image to the primary observer 45. Advantageously image visibility to snooper 47 may be further degraded.

The operation of the privacy displays of the present disclosure will now be described in further detail.

Figure 34A:
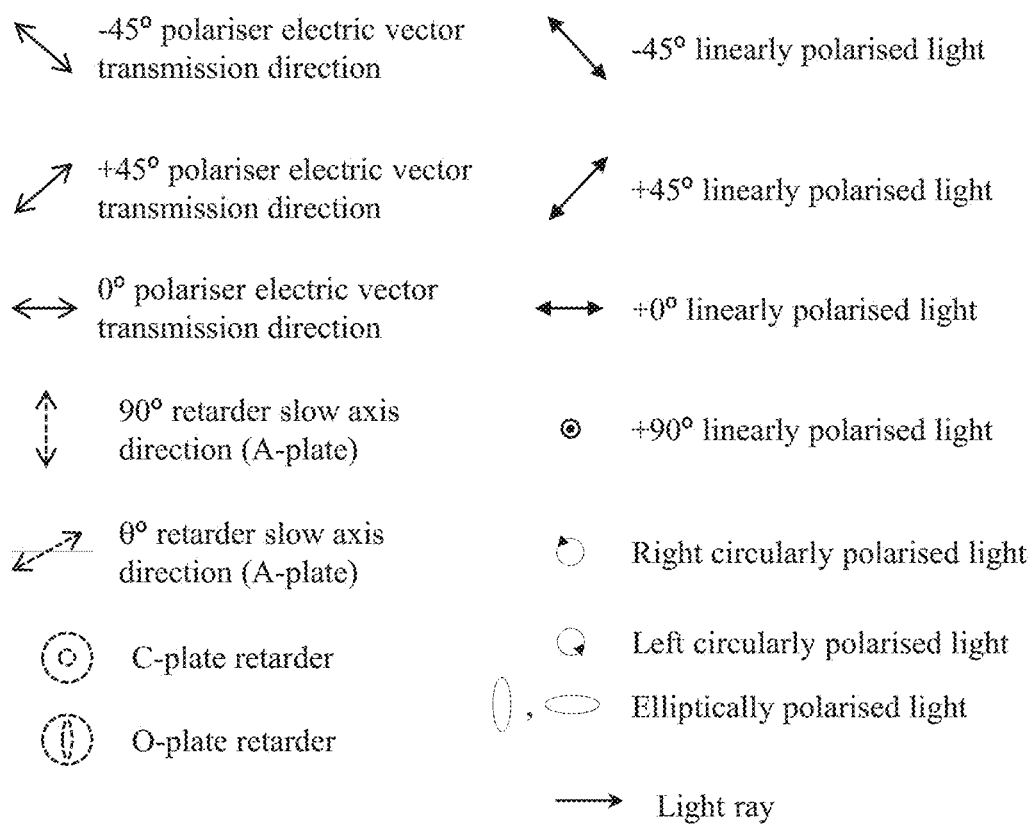
FIG. 34A is a key illustrating orientation of polarizer electric vectors, retarder slow axes, and polarization states for other figures in the present disclosure, in accordance with the present disclosure.

FIG. 34A is a key illustrating symbols that illustrate orientation of polarizer electric vectors, retarder slow axes, and polarization states, and direction of light ray propagation for other figures in the present disclosure unless otherwise stated. Said symbols are located on or adjacent to respective rays in the figures herein.

Figure 34B:
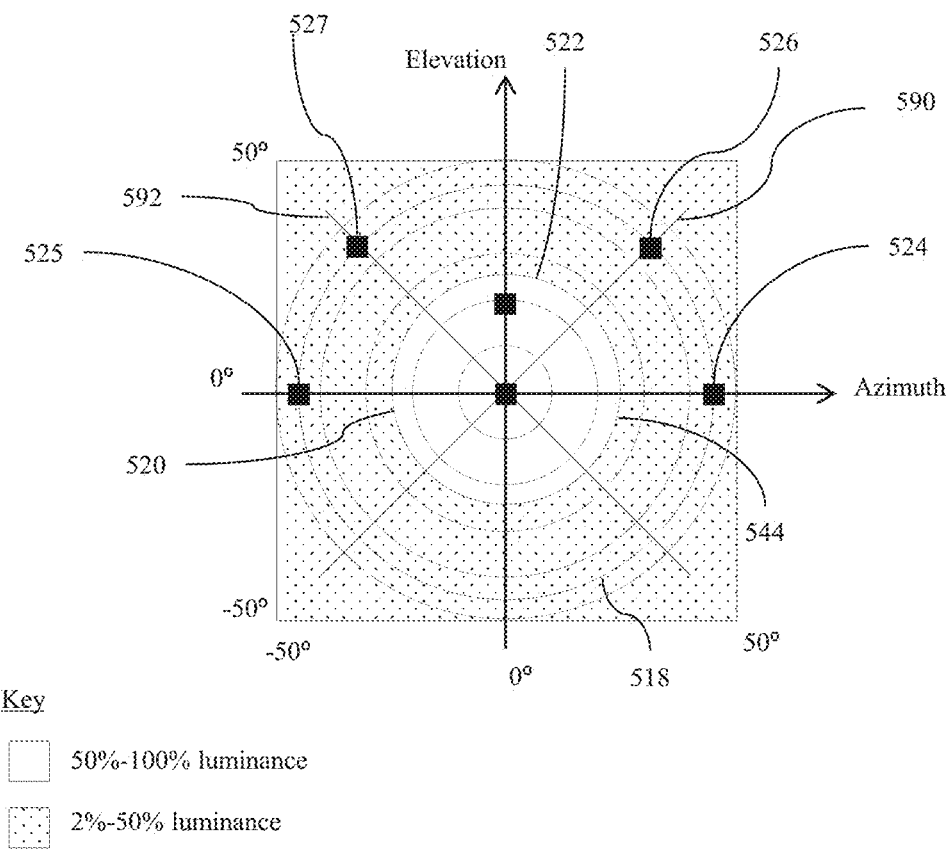
FIG. 34B is a schematic polar luminance graph illustrating variation in luminance of a wide angle mode of operation of a directional display, in accordance with the present disclosure.

FIG. 34B is a schematic polar luminance graph illustrating variation in luminance of a wide angle mode of operation of a directional display. Isoluminance contours 518, 544 may be substantially rotationally symmetric in polar coordinates.

Angular viewing location 520 represents a desirable on-axis viewing direction with zero degrees elevation and zero degrees azimuth.

Angular viewing location 522 represents a desirable off-axis viewing direction with 20 degrees elevation and zero degrees azimuth. Such a viewing location may be provided for rotation of the display about a horizontal axis for a centrally located user.

Angular viewing locations 524, 525 represent occasionally desirable off-axis viewing direction with zero degrees elevation and +/−45 degrees azimuth. In wide angle mode such viewing locations may be occupied by desired users so that relatively high luminance is desirable.

Angular viewing locations 526, 527 represent occasionally desirable off-axis viewing directions that have a 45 degrees off-axis location along respective axes 590, 592 at 45 degrees to the azimuthal and elevation directions.

Figure 34C:
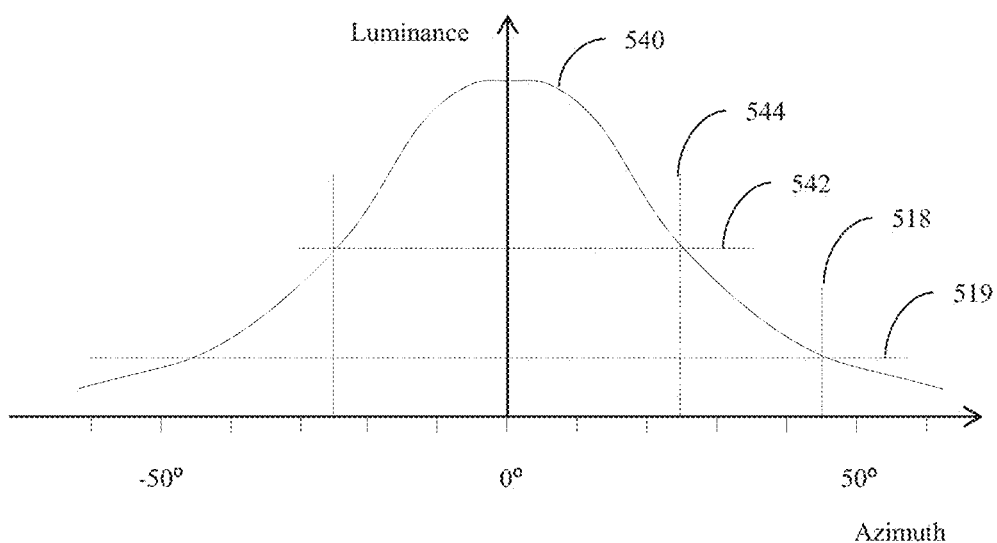
FIG. 34C is a schematic graph illustrating variation of luminance with viewing angle of a wide angle mode of operation of a directional display, in accordance with the present disclosure.

FIG. 34C is a schematic graph illustrating the lateral variation of luminance with viewing angle of a wide angle mode of operation of a directional display. Thus the luminance profile 540 at azimuthal location 544 may have half the peak luminance as illustrated by line 542. The full width half maximum of the azimuthal luminance profile 540 may thus in this illustrative example be 50 degrees. Further the luminance profile may have greater than 10% of peak luminance at azimuthal location 518 of 45 degrees as illustrated by the line 519.

Figure 34D:
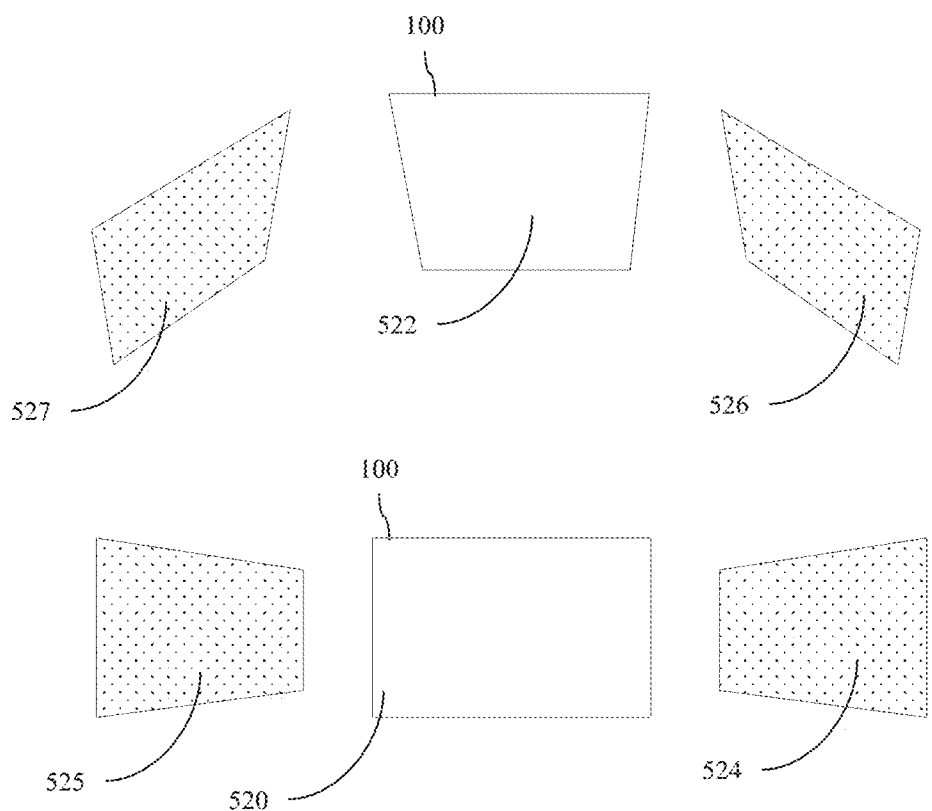
FIG. 34D is a schematic diagram illustrating variation of display luminance with viewing angle of a wide angle mode of operation of a directional display, in accordance with the present disclosure.

FIG. 34D is a schematic diagram illustrating variation of display luminance with viewing angle of a wide angle mode of operation of a directional display. The appearance of the display 100 when a uniform white image is provided on the spatial light modulator in wide angle mode at viewing angular locations 520, 522 is thus provided so that from each respective viewing angular location, the display luminance is greater than 50% of the peak luminance. Said peak luminance may be provided at the centre of the display when viewed from location 520.

Advantageously the display may be conveniently rotated about a horizontal axis while maintaining comfortable luminance for a viewer that is on-axis in the lateral direction (0 degrees azimuth).

Further the angular viewing locations 524, 526, 525, 527 as illustrated in FIG. 34B may have a luminance between 2% and 50%.

A display may thus be provided with a polar luminance distribution such that the display can conveniently be seen from a wide range of viewing angles.

The angular luminance profile of a display operating in privacy mode of operation will now be described.

Figure 35A:
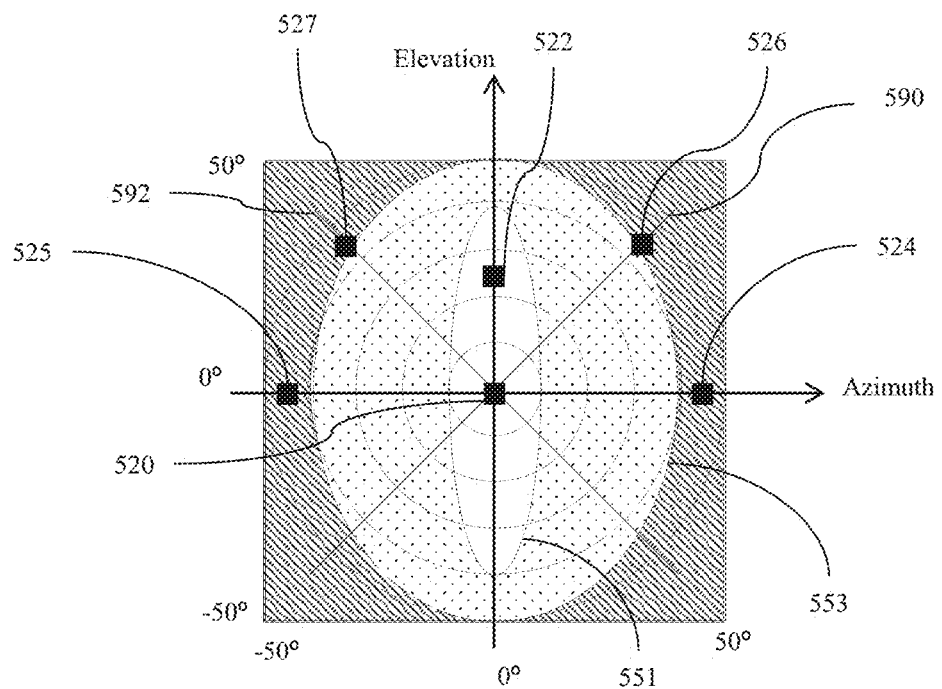
FIG. 35A is a schematic polar luminance graph illustrating variation in luminance of a privacy mode of operation of a directional display, in accordance with the present disclosure.
Figure 35B:
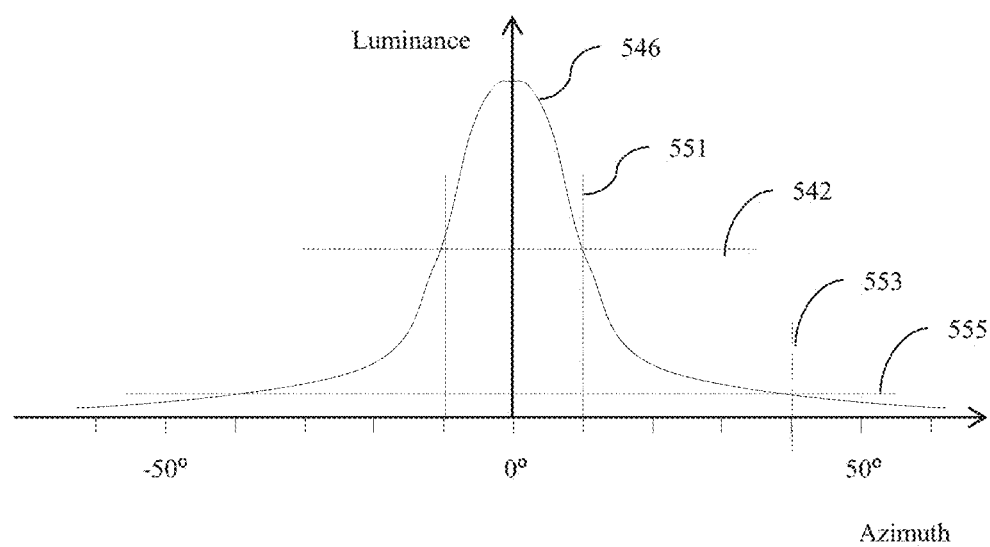
FIG. 35B is a schematic graph illustrating variation of luminance with viewing angle of a privacy mode of operation of a directional display, in accordance with the present disclosure.
Figure 35C:
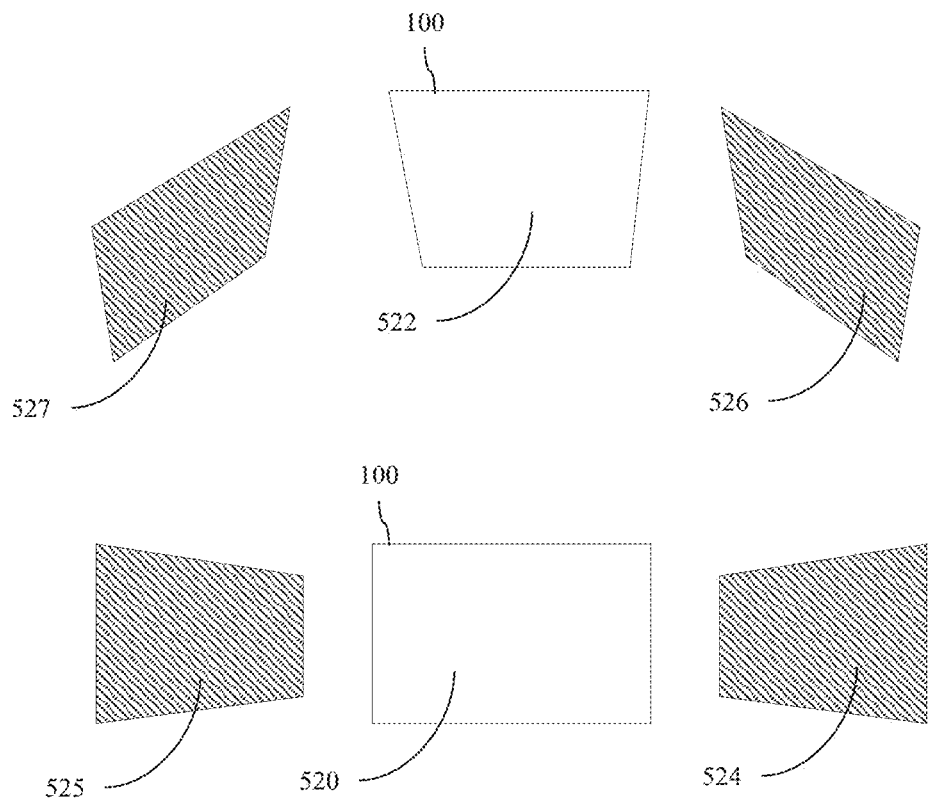
FIG. 35C is a schematic diagram illustrating variation of display luminance with viewing angle of a privacy mode of operation of a directional display, in accordance with the present disclosure.

FIG. 35A is a schematic polar luminance graph illustrating variation in luminance of a privacy mode of operation of a directional display; FIG. 35B is a schematic graph illustrating variation of luminance with viewing angle of a privacy mode of operation of a directional display; and FIG. 35C is a schematic diagram illustrating variation of display luminance with viewing angle of a privacy mode of operation of a directional display.

Desirable and undesirable viewing locations in a privacy mode of operation will now be described with reference to snoopers—that is those observers undesirably attempting to view an image on the display while the display is operating in privacy mode.

Angular viewing location 520, 522 represent typically desirable viewing directions for a primary display user operating the display in privacy mode.

Angular viewing locations 524, 525 represent undesirable off-axis viewing directions for a snooper located laterally with respect to the display. It is desirable to reduce display luminance in privacy mode of operation to such snoopers.

Angular viewing locations 526, 527 represent further undesirable and common off-axis viewing directions for snoopers.

In privacy mode of operation, the lateral luminance profile may be adjusted by control of the directional backlight 101 so that rotationally asymmetric locus 551 for 50% luminance and rotationally asymmetric locus 553 for 2% luminance is provided.

At angular viewing location 524 of 45 degrees azimuth and 0 degrees elevation the luminance may be less than for example 2%, preferably less than 1.5% and more preferably less than 1% of the peak luminance of the profile 546. In the present illustrative example, the relative luminance 555 at 40 degrees azimuth and 0 degrees elevation may be 2%. A display may thus be provided with an angular luminance profile to achieve low luminance for laterally off-axis viewers, achieving privacy operation.

Thus angular viewing locations 520, 522 may see luminance greater than 50%. Advantageously a comfortable display appearance may be provided in privacy mode of operation for rotations of the display about a horizontal axis.

At angular viewing locations 524, 525 that have a zero degree elevation and angular viewing locations 526, 527 that have a 45 degrees off-axis location along respective axes 590, 592 at 45 degrees to the azimuthal and elevation directions, luminance of less than 2% may be provided. Advantageously the display may have limited visibility for such viewing locations.

It would be desirable to achieve further reduction of off-axis visibility of an image by reducing both luminance and contrast of off-axis images.

Figure 36A:
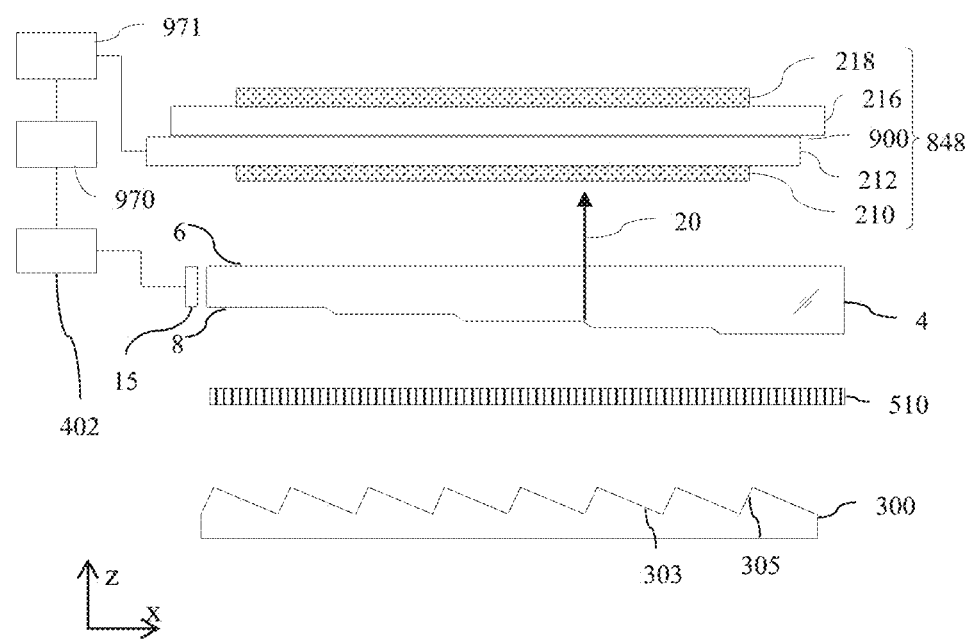
FIG. 36A is a schematic diagram illustrating in side view a switchable directional display comprising a liquid crystal layer with switchable angular contrast distributions, in accordance with the present disclosure.

FIG. 36A is a schematic diagram illustrating in side view a switchable directional display comprising a liquid crystal layer with switchable angular contrast distributions.

Thus a display device may comprise a directional backlight 300, 510, 4, 15 arranged to output light rays 20; wherein the directional backlight 300, 510, 4, 15 is arranged to provide switching between at least two different angular luminance profiles, for example as illustrated in FIG. 34C and FIG. 35B. Transmissive spatial light modulator 848 is arranged to receive output light from the backlight 300, 510, 4, 15. The spatial light modulator 848 may be a liquid crystal display comprising a liquid crystal material 900.

Control system 970 is arranged to control light source controller 402 that may provide control of the luminous emittance lateral profile of array 15 of light emitting elements as described elsewhere herein.

Control system 970 may further be arranged to control image controller 971 that may further comprise control of electric field properties within image pixels of the spatial light modulator 848.

Desirably in wide angle operation of the present display, the variation of image contrast with viewing angle may be small so that the image is viewable from a wide range of viewing directions. Such wide angle liquid crystal modes are typically provided by in-plane liquid crystal modes, the operation of which will now be described.

Figure 36B:
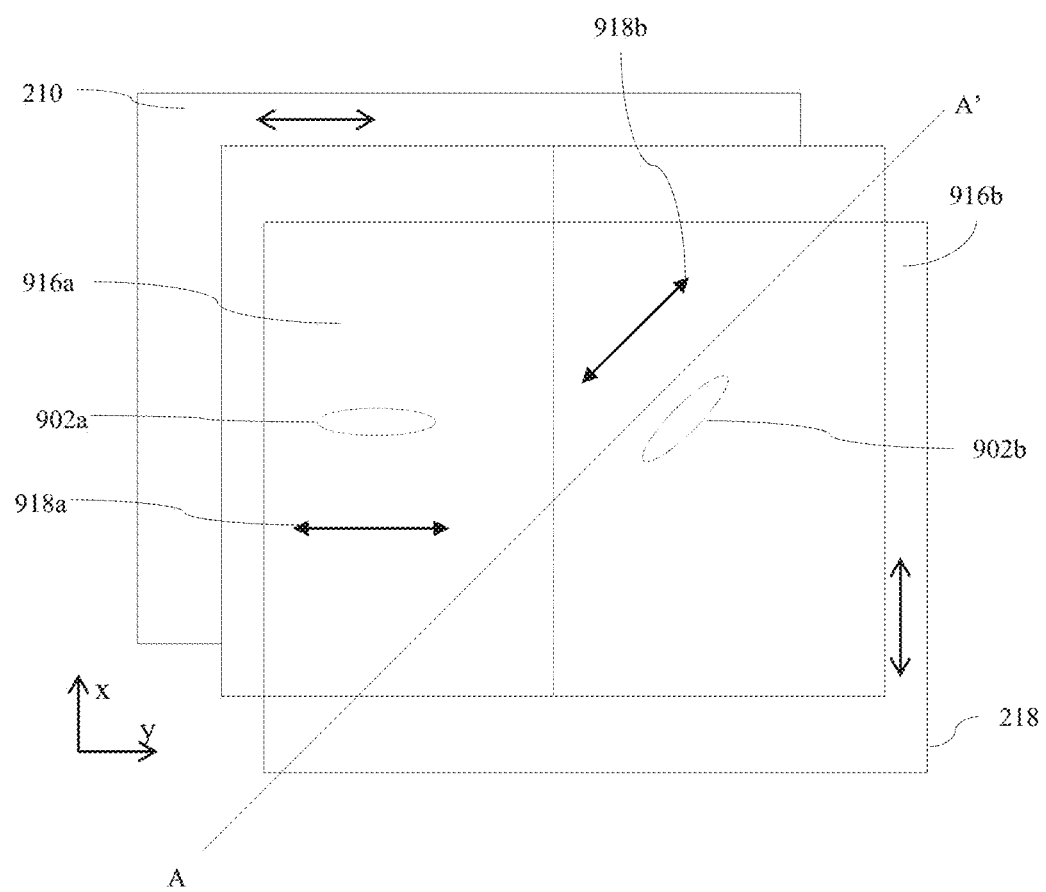
FIG. 36B is a schematic diagram illustrating in top view arrangements of liquid crystal directors for OFF states and ON states in a liquid crystal spatial light modulator, in accordance with the present disclosure.

FIG. 36B is a schematic diagram illustrating in top view arrangements of liquid crystal directors for OFF state pixels 916*a* and ON state pixels 916*b* in a liquid crystal spatial light modulator 848.

Input polariser 210 is provided with a horizontal linear polarisation state.

For an OFF state pixel 916*a*, the orientation 918*a* of director of liquid crystal molecules 902*a* may be orthogonal (or parallel) to the input polariser 216 polarisation transmission axis. The incident polarisation state is unrotated and thus a black state is provided at pixel 916*a*.

For an ON state pixel 916*b*, the orientation 918*b* of director of at least some liquid crystal molecules 920*b* may be aligned at 45 degrees to the input polariser 216 such that the polarisation state is rotated and transmitted through output polariser 218 at pixel 916*b*.

In the present description the alignment of liquid crystals in ON and OFF states is shown in planes A-A' and C-C' for ON state pixels 916*b* and in planes B-B' and D-D' for OFF state pixels 916*a*.

Figure 37A:
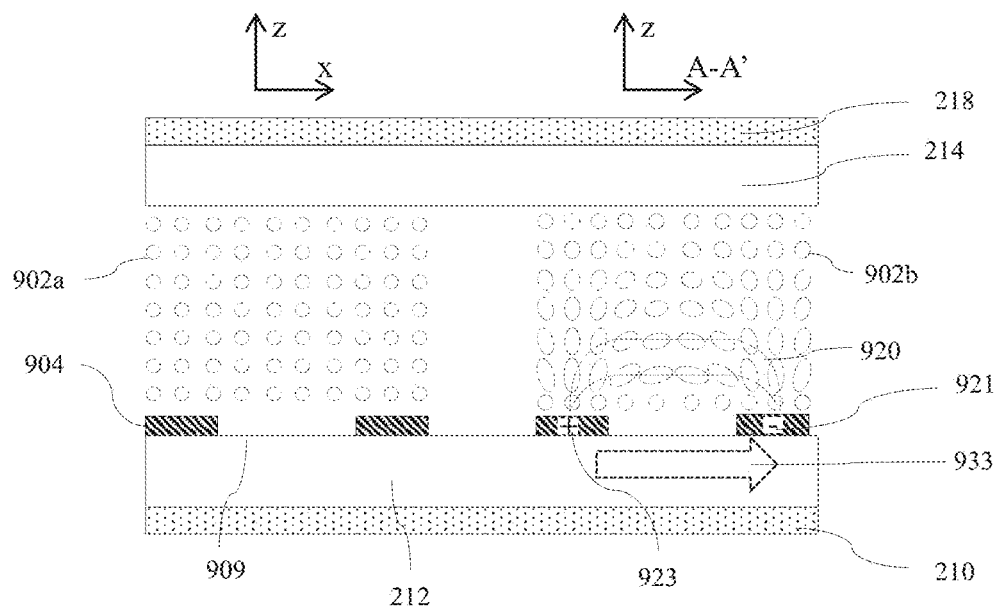
FIG. 37A is a schematic diagram illustrating in side view an In Plane Switching liquid crystal layer, in accordance with the present disclosure.

FIG. 37A is a schematic diagram illustrating in side view an In Plane Switching (IPS) liquid crystal layer. Patterned electrodes 904 are arranged on substrate 212. Liquid crystal alignment layers (not shown) are provided to achieve alignment of the liquid crystal molecules 902*a* in the OFF state pixel 916*a*.

In the OFF state pixel 916*a* no voltage is applied to electrode 904, and no electric field is across adjacent electrodes 904 such that the LC molecules 902*a* adopt an orientation in to the plane of the paper.

In the ON state pixel 916*b* an alternating electric field 933 is applied across electrodes 923 and 921 (illustrated in one phase of operation).

For a positive dielectric anisotropy LC material, an in-plane electric field profile 920 will provide alignment of the LC molecule 902*b* directors as illustrated. For a negative dielectric anisotropy LC material the LC director orients to align away from the electric field. Typically an alternating potential is applied between electrodes 921, 923 so that no time average DC potential exists across the LC material 900.

At least some of the liquid crystal molecules 902*b* are arranged as illustrated in FIG. 36B for pixel 916*b* to achieve transmission of light from polariser 210.

Figure 37B:
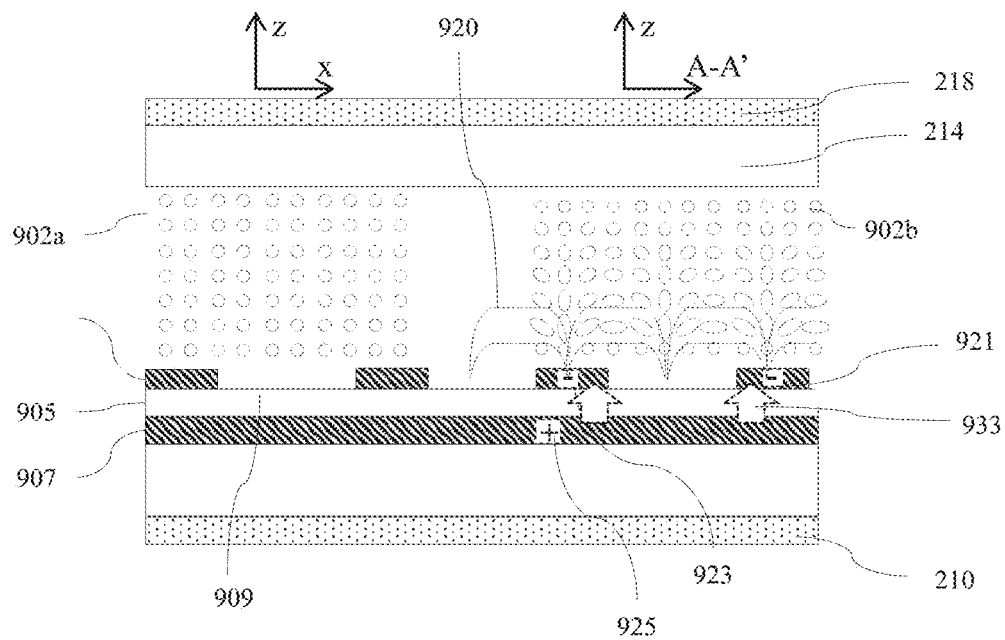
FIG. 37B is a schematic diagram illustrating in side view a Fringe Field Switching liquid crystal layer, in accordance with the present disclosure.

FIG. 37B is a schematic diagram illustrating in side view a Fringe Field Switching (FFS) liquid crystal layer. An electric field 933 is applied between common electrode 907 and electrodes 923, 921 achieving electric field lines 920. The alignment of the liquid crystal molecules 902*b* is similar nature to that described with respect to FIG. 37A, although not typically identical.

Figure 38A:
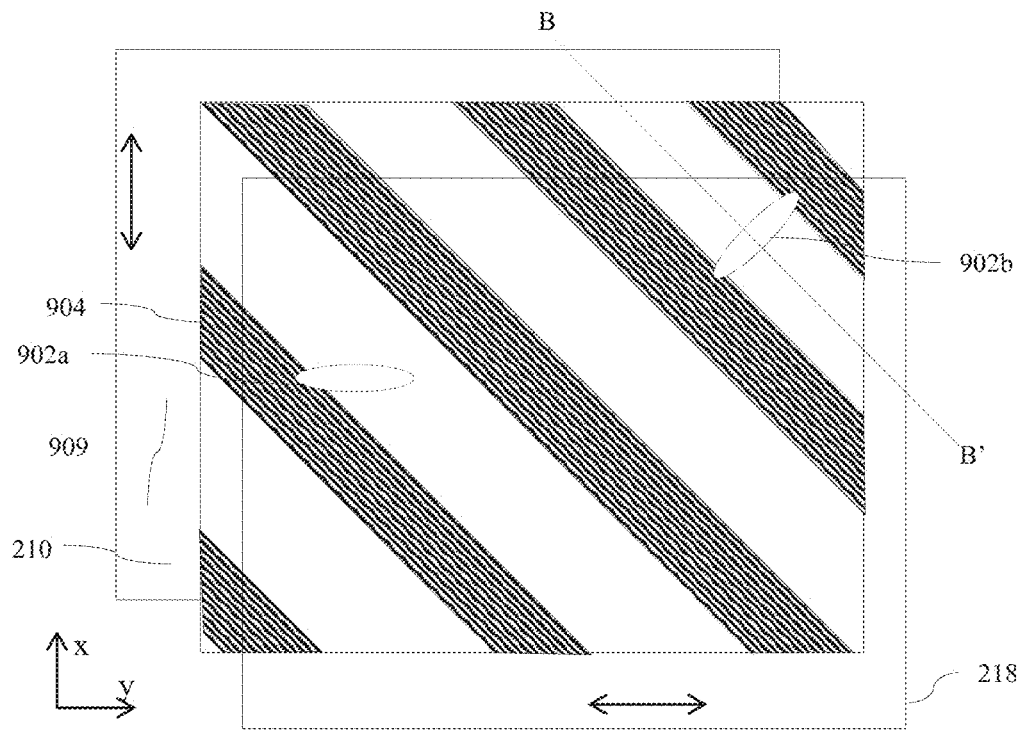
FIG. 38A is a schematic diagram illustrating in top view liquid crystal molecule orientations for the arrangements of FIGS. 37A-B, in accordance with the present disclosure.

FIG. 38A is a schematic diagram illustrating in top view liquid crystal molecule orientations for the arrangements of FIGS. 37A-B. Thus the appropriate liquid crystal molecule 902*a*, 902*b* may be achieved for pixels 916*a*, 916*b* as described in FIG. 36B. The electrodes 904 may be arranged at 45 degrees to the x-axis to provide appropriate switching direction.

Figure 38B:
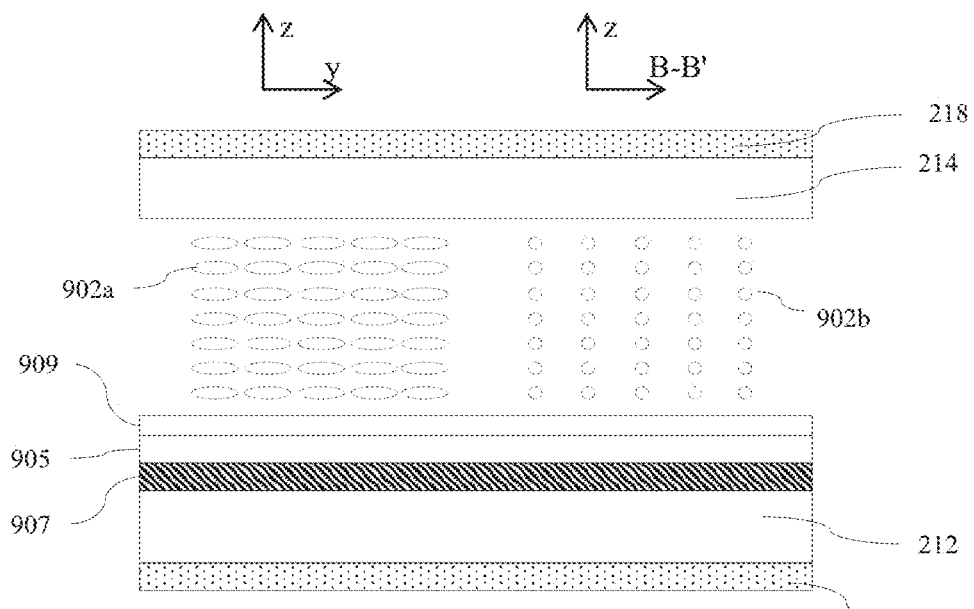
FIG. 38B is a schematic diagram illustrating in end view a Fringe Field Switching liquid crystal layer, in accordance with the present disclosure.

FIG. 38B is a schematic diagram illustrating in end view a Fringe Field Switching liquid crystal layer. Thus the molecules 902*a* are provided in-plane, that is substantially parallel to the plane of the substrate 210. Such an arrangement may advantageously achieve a wide contrast angular profile.

Returning to the description of FIG. 15B which is a schematic polar graph illustrating typical contrast profiles of the arrangements of FIGS. 37A-D; in an illustrative example the IPS and FFS arrangements of FIGS. 37A-B may provide iso-contrast contours 930 that illustrate angular regions in elevation and azimuth with contrast greater than 1000:1, contour 932 illustrates contrast greater than 500:1, contour 934 illustrates contrast greater than 100:1, contour 936 illustrates contrast greater than 50:1 for example.

To achieve a display that is clearly visible for a large viewing freedom, it would be desirable to provide a display with wide luminance angular profile and wide contrast angular profile.

Figure 39A:
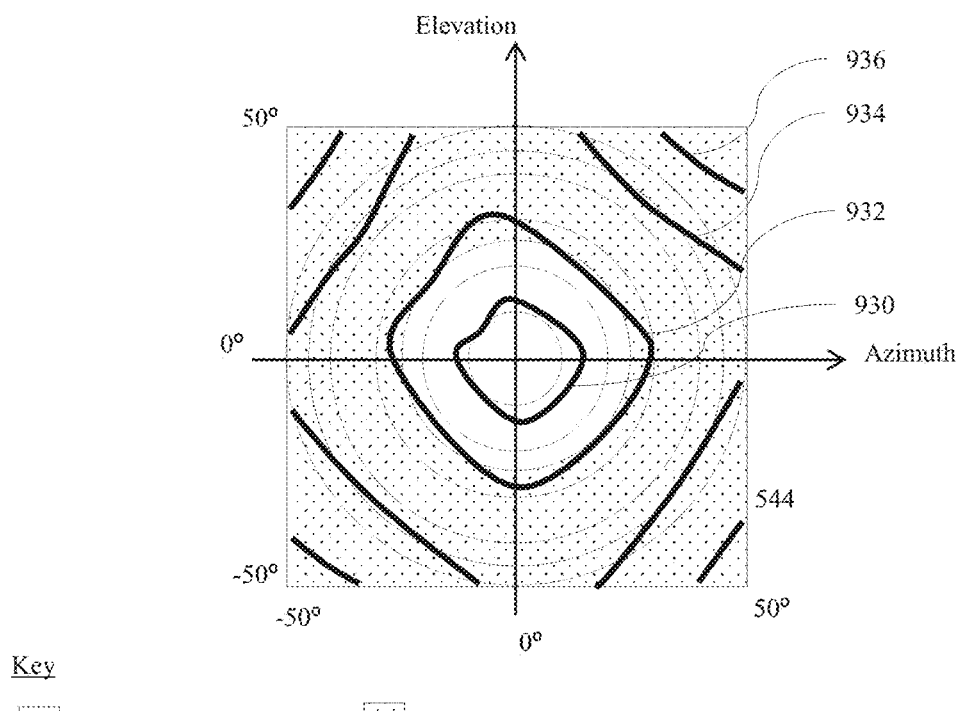
FIG. 39A is a schematic polar graph illustrating typical luminance and contrast profiles of a display comprising a backlight with a wide viewing angle luminance profile and the liquid crystal layers of FIGS. 37A-D comprising wide angle contrast profiles, in accordance with the present disclosure.
Figure 39B:
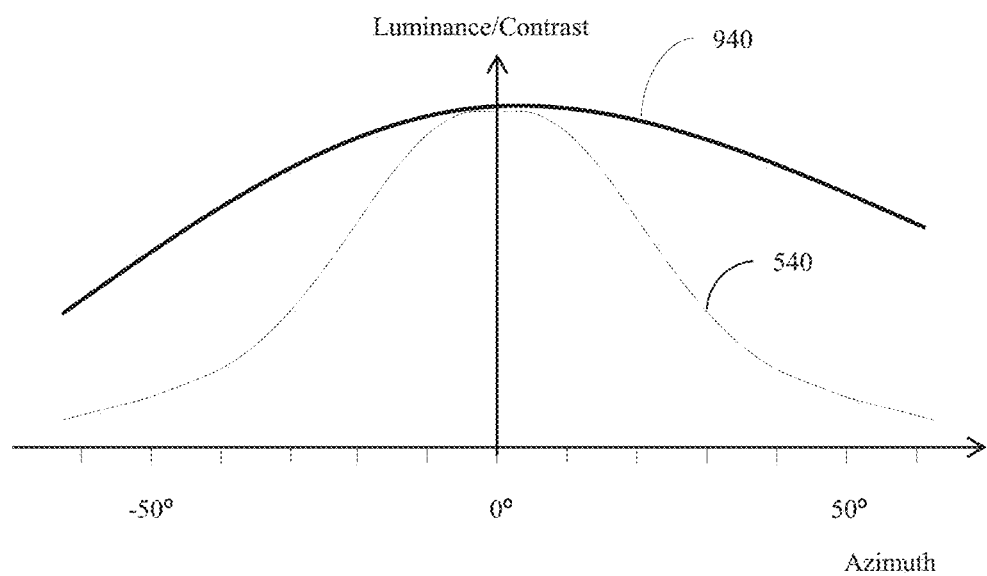
FIG. 39B is a schematic graph illustrating a cross section in a single elevation, typical wide angle contrast and wide angle luminance profiles, in accordance with the present disclosure.

FIG. 39A is a schematic polar graph illustrating typical luminance and contrast profiles of a display comprising a backlight with a wide viewing angle luminance profile and the liquid crystal layers of FIGS. 37A-D comprising wide angle contrast profiles and FIG. 39B is a schematic graph illustrating a cross section in a single elevation, typical wide angle contrast and wide angle luminance profiles.

Advantageously a wide viewing angle display for luminance and contrast may be provided.

Figure 40A:
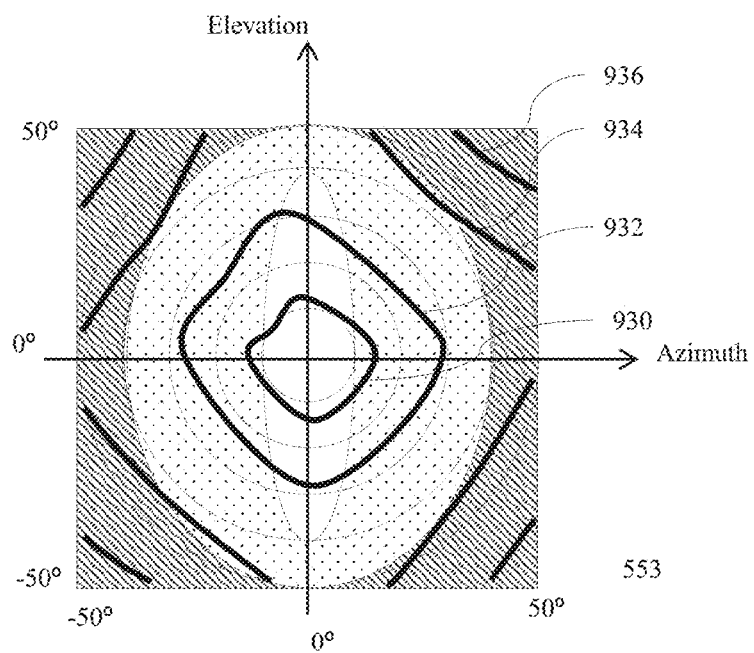
FIG. 40A is a schematic polar graph illustrating typical luminance and contrast profiles of a display comprising a backlight with a privacy mode viewing angle luminance profile and the liquid crystal layers of FIGS. 37A-D comprising wide angle contrast profiles, in accordance with the present disclosure.
Figure 40B:
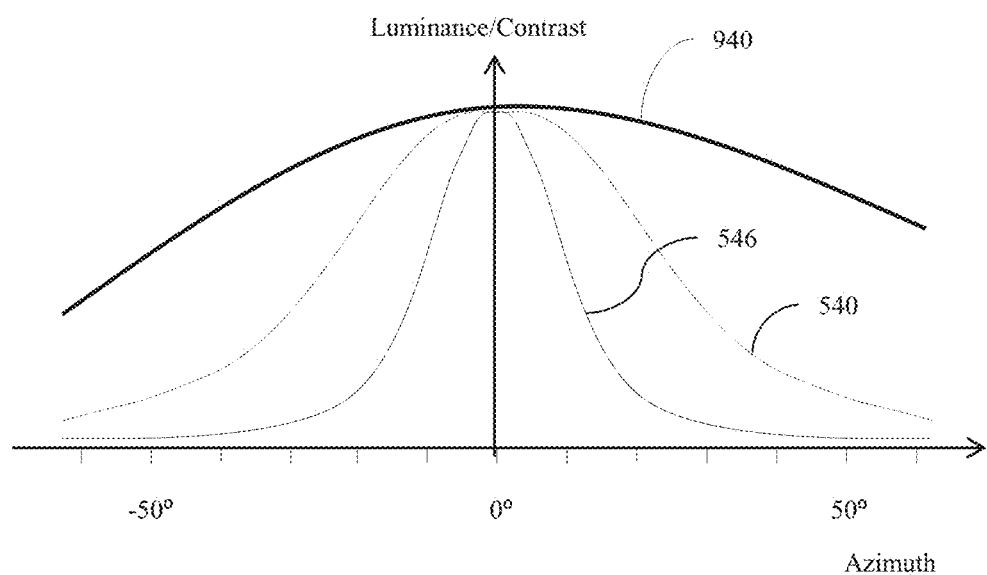
FIG. 40B is a schematic graph illustrating a cross section in a single elevation, typical wide angle contrast and privacy mode angular luminance profiles, in accordance with the present disclosure.

FIG. 40A is a schematic polar graph illustrating typical luminance and contrast profiles of a display comprising a backlight with a privacy mode viewing angle luminance profile and the liquid crystal layers of FIGS. 37A-D comprising wide angle contrast profiles and FIG. 40B is a schematic graph illustrating a cross section in a single elevation, typical wide angle contrast and privacy mode angular luminance profiles.

Thus while the display has reduced visibility due to reduced luminance in the wings, a high contrast may still be provided, thus achieving residual off-axis image visibility under certain lighting conditions, for example dark environments.

It would be desirable to provide a switchable privacy display that has high contrast and luminance for on-axis viewing and reduced contrast and luminance for off-axis viewing.

Figure 41A:
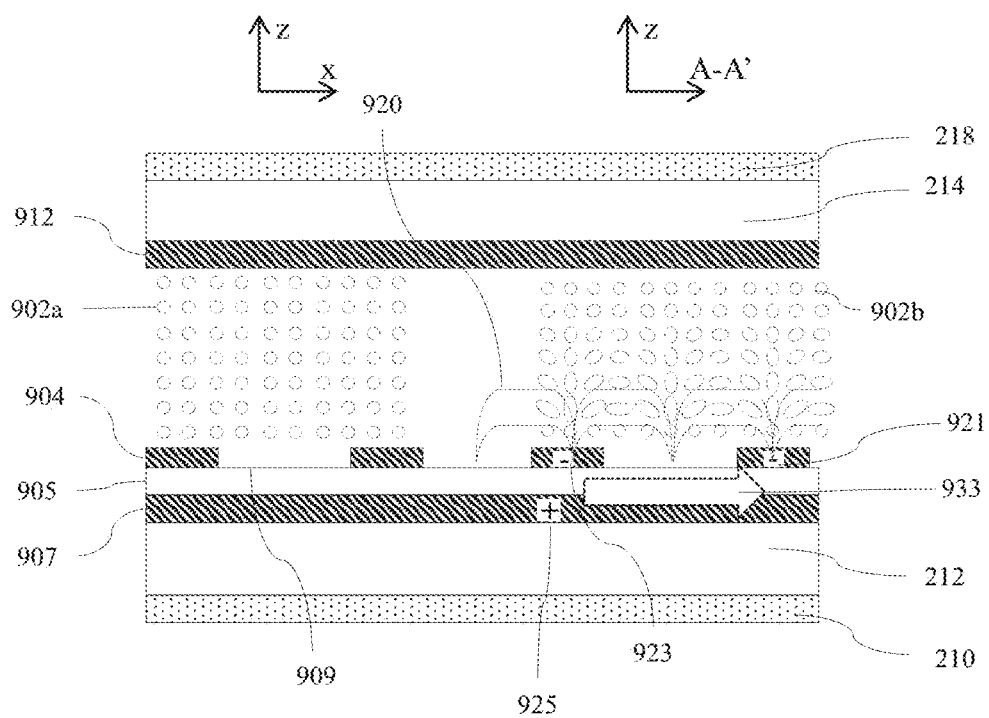
FIG. 41A is a schematic diagram illustrating in side view a biased Fringe Field Switching liquid crystal layer in a first mode of operation, in accordance with the present disclosure.

FIG. 41A is a schematic diagram illustrating in side view a biased Fringe Field Switching liquid crystal layer in a first mode of operation that is arranged to provide a wide viewing angle angular contrast profile. Liquid crystal display 848 may comprise addressing electrodes 904, 907 that are controlled to provide in-plane and out-of-plane electric field profiles 920.

The liquid crystal display 848 may further comprise at least one bias electrode 912 wherein the bias electrode 912 is arranged to further control director 902*a*, 902*b* orientation of the liquid crystal material 900. FIG. 41A differs from FIG. 37B in that an additional bias electrode layer 912 is further provided.

When no potential is applied to bias electrode 912 the system behaves as in FIG. 37B. The angular contrast profile properties of the spatial light modulator 848 in the first mode may be similar to those of the IPS and FFS arrangements illustrated in FIGS. 37A-B, that is to provide a wide angle contrast visibility.

Figure 41B:
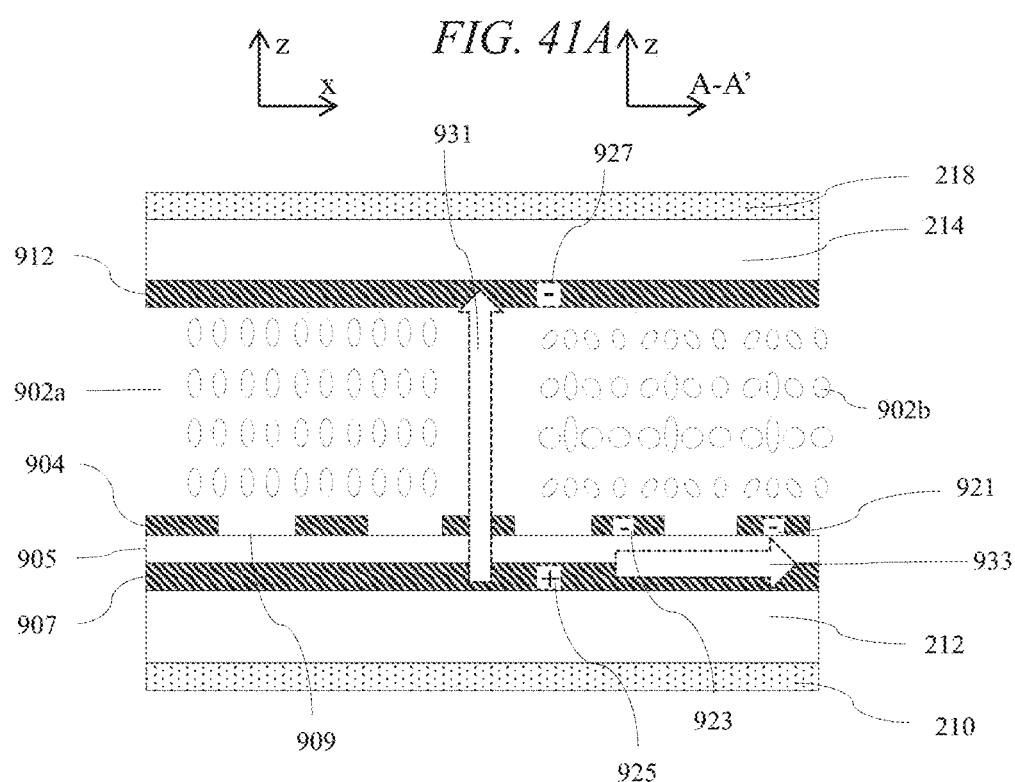
FIG. 41B is a schematic diagram illustrating in side view a biased Fringe Field Switching liquid crystal layer in a second mode of operation, in accordance with the present disclosure.

FIG. 41B is a schematic diagram illustrating in side view a biased Fringe Field Switching liquid crystal layer in a second mode of operation wherein a vertical or out of plane electric field 931 component between the bias electrode 912 and the electrodes 907, 904. For positive dielectric anisotropy materials, this electric field 931 pulls the LC molecules out of the plane of substrate 212 as illustrated by the change from circular to elliptical cross sections of the molecules 902*a*. The out of plane liquid crystal orientation reduces the contrast of the display when viewed from oblique angles. The alignment of the liquid crystal molecules 902*a* to the lateral direction by means of the alignment direction provided by the alignment layers (not shown) provides a bias to the off-axis loss of contrast. The molecules may be arranged to provide a roll off in the lateral direction by means of aligning the long axis parallel to the lateral direction for example.

For negative dielectric anisotropy liquid crystal materials, the vertical or out of plane electric field will tend to align the LC molecules parallel to the plane of substrate 212. To reduce the viewing angle when a vertical electric field 931 is applied, a pre-tilt may be applied to the LC molecules by means of alignment layers (not illustrated) applied to either the upper or lower substrates 212, 214 or both, as is known in the LC industry.

Advantageously off-axis retardance may be introduced into the black state pixels 916*a*.

Figure 41C:
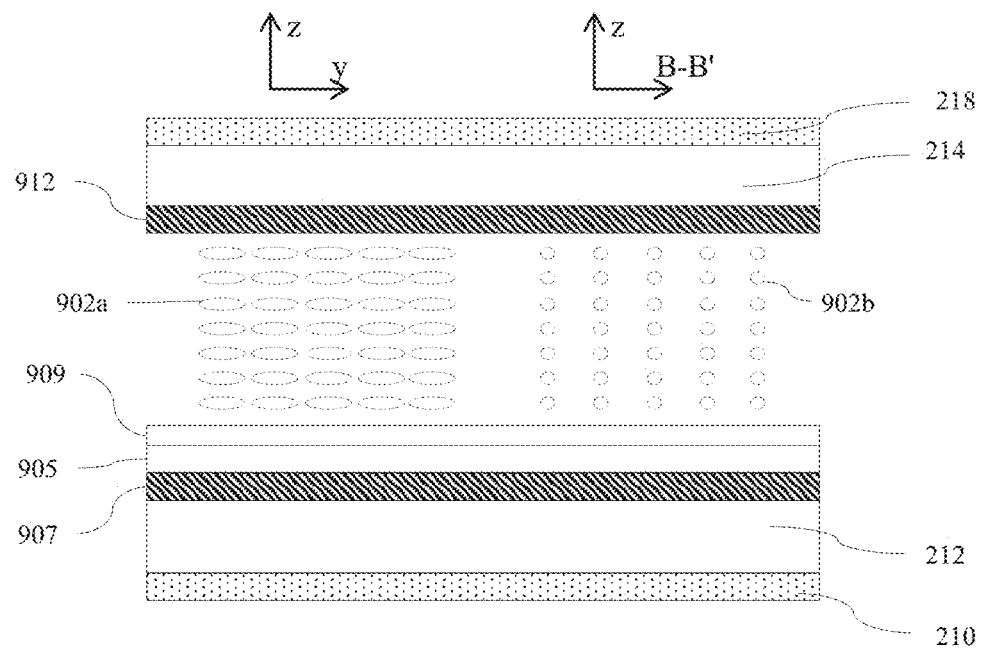
FIG. 41C is a schematic diagram illustrating in end view a biased Fringe Field Switching liquid crystal layer in a first mode of operation, in accordance with the present disclosure.
Figure 41D:
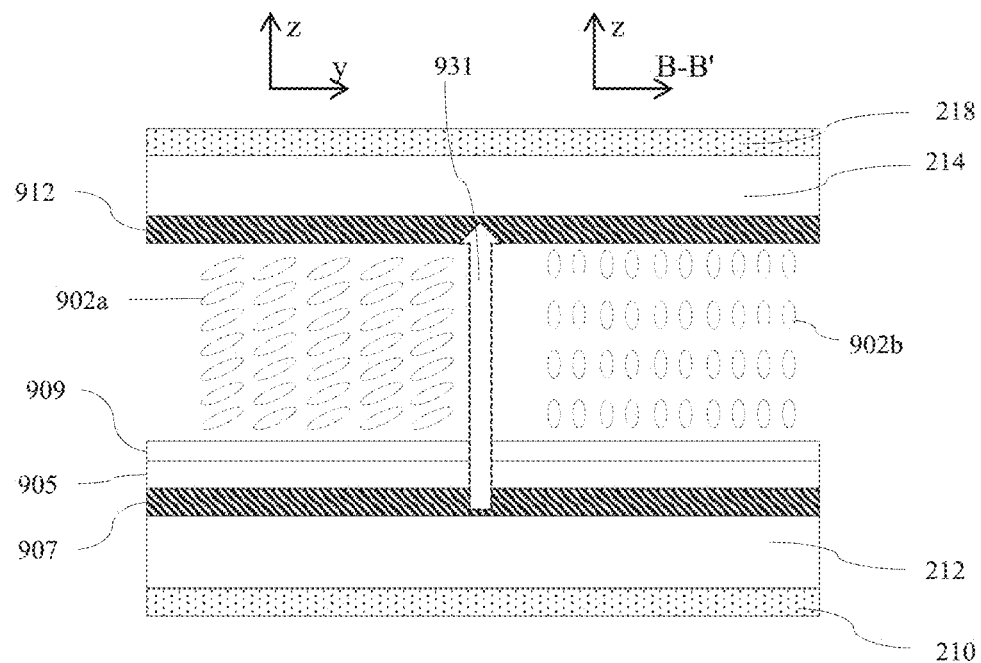
FIG. 41D is a schematic diagram illustrating in end view a biased Fringe Field Switching liquid crystal layer in a second mode of operation, in accordance with the present disclosure.

FIG. 41C is a schematic diagram illustrating in end view a biased Fringe Field Switching liquid crystal layer in a first mode of operation for wide angle operation (no field 931 applied) and FIG. 41D is a schematic diagram illustrating, in end view a biased Fringe Field Switching liquid, crystal layer in a second mode of operation wherein field 931 is applied to achieve out of plane tilt of the molecules 902*a* in the black state, reducing the size of the angular contrast profile in the lateral direction.

Referring again to FIG. 17A is a schematic polar graph illustrating typical contrast profiles of the arrangements of FIGS. 41A-D. Thus the lateral contrast angular profile has reduced width, achieving a contrast privacy function.

Figure 42:
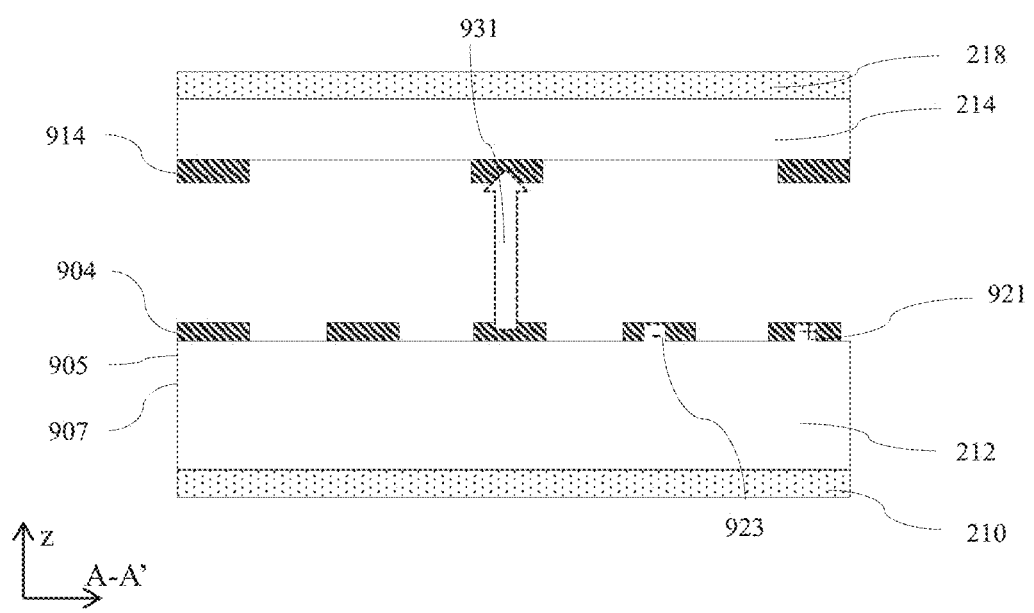
FIG. 42 is a schematic diagram illustrating in side view a biased In Plane Switching liquid crystal layer in a second mode of operation, in accordance with the present disclosure.

FIG. 42 is a schematic diagram illustrating in side view a biased In Plane Switching liquid crystal layer in a second mode of operation. Bias electrode 912 of FIG. 41A may be replaced by patterned bias electrodes 914. Operation of such an arrangement may provide similar off-axis alignment of molecules 902*a* for OFF state pixels 916*a*, advantageously achieving reduction of off-axis contrast with viewing angle.

Figure 43:
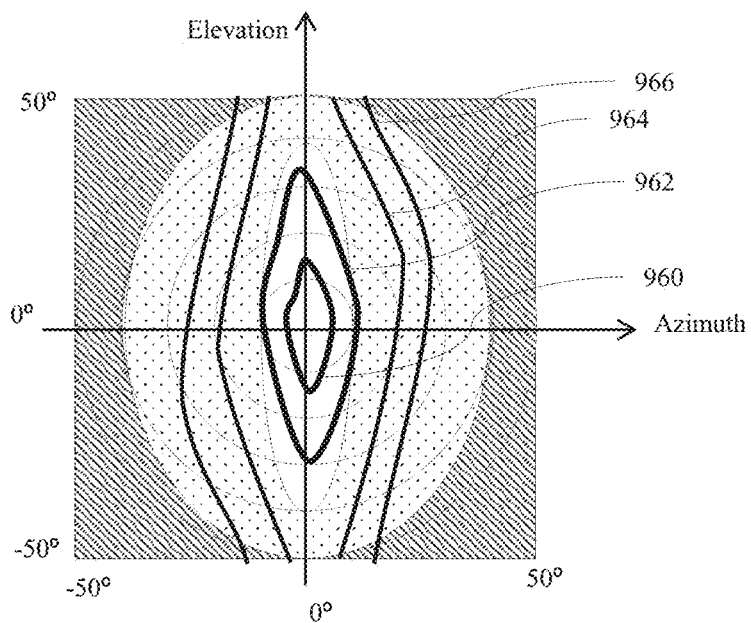
FIG. 43 is a schematic polar graph illustrating typical luminance and contrast profiles of a display comprising a backlight with a privacy mode viewing angle luminance profile and the liquid crystal layers of FIG. 41B comprising narrow angle contrast profiles, in accordance with the present disclosure.

FIG. 43 is a schematic polar graph illustrating typical luminance and contrast profiles of a display comprising a backlight with a privacy mode viewing angle luminance profile and the liquid crystal layers of FIG. 41B comprising narrow angle contrast profiles of FIG. 18B.

Figure 44:
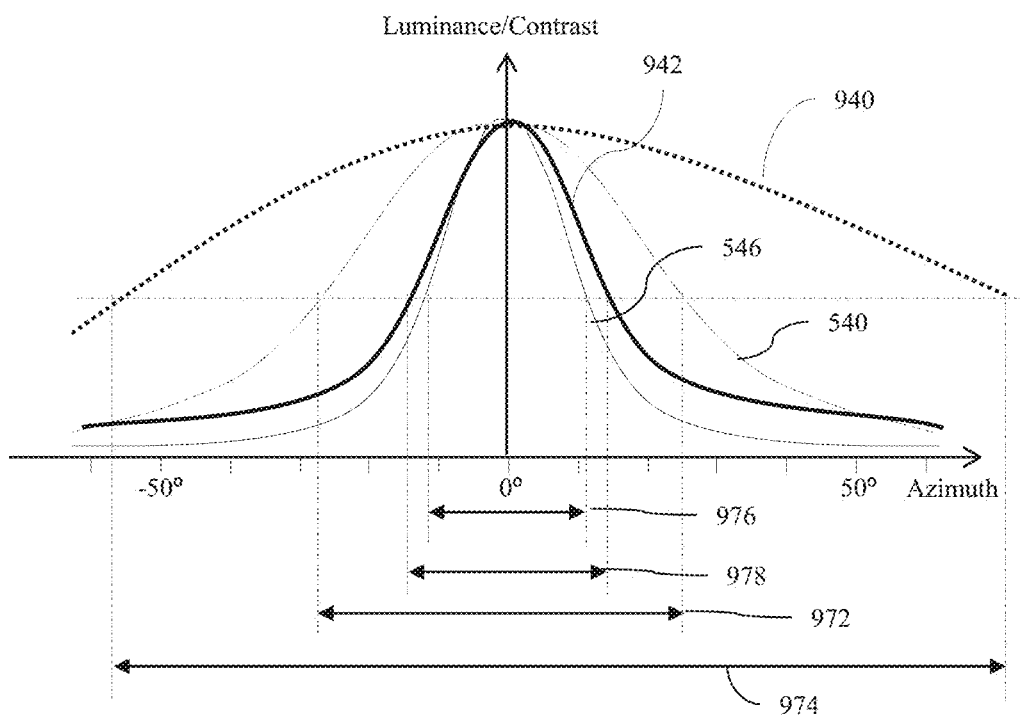
FIG. 44 is a schematic graph illustrating a cross section in a single elevation, typical narrow angle contrast and privacy mode angular luminance profiles, in accordance with the present disclosure.

FIG. 44 is a schematic graph illustrating a cross section in a single elevation, typical narrow angle contrast and privacy mode angular luminance profiles. The spatial light modulator 848 as illustrated in FIG. 36A is thus arranged to modulate the output light 20 from the backlight to provide an image that may be switched between at least two different angular contrast profiles 940, 942. The angular luminance profiles 540, 546 from the backlight may thus be controlled in the lateral direction (i.e. azimuth direction, or y-axis direction) and the angular contrast profiles 960, 962 from the spatial light modulator 848 may further be controlled in the lateral direction.

A display system comprising the display device described herein may further be provided with a control system 970 as shown in FIG. 36A that is arranged to switch the directional backlight between a first mode (that may be a wide angle mode) arranged to switch the directional backlight to a first angular luminance profile 540 and to switch the spatial light modulator to a first angular contrast profile 940; and a second mode (that may be a narrow angle mode such as for privacy operation) arranged to switch the directional backlight to a second angular luminance profile 546 and to switch the spatial light modulator to a second angular contrast profile 942 wherein the angular profiles 540, 940 of the first mode have half maximum widths 972, 974 that are larger than the half maximum widths 976, 978 of the angular profiles 546, 942 of the second mode.

The electrode arrangements of FIG. 41B thus achieve switchable angular contrast distributions 940, 942.

Advantageously a privacy display may be provided with reduced contrast and luminance for off-axis viewing. Privacy performance is thus improved in comparison to privacy displays that have only angular luminance roll-off or angular contrast roll-off with azimuthal viewing angle.

Figure 45:
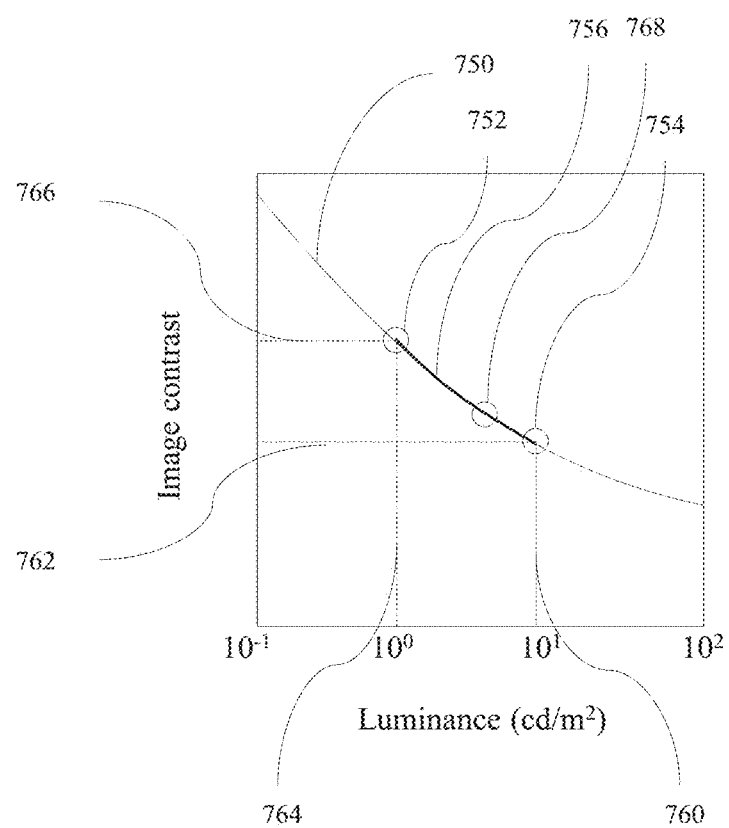
FIG. 45 is a schematic graph illustrating the variation of an acceptable contrast visibility with display luminance, in accordance with the present disclosure.

FIG. 45 is a schematic graph illustrating the variation of an acceptable contrast visibility with display luminance and is related to the contrast sensitivity function of the human visual system as illustrated in FIG. 23. Such variation may be described by invisibility function 750 and may describe coordinates of contrast and luminance which provide equivalent perceived image invisibility to a snooper 47.

In an illustrative embodiment of the present disclosure the angular luminance profile provided by the directional backlight may provide a luminance of the celiac of the display 100 in the first wide angle mode for a snooper 47 at +/−45 degrees azimuth, 0 degrees elevation of 10 nits, whereas the luminance for the same observer in the second (privacy) mode may be 1 nit.

Point 754 with the wide luminance angular profile mode has a luminance 760 of 10 nits and contrast 762 that may for example be 1.5:1. In order to achieve an equivalent invisibility, point 752 with the narrow luminance angular profile mode has a luminance 764 of 1 nits and contrast 766 that may for example be 3:1. The limits 752, 754 of the invisibility function 750 determine the ranges of invisibility function operating point 756, that is the display angular luminance profile and angular contrast profile may be arranged to operate within these operating points for a given viewing location for observer 47.

Thus point 768 that lies on the invisibility function 756 may have intermediate contrast and luminance settings, and equivalent image invisibility to the snooper 47. Thus in the second (narrow angular luminance and contrast profile) mode for a nominal viewing angle 761 (as illustrated in FIG. 46 that may be in azimuth and elevation) there is provided an operating point invisibility function 756 of image contrast against image luminance on which an operating point 768 is selected by control of (i) angular luminance profile 546 and (ii) angular contrast profile 942.

In comparison to the operating points 752, 754 the profiles 546, 942 may have wider half maximum widths 976, 978 or more uniform profile shapes for on-axis observer 45.

Figure 46:
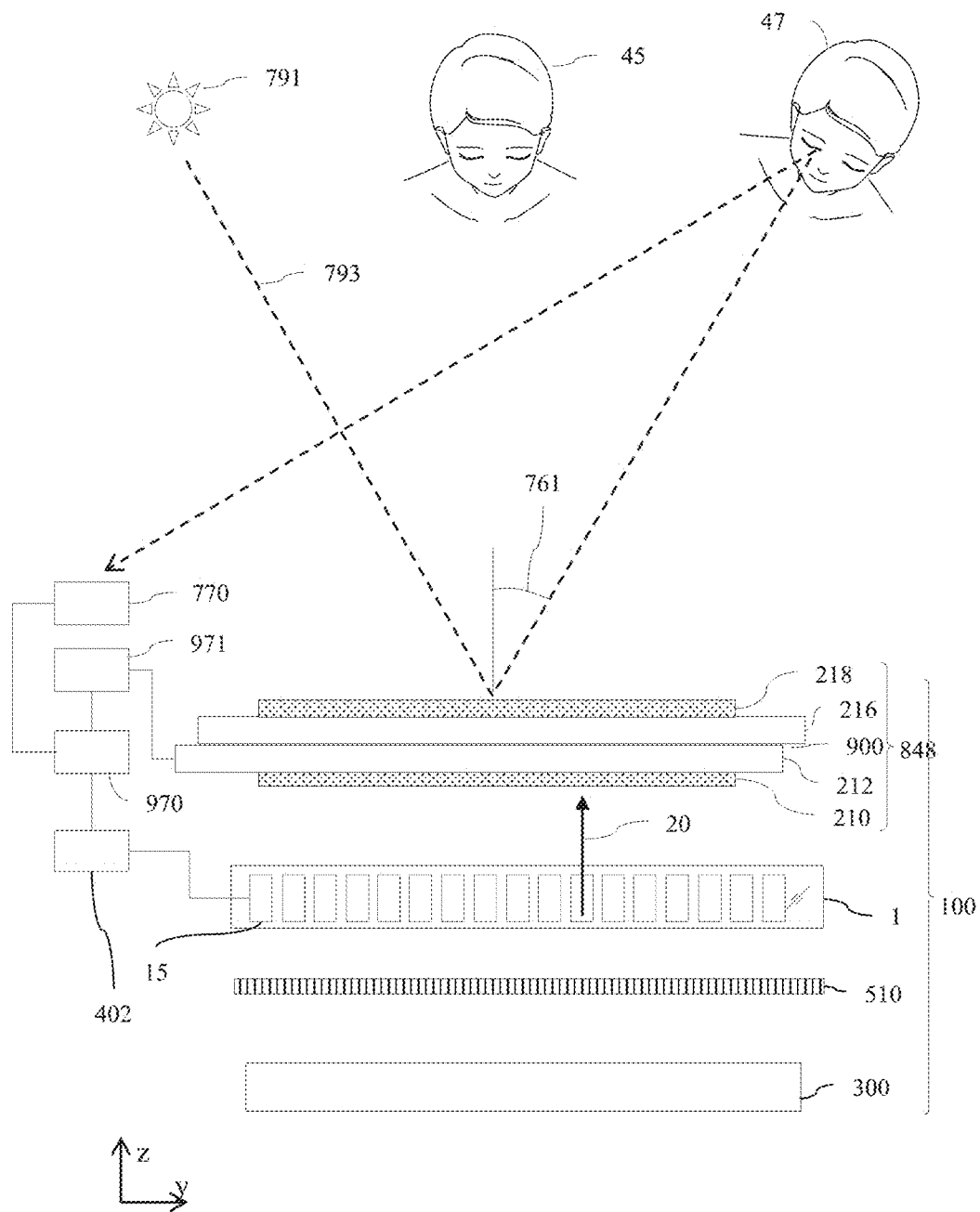
FIG. 46 is a schematic diagram illustrating in top view a switchable directional display comprising a liquid crystal layer with switchable angular contrast distributions and an ambient light sensor control system, in accordance with the present disclosure.

It would be desirable to provide control of the operating point invisibility function 756 of the image to the snooper 47 in response to the ambient lighting conditions FIG. 46 is a schematic diagram illustrating in top view a switchable directional display comprising a switchable directional backlight 1, 15, 300 and a liquid crystal layer 900 with switchable angular contrast profile and an ambient light control system 770.

The ambient light control system 770 may comprise an ambient light sensor which may for example be the camera arranged proximate to the display and may further be arranged to determine the illuminance of a snooper's face. Alternatively, the system 770 may be provided by keyboard input, or for example may be controlled by settings such as public operating mode setting of the device comprising the switchable directional display.

Figure 47:
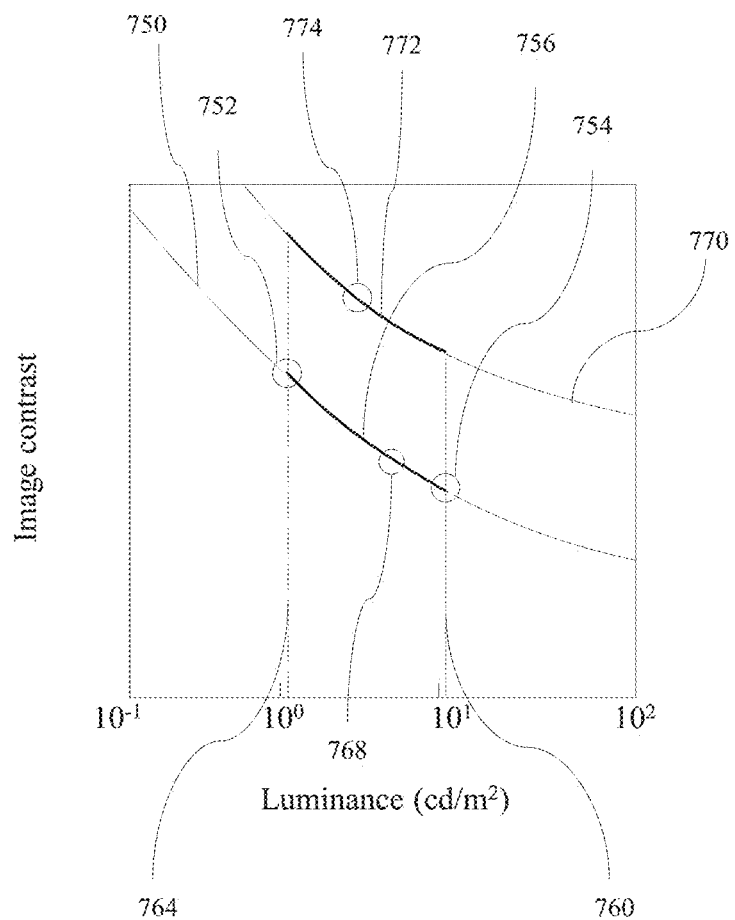
FIG. 47 is a schematic graph illustrating the control of the variation of an acceptable contrast visibility with display luminance, in accordance with the present disclosure.

FIG. 47 is a schematic graph illustrating the control of the variation of an acceptable contrast visibility with display luminance. In a low ambient illumination environment, the invisibility function operating point may be set using function 756, whereas in a high ambient illumination environment the function 772 may be substituted and the operating point 774 selected.

Thus the ambient light control system 770 may be arranged to control the invisibility functions 756, 772 and function operating point 768, 774 in response to the ambient illuminance.

Advantageously the uniformity of the display for both white and black images may be improved for the primary observer 45 in high ambient illuminance environments, and the image invisibility to the snooper 47 may be maintained for different illuminance environments.

Figure 48A:
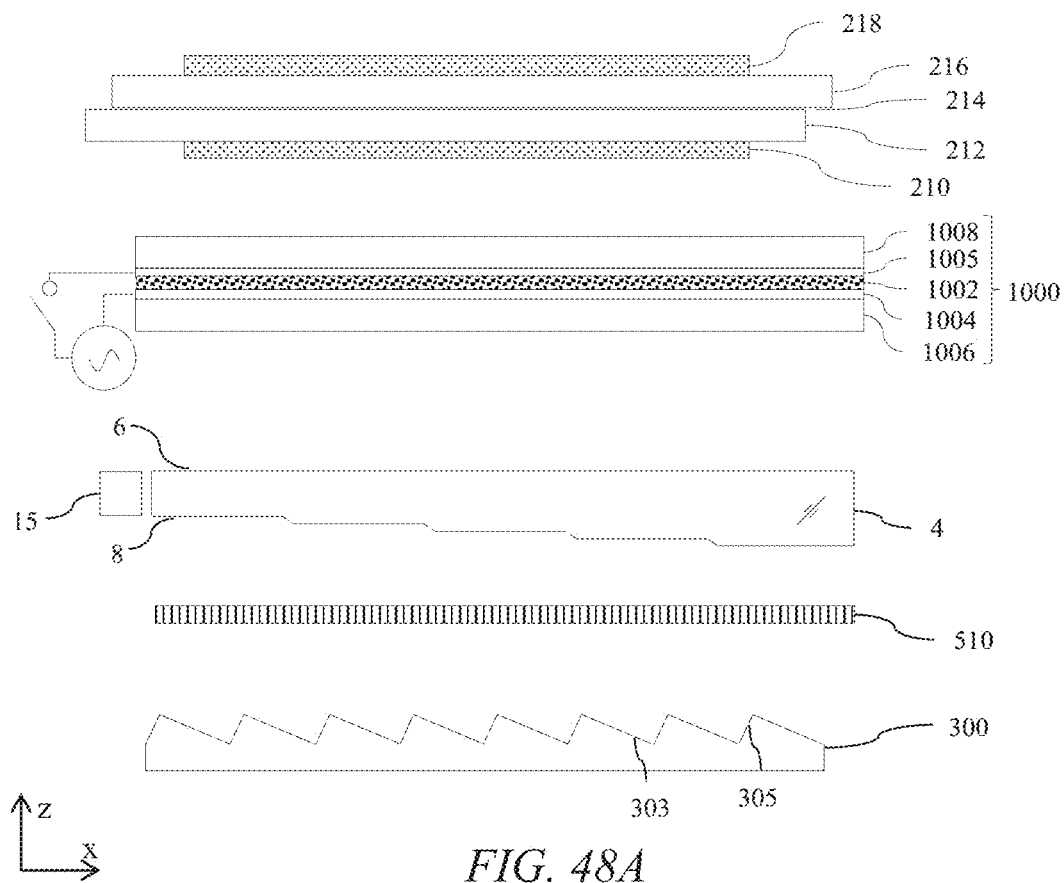
FIG. 48A is a schematic diagram illustrating in side view a switchable directional display comprising a switchable scattering layer and a directional backlight, in accordance with the present disclosure.
Figure 48B:
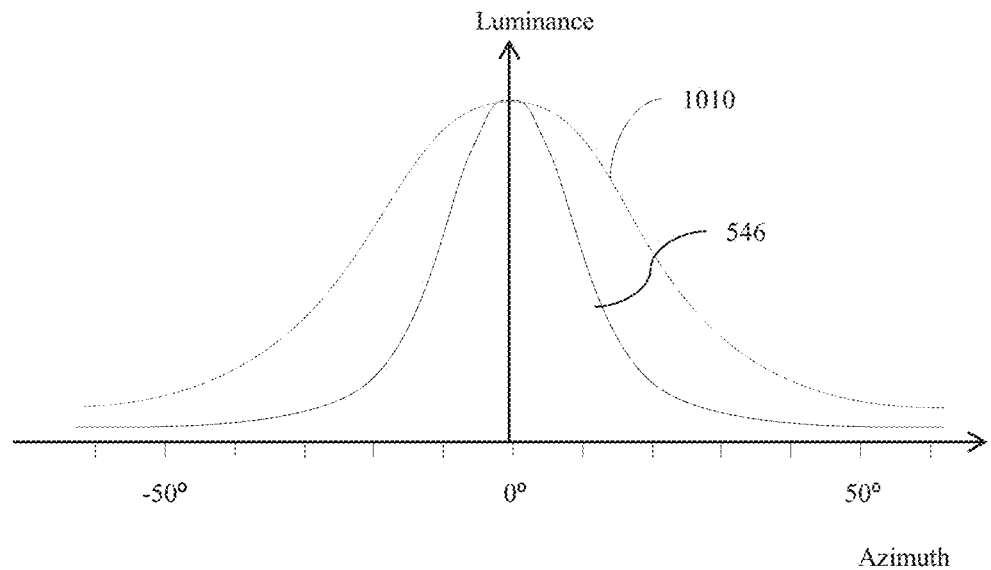
FIG. 48B is a schematic graph illustrating a cross section in a single elevation, typical narrow angle and wide angle luminance profiles from the arrangement of FIG. 48A, in accordance with the present disclosure.

FIG. 48A is a schematic diagram illustrating nu side view a switchable directional display comprising a switchable scattering layer and a directional backlight and FIG. 48B is a schematic graph illustrating a cross section in a single elevation, typical narrow angle and wide angle luminance profiles from the arrangement of FIG. 48A.

Thus a switchable directional display, may comprise a light valve comprising a first end at which light may enter the light valve 1 and propagate in a first direction; a second end comprising a reflective surface arranged to redirect light propagating in said first direction to propagate in a second direction back toward the first end, wherein the second end is a curved reflective surface 4, or a Fresnel equivalent of a curved reflective surface; a first light guiding surface extending between the first and second ends, wherein the first light guiding surface is substantially planar; and a second light guiding surface, extending between the first and second ends opposite the first light guiding surface, further comprising a plurality of guiding features and a plurality of extraction features that have a cross-sectional profile and are curved along the direction in which they are elongated, wherein the extraction features and the guiding features are connected to and alternate with one another respectively, further wherein the plurality of extraction features allow light to pass with substantially low loss when the light is propagating in a first direction and allow light to reflect and exit the light valve when the light is propagating in a second direction, wherein a degree of curvature of the extraction features along the direction in which the extraction features are elongated causes the light from a plurality of illumination elements to be focused, whereby the curvature of the extraction features and the curvature of the reflective end cooperate to direct focused light into respective viewing windows; and a polymer dispersed liquid crystal between two transparent substrates, wherein each of the transparent substrates further comprises at least one transparent conductive electrode for applying a voltage across the polymer dispersed liquid crystal wherein the polymer dispersed liquid crystal is switchable between a light scattering state and a clear state by means of the applied voltage; and a spatial light modulator 848.

The polymer dispersed liquid crystal (PDLC) cell 900 comprises substrates 908 and 906 which may be glass or may be a plastics material such as for example polyimide films. The films are coated with conductive electrodes 905 and 904 which may comprise transparent materials such as indium tin oxide (ITO) or silver nanowire. The PDLC 902 comprises microdroplets of a liquid crystal material dispersed within a transparent polymeric matrix. The transparent polymer matrix may be formed from a curable material which is mixed with the liquid crystal material before being cured for example by UV light. In the absence of an electric field applied by the electrodes 904, 905, the liquid crystal microdroplets form a structure such that their anisotropic refractive index diffuses light and the cell functions as a diffuser element. When an electric field applied between the electrodes 904, 905 it orients the liquid crystal molecules to allow the film to transmit light without substantial diffusion, so that the film becomes transparent. The operating voltage of a PDLC is typically larger than that of for example a TN liquid crystal display. Note that a PDLC can operate without polarisers.

In operation, the directional backlight may be arranged to provide a narrow angular luminance distribution 546. In a wide angle mode the PDLC is provided in a scattering state, whereas in a narrow angle mode a clear state is provided. In this manner, a switchable direction display may be provided.

The light source array 15 may be provided in a central region of the input side 2 of the directional waveguide. Outside of the central region, absorbing material may be provided so that the off-axis stray light illumination to snooper 47 is reduced. Advantageously a low privacy level switchable directional backlight may be provided. Further control of the light source array 15 is not provided, advantageously reducing cost and complexity of the light source control system.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiments) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A privacy display device comprising:
a directional backlight arranged to output light, wherein the directional backlight is arranged to provide switching between at least two different angular luminance profiles; and
a transmissive spatial light modulator arranged to receive output light from the backlight,
wherein the spatial light modulator is arranged to modulate the output light from the backlight to provide an image that may be switched between at least two different angular contrast profiles,
wherein the spatial light modulator comprises a pixelated liquid crystal display comprising a liquid crystal pixel layer and pixel addressing electrodes arranged to provide in-plane electric fields to pixels of the pixelated liquid crystal display, and
wherein the spatial light modulator further comprises a liquid crystal bias layer arranged between the input polariser and output polariser of the pixelated liquid crystal display; and bias layer electrodes arranged to provide out-of-plane bias electric fields to the liquid crystal bias layer.

2. A privacy display device according to claim 1 wherein the pixelated liquid crystal display further comprises pixel bias electrodes arranged to provide out-of-plane bias electric fields to the liquid crystal pixel layer.

3. A privacy display device according to claim 1 wherein the bias electric fields are time varying.

4. A privacy display device according to claim 3 wherein the bias layer electrodes are patterned to provide at least two pattern regions.

5. A privacy display device according to claim 4 wherein the pattern regions are camouflage patterns.

6. A privacy display device according to claim 4 wherein at least one of the pattern regions is individually addressable.

7. A privacy display device according to claim 6, wherein the first guide surface is arranged to guide light by total internal reflection, and the second guide surface comprises light extraction features and intermediate regions between the light extraction features, the light extraction features being oriented to deflect the reflected input light through the first guide surface as output light and the intermediate regions being arranged to direct light through the waveguide without extracting it.

8. A privacy display device according to claim 1, wherein the directional backlight comprises:
an array of light sources;
a waveguide arranged to receive input light from the light sources at different input positions and comprising first and second, opposed guide surfaces for guiding the input light along the waveguide, sides that extend between the first and second guide surfaces and a reflective end for reflecting the input light back along the waveguide, wherein the second guide surface is arranged to deflect the reflected input light through the first guide surface as output light, and the waveguide is arranged to image the light sources in a lateral direction between the sides of the waveguide so that the output light from the light sources is directed into respective optical windows in output directions that are distributed in dependence on input positions of the light sources.

9. A privacy display device according to claim 8, wherein the light extraction features are curved and have positive optical power in the lateral direction between sides of the waveguide that extend between the first and second guide surfaces.

10. A privacy display device according to claim 8, wherein the reflective end has positive optical power in the lateral direction extending between sides of the waveguide that extend between the first and second guide surfaces.

11. A privacy display device according to claim 8, wherein the waveguide comprises an input end opposite to the reflective end and the light sources are arranged to input light into the waveguide through the input end.

12. A privacy display device according to claim 8, wherein the light sources are arranged to input light into the waveguide through the sides of the waveguide.

13. A privacy display device according to claim 1 wherein the angular luminance profiles from the directional backlight may be controlled in the lateral direction; and
wherein the out of plane bias electric fields are arranged to tilt the respective liquid crystal layer about an axis parallel to the lateral direction.

14. A privacy display device according to claim 1, further comprising at least one additional polariser arranged on the input side of the input polariser between the input polariser and the backlight or on the output side of the output polariser; and
at least one retarder arranged between the at least one additional polariser and the input polariser in the case that the additional polariser is arranged on the input side of the input polariser or between the additional polariser and the output polariser in the case that the additional polariser is arranged on the output side of the input polariser.

15. A privacy display device according to claim 14, wherein the additional polariser is arranged on the input side of the input polariser and said at least one retarder is arranged between the additional polariser and the input polariser.

16. A privacy display device according to claim 15, wherein the additional polariser is a reflective polariser.

17. A privacy display device according to claim 14, wherein the additional polariser has an electric vector transmission direction that is parallel to the electric vector transmission of the input polariser in the case that the additional polariser is arranged on the input side of the input polariser or is parallel to the electric vector transmission of the output polariser in the case that the additional polariser is arranged on the output side of the input polariser.

18. A privacy display device according to claim 14, wherein the additional polariser is arranged on the output side of the output polariser and said at least one retarder is arranged between the additional polariser and the output polariser.

19. A privacy display device according to claim 14, wherein the at least one retarder comprises a retarder having a slow axis perpendicular to the plane of the retarder.

20. A privacy display device according to claim 19, wherein the retarder having a slow axis perpendicular to the plane of the retarder comprises a C-plate.

21. A privacy display device according to claim 14, wherein the at least one retarder comprises a retarder having a slow axis orientation with a component perpendicular to the plane of the retarder, and at least one component in the plane of the retarder.

22. A privacy display device according to claim 14, wherein the at least one retarder comprises a retarder having a slow axis orientation with a component perpendicular to the plane of the retarder, a component that is orthogonal in the plane of the retarder to the electric vector transmission direction of the input polariser and substantially no component that is parallel in the plane of the retarder to the electric vector transmission direction of the input polariser.

23. A privacy display device according to claim 14, wherein the at least one retarder comprises a retarder having a slow axis orientation with a component perpendicular to the plane of the retarder, a component that is parallel in the plane of the retarder to the electric vector transmission direction of the input polariser and substantially no component that is orthogonal in the plane of the retarder to the electric vector transmission direction of the input polariser.

24. A privacy display device according to claim 14, wherein the retarder comprises an O-plate.

25. A privacy display device according to claim 14, wherein the retarder comprises a switchable liquid crystal retarder that is switchable between an O-plate retarder and an A-plate retarder by means of an applied voltage across the switchable liquid crystal retarder.

26. A privacy display device according to claim 25, wherein the switchable liquid crystal retarder comprises at least one homeotropic alignment layer.

27. A privacy display device according to claim 26 further comprising at least one compensation retarder arranged between the at least one additional polariser and the input polariser in the case that the additional polariser is arranged on the input side of the input polariser or between the additional polariser and the output polariser in the case that the additional polariser is arranged on the output side of the input polariser.

28. A privacy display device according to claim 27 wherein the compensating retarder comprises a negative C-plate or crossed positive A-plates.

29. A privacy display device according to claim 14, wherein the at least one retarder comprises a first O-plate retarder and a second O-plate retarder that is switchable.

30. A privacy display device according to claim 1, wherein the at least one retarder comprises a pair of retarders which have slow axes in the plane of the retarders that are crossed.

31. A privacy display device according to claim 30, wherein the pair of retarders have slow axes that each extend at 45° with respect to an electric vector transmission direction that is parallel to the electric vector transmission of the input polariser in the case that the additional polariser is arranged on the input side of the input polariser or is parallel to the electric vector transmission of the output polariser in the case that the additional polariser is arranged on the output side of the input polariser.

32. A privacy display device according to claim 30, wherein the pair of retarders each comprise a single A-plate.

33. A privacy display device according to claim 30, wherein the pair of retarders each comprise plural A-plates having respective slow axes aligned at different angles from each other.

34. A privacy display device according to claim 33, wherein the at least one retarder further comprises a pair of retarders which have slow axes in the plane of the retarders that are crossed.

35. A privacy display device according to claim 30, wherein the pair of retarders have slow axes that each extend at 0° and 90°, respectively, with respect to an electric vector transmission direction that is parallel to the electric vector transmission of the input polariser in the case that the additional polariser is arranged on the input side of the input polariser or is parallel to the electric vector transmission of the output polariser in the case that the additional polariser is arranged on the output side of the input polariser.

36. A privacy display device according to claim 1, wherein the switchable liquid crystal retarder comprises at least first and second regions that are independently addressable with first and second applied voltages.

37. A privacy display system comprising the privacy display device according to claim 4 and a control system arranged to switch the directional backlight between
   a first mode arranged to switch the directional backlight to a first angular luminance profile and to switch the spatial light modulator to a first angular contrast profile; and
   a second mode arranged to switch the directional backlight to a second angular luminance profile and to switch the spatial light modulator to a second angular contrast profile,
   wherein the first angular luminance profile and the first angular contrast profile have half maximum widths that are larger than the half maximum widths of the second angular luminance profile and the second angular contrast profile.

38. A privacy display system according to claim 37 wherein the switching between the at least first and second angular luminance profiles is provided by control of luminous flux distributions across the array of input light sources.

39. A privacy display system according to claim 37 wherein the switching between the at least first and second angular contrast profiles is provided by control of the bias electric field.

40. A privacy display system according to claim 38 wherein in the second mode for a nominal viewing angle there is provided an invisibility function of image contrast against image luminance on which an operating point is selected by control of (i) angular luminance profile and (ii) angular contrast profile.

41. A privacy display system according to claim 40 further comprising an ambient light control system arranged to control the operating point of the invisibility function in response to the ambient illuminance.

* * * * *